United States Patent
Yang et al.

(10) Patent No.: US 11,622,614 B2
(45) Date of Patent: Apr. 11, 2023

(54) VANITY MIRROR

(71) Applicant: simplehuman, LLC, Torrance, CA (US)

(72) Inventors: Frank Yang, Rancho Palos Verdes, CA (US); Tzu-Hao Wei, Hacienda Heights, CA (US); Guy Cohen, Marina Del Rey, CA (US); Joseph Sandor, Newport Beach, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 17/302,024

(22) Filed: Apr. 21, 2021

(65) Prior Publication Data

US 2021/0307491 A1    Oct. 7, 2021

Related U.S. Application Data

(63) Continuation of application No. 15/930,287, filed on May 12, 2020, now Pat. No. 11,013,307, which is a
(Continued)

(51) Int. Cl.
*A45D 42/10* (2006.01)
*A47G 1/04* (2006.01)
(Continued)

(52) U.S. Cl.
CPC .............. *A45D 42/10* (2013.01); *A45D 42/18* (2013.01); *A47G 1/04* (2013.01); *F21V 33/004* (2013.01); *G02B 5/0263* (2013.01); *F21S 10/02* (2013.01)

(58) Field of Classification Search
CPC ........ A45D 42/10; A45D 42/18; F21V 33/004
(Continued)

(56) References Cited

U.S. PATENT DOCUMENTS

D44,537 S    8/1913    McIsaac
D65,759 S    10/1924    Short
(Continued)

FOREIGN PATENT DOCUMENTS

CN    3044427    5/1996
CN    2379638 Y    5/2000
(Continued)

OTHER PUBLICATIONS

U.S. Appl. No. 29/689,860, filed May 2, 2019, Yang et al.
(Continued)

*Primary Examiner* — Robert J May
(74) *Attorney, Agent, or Firm* — Knobbe, Marten, Olson & Bear LLP

(57) ABSTRACT

A mirror assembly can include a housing, a mirror, and a light source. In some embodiments, the mirror comprises one or more adjustable sections. In certain embodiments, the mirror includes a light column configured to emit a substantially constant amount of light along a periphery of a mirror section. In some embodiments, the light column can produce various color temperatures. In some embodiments, the mirror assembly comprises a capacitive touch sensor that allows control of one or more features of the light emitted from the light source. In some embodiments, the mirror assembly includes a sensor assembly. The sensor assembly can be configured control on/off settings and other features of the emitted light.

22 Claims, 24 Drawing Sheets

Related U.S. Application Data continuation of application No. 16/103,363, filed on Aug. 14, 2018, now Pat. No. 10,702,043, which is a continuation of application No. 15/060,080, filed on Mar. 3, 2016, now Pat. No. 10,076,176.

(60) Provisional application No. 62/129,205, filed on Mar. 6, 2015.

(51) Int. Cl.

| | |
|---|---|
| A45D 42/18 | (2006.01) |
| F21V 33/00 | (2006.01) |
| G02B 5/02 | (2006.01) |
| F21S 10/02 | (2006.01) |

(58) Field of Classification Search
USPC .................................................. 362/135–144
See application file for complete search history.

(56) References Cited

U.S. PATENT DOCUMENTS

| | | |
|---|---|---|
| 1,541,451 A | 6/1925 | Wallace |
| 2,004,166 A | 6/1935 | Low |
| 2,235,281 A | 3/1941 | Carver |
| 2,292,059 A | 8/1942 | Charles |
| D163,481 S | 5/1951 | Rauh |
| 2,687,674 A | 8/1954 | Emilea |
| D208,234 S | 8/1967 | Ely |
| D209,077 S | 10/1967 | Andre |
| D213,392 S | 2/1969 | Andre |
| D216,414 S | 12/1969 | Hanson |
| 3,623,356 A | 11/1971 | Bisberg |
| 3,732,702 A | 5/1973 | Desch |
| 3,794,828 A | 2/1974 | Arpino |
| 3,949,767 A | 4/1976 | Rose |
| D243,301 S | 2/1977 | Ravn |
| D243,478 S | 2/1977 | Jones |
| D254,208 S | 2/1980 | Breslow |
| 4,278,870 A | 7/1981 | Carleton et al. |
| D261,845 S | 11/1981 | Wachtel |
| D266,028 S | 8/1982 | Boyd |
| 4,491,899 A | 1/1985 | Fleming |
| D284,483 S | 7/1986 | Yang |
| D290,662 S | 7/1987 | Basil et al. |
| D307,358 S | 4/1990 | Gerton |
| D309,833 S | 8/1990 | Wahl |
| D317,531 S | 6/1991 | Evans |
| 5,025,354 A | 6/1991 | Kondo |
| 5,164,861 A | 11/1992 | Katz |
| D335,580 S | 5/1993 | Gaullier |
| 5,267,081 A | 11/1993 | Pein |
| 5,267,786 A | 12/1993 | Aisley |
| 5,392,162 A | 2/1995 | Glucksman |
| D378,159 S | 2/1997 | Mulkey |
| D379,125 S | 5/1997 | Simjian |
| D391,773 S | 3/1998 | Zaidman et al. |
| D409,003 S | 5/1999 | Scavini |
| 5,979,976 A | 11/1999 | Ferencik |
| 5,984,485 A | 11/1999 | Poli et al. |
| 6,042,242 A | 3/2000 | Chang |
| D425,313 S | 5/2000 | Zadro |
| D426,182 S | 6/2000 | Brown |
| 6,106,121 A | 8/2000 | Buckley et al. |
| D431,375 S | 10/2000 | Zadro |
| 6,158,877 A | 12/2000 | Zadro |
| 6,206,530 B1 | 3/2001 | Eberts |
| D442,371 S | 5/2001 | Eberts |
| 6,231,992 B1 | 5/2001 | Niebauer et al. |
| 6,241,357 B1 | 6/2001 | Lee |
| 6,270,240 B1 | 8/2001 | Inoue |
| 6,273,585 B1 | 8/2001 | Wu |
| 6,305,809 B1 | 10/2001 | Zadro |
| D454,701 S | 3/2002 | Eric |
| D459,094 S | 6/2002 | Stone et al. |
| 6,420,682 B1 | 7/2002 | Sellgren et al. |
| 6,466,826 B1 | 10/2002 | Nishihira et al. |
| D465,490 S | 11/2002 | Wei |
| 6,496,107 B1 | 12/2002 | Himmelstein |
| 6,553,123 B1 | 4/2003 | Dykstra |
| D474,432 S | 5/2003 | Good |
| 6,560,027 B2 | 5/2003 | Meine |
| 6,594,630 B1 | 7/2003 | Zlokarnik et al. |
| 6,604,836 B2 | 8/2003 | Carlucci et al. |
| 6,676,272 B2 | 1/2004 | Chance |
| D486,964 S | 2/2004 | Prince et al. |
| D488,626 S | 4/2004 | Kruger |
| D492,230 S | 6/2004 | Berger |
| 6,830,154 B2 | 12/2004 | Zadro |
| 6,848,822 B2 | 2/2005 | Ballen et al. |
| D505,555 S | 5/2005 | Snell |
| 6,886,351 B2 | 5/2005 | Palfy et al. |
| D508,883 S | 8/2005 | Falconer |
| D509,369 S | 9/2005 | Snell |
| D511,413 S | 11/2005 | Yue |
| 6,961,168 B2 | 11/2005 | Agrawal et al. |
| D512,841 S | 12/2005 | Dirks |
| 7,004,599 B2 | 2/2006 | Mullani |
| 7,048,406 B1 | 5/2006 | Shih |
| 7,054,668 B2 | 5/2006 | Endo et al. |
| D524,469 S | 7/2006 | Pitot et al. |
| 7,090,378 B1 | 8/2006 | Zadro |
| D532,981 S | 12/2006 | Zadro |
| D540,549 S | 4/2007 | Yue |
| 7,233,154 B2 | 6/2007 | Groover et al. |
| D546,567 S | 7/2007 | Bhavnani |
| D547,555 S | 7/2007 | Lo et al. |
| D558,987 S | 1/2008 | Gildersleeve |
| D562,571 S | 2/2008 | Pitot |
| 7,341,356 B1 | 3/2008 | Zadro |
| 7,347,573 B1 | 3/2008 | Isler |
| 7,349,144 B2 | 3/2008 | Varaprasad et al. |
| D568,081 S | 5/2008 | Thompson et al. |
| D569,671 S | 5/2008 | Thompson et al. |
| 7,370,982 B2 | 5/2008 | Bauer et al. |
| D572,024 S | 7/2008 | Shapiro |
| 7,393,115 B2 | 7/2008 | Tokushita et al. |
| D574,159 S | 8/2008 | Howard |
| 7,417,699 B2 | 8/2008 | Yun et al. |
| 7,423,522 B2 | 9/2008 | O'brien et al. |
| 7,435,928 B2 | 10/2008 | Platz |
| 7,446,924 B2 | 11/2008 | Schofield et al. |
| 7,455,412 B2 | 11/2008 | Rottcher |
| D582,984 S | 12/2008 | Mininger et al. |
| D584,516 S | 1/2009 | Otomo |
| 7,500,755 B2 * | 3/2009 | Ishizaki .................. G06F 3/011 |
| | | 434/269 |
| 7,513,476 B1 | 4/2009 | Huang |
| 7,551,354 B2 | 6/2009 | Horsten et al. |
| 7,570,413 B2 | 8/2009 | Tonar et al. |
| 7,589,893 B2 | 9/2009 | Rottcher |
| 7,621,651 B2 | 11/2009 | Chan et al. |
| 7,626,655 B2 | 12/2009 | Yamazaki et al. |
| 7,636,195 B2 | 12/2009 | Nieuwkerk et al. |
| 7,651,229 B1 | 1/2010 | Rimback et al. |
| 7,679,809 B2 | 3/2010 | Tonar et al. |
| 7,728,927 B2 | 6/2010 | Nieuwkerk et al. |
| 7,805,260 B2 | 9/2010 | Mischel, Jr. et al. |
| D625,930 S | 10/2010 | Merica |
| 7,813,023 B2 | 10/2010 | Baur |
| 7,813,060 B1 | 10/2010 | Bright et al. |
| 7,826,123 B2 | 11/2010 | McCabe et al. |
| 7,853,414 B2 | 12/2010 | Mischel, Jr. et al. |
| 7,855,755 B2 | 12/2010 | Weller et al. |
| 7,856,248 B1 | 12/2010 | Fujisaki |
| 7,859,737 B2 | 12/2010 | McCabe et al. |
| 7,859,738 B2 | 12/2010 | Baur et al. |
| 7,864,399 B2 | 1/2011 | McCabe et al. |
| D635,009 S | 3/2011 | Paterson |
| 7,898,719 B2 | 3/2011 | Schofield et al. |
| 7,903,335 B2 | 3/2011 | Nieuwkerk et al. |
| 7,916,129 B2 | 3/2011 | Lin et al. |
| 7,916,380 B2 | 3/2011 | Tonar et al. |
| 7,953,648 B2 | 5/2011 | Vock |

(56) References Cited

U.S. PATENT DOCUMENTS

| | | | |
|---|---|---|---|
| D639,077 S | 6/2011 | DeBretton Gordon |
| 7,978,393 B2 | 7/2011 | Tonar et al. |
| 8,004,741 B2 | 8/2011 | Tonar et al. |
| D647,444 S | 10/2011 | Manukyan et al. |
| D649,790 S | 12/2011 | Pitot |
| 8,083,386 B2 | 12/2011 | Lynam |
| D652,220 S | 1/2012 | Pitot |
| 8,099,247 B2 | 1/2012 | Mischel, Jr. et al. |
| D656,979 S | 4/2012 | Yip et al. |
| D657,425 S | 4/2012 | Podd |
| D657,576 S | 4/2012 | Pitot |
| 8,154,418 B2 | 4/2012 | Peterson et al. |
| 8,162,502 B1 | 4/2012 | Zadro |
| D658,604 S | 5/2012 | Egawa et al. |
| D660,367 S | 5/2012 | Podd |
| D660,368 S | 5/2012 | Podd |
| D660,369 S | 5/2012 | Podd |
| 8,179,236 B2 | 5/2012 | Weller et al. |
| 8,179,586 B2 | 5/2012 | Schofield et al. |
| 8,194,133 B2 | 6/2012 | DeWind et al. |
| 8,228,588 B2 | 7/2012 | McCabe et al. |
| D665,030 S | 8/2012 | Podd |
| D666,010 S | 8/2012 | Farley |
| D670,087 S | 11/2012 | Walker |
| 8,335,032 B2 | 12/2012 | McCabe et al. |
| 8,348,441 B1 | 1/2013 | Skelton |
| 8,356,908 B1 | 1/2013 | Zadro |
| 8,379,289 B2 | 2/2013 | Schofield et al. |
| 8,382,189 B2 | 2/2013 | Li et al. |
| 8,393,749 B1 | 3/2013 | Daicos |
| 8,400,704 B2 | 3/2013 | McCabe et al. |
| D679,101 S | 4/2013 | Pitot |
| D679,102 S | 4/2013 | Gilboe et al. |
| D680,755 S | 4/2013 | Gilboe et al. |
| 8,503,062 B2 | 8/2013 | Baur et al. |
| 8,506,096 B2 | 8/2013 | McCabe et al. |
| 8,508,832 B2 | 8/2013 | Baumann et al. |
| 8,511,841 B2 | 8/2013 | Varaprasad et al. |
| D688,883 S | 9/2013 | Gilboe et al. |
| D689,701 S | 9/2013 | Mischel, Jr. et al. |
| 8,559,092 B2 | 10/2013 | Bugno et al. |
| 8,559,093 B2 | 10/2013 | Varaprasad et al. |
| 8,585,273 B2 | 11/2013 | Pokrovskiy et al. |
| D699,448 S | 2/2014 | Yang et al. |
| D699,952 S | 2/2014 | Yang et al. |
| 8,649,082 B2 | 2/2014 | Baur |
| D701,050 S | 3/2014 | Yang et al. |
| D701,507 S | 3/2014 | Cope |
| 8,705,161 B2 | 4/2014 | Schofield et al. |
| 8,727,547 B2 | 5/2014 | McCabe et al. |
| D707,454 S | 6/2014 | Pitot |
| 8,743,051 B1 | 6/2014 | Moy et al. |
| D711,871 S | 8/2014 | Daniel |
| D711,874 S | 8/2014 | Cope |
| 8,797,627 B2 | 8/2014 | McCabe et al. |
| D712,963 S | 9/2014 | Fleet |
| 8,880,360 B2 | 11/2014 | Mischel, Jr. et al. |
| 8,910,402 B2 | 12/2014 | Mischel, Jr. et al. |
| D727,630 S | 4/2015 | Zadro |
| D729,525 S | 5/2015 | Tsai |
| D729,527 S | 5/2015 | Tsai |
| D730,065 S | 5/2015 | Tsai |
| 9,090,211 B2 | 7/2015 | McCabe et al. |
| D736,001 S | 8/2015 | Yang et al. |
| D737,059 S | 8/2015 | Tsai |
| D737,060 S | 8/2015 | Yang et al. |
| 9,105,202 B2 | 8/2015 | Mischel, Jr. et al. |
| D737,580 S | 9/2015 | Tsai |
| D738,118 S | 9/2015 | Gyanendra et al. |
| 9,170,353 B2 | 10/2015 | Chang |
| 9,173,509 B2 | 11/2015 | Mischel, Jr. et al. |
| 9,174,578 B2 | 11/2015 | Uken et al. |
| 9,205,780 B2 | 12/2015 | Habibi et al. |
| 9,232,846 B2 | 1/2016 | Fung |
| 9,254,789 B2 | 2/2016 | Anderson et al. |
| D751,829 S | 3/2016 | Yang et al. |
| D754,446 S | 4/2016 | Yang et al. |
| 9,327,649 B2 | 5/2016 | Habibi |
| 9,341,914 B2 | 5/2016 | McCabe et al. |
| 9,347,660 B1 | 5/2016 | Zadro |
| D764,592 S | 8/2016 | Zenoff |
| 9,499,103 B2 | 11/2016 | Han |
| 9,510,711 B2 * | 12/2016 | Tsibulevskiy ......... A45D 42/16 |
| 9,528,695 B2 | 12/2016 | Adachi et al. |
| D776,945 S | 1/2017 | Yang |
| D779,836 S | 2/2017 | Bailey |
| D785,345 S | 5/2017 | Yang et al. |
| 9,638,410 B2 | 5/2017 | Yang et al. |
| 9,694,751 B2 | 7/2017 | Lundy, Jr. et al. |
| 9,709,869 B2 | 7/2017 | Baumann et al. |
| D793,099 S | 8/2017 | Bailey |
| D801,060 S | 10/2017 | Hollinger |
| 9,827,912 B2 | 11/2017 | Olesen et al. |
| 9,845,537 B2 | 12/2017 | Mischel, Jr. et al. |
| 9,878,670 B2 | 1/2018 | McCabe et al. |
| 9,897,306 B2 | 2/2018 | Yang et al. |
| 9,921,390 B1 | 3/2018 | Mischel, Jr. et al. |
| 9,933,595 B1 | 4/2018 | Mischel, Jr. et al. |
| D816,350 S | 5/2018 | Yang et al. |
| 10,016,045 B1 | 7/2018 | Hollinger |
| 10,023,123 B2 | 7/2018 | Takada et al. |
| 10,029,616 B2 | 7/2018 | McCabe et al. |
| 10,035,461 B2 | 7/2018 | Lin et al. |
| D825,940 S | 8/2018 | Liu |
| 10,076,176 B2 | 9/2018 | Yang et al. |
| D830,706 S | 10/2018 | Pitot |
| 10,161,622 B1 | 12/2018 | Frazier |
| D845,652 S | 4/2019 | Yang et al. |
| D846,288 S | 4/2019 | Yang et al. |
| D848,158 S | 5/2019 | Yang et al. |
| 10,524,591 B2 | 1/2020 | Kim |
| D874,161 S | 2/2020 | Yang et al. |
| D874,162 S | 2/2020 | Greenwalt |
| 10,652,447 B1 | 5/2020 | Pestl et al. |
| D891,121 S | 7/2020 | Zhao et al. |
| D891,123 S | 7/2020 | Li et al. |
| D891,125 S | 7/2020 | Liu |
| 10,702,043 B2 | 7/2020 | Yang et al. |
| D892,508 S | 8/2020 | Yang |
| 10,746,394 B2 | 8/2020 | Yang et al. |
| D897,694 S | 10/2020 | Lin |
| D897,695 S | 10/2020 | Yang |
| D898,386 S | 10/2020 | Huang |
| D898,387 S | 10/2020 | Yang |
| 10,869,537 B2 | 12/2020 | Yang et al. |
| 11,013,307 B2 | 5/2021 | Yang et al. |
| 11,026,497 B2 | 6/2021 | Yang et al. |
| D925,928 S | 7/2021 | Yang et al. |
| D927,863 S | 8/2021 | Yang et al. |
| 11,371,692 B2 | 6/2022 | Yang et al. |
| 2002/0196333 A1 | 12/2002 | Gorischek |
| 2003/0030063 A1 | 2/2003 | Sosniak et al. |
| 2003/0031010 A1 | 2/2003 | Sosniak et al. |
| 2003/0065515 A1 | 4/2003 | Yokota |
| 2003/0133292 A1 | 7/2003 | Mueller et al. |
| 2003/0223250 A1 | 12/2003 | Ballen et al. |
| 2004/0020509 A1 | 2/2004 | Waisman |
| 2004/0125592 A1 | 7/2004 | Nagakubo et al. |
| 2004/0156133 A1 | 8/2004 | Vernon |
| 2004/0173498 A1 | 9/2004 | Lee |
| 2005/0036300 A1 | 2/2005 | Dowling et al. |
| 2005/0068646 A1 | 3/2005 | Lev et al. |
| 2005/0146863 A1 | 7/2005 | Mullani |
| 2005/0156753 A1 | 7/2005 | Deline et al. |
| 2005/0243556 A1 | 11/2005 | Lynch |
| 2005/0270769 A1 | 12/2005 | Smith |
| 2005/0276053 A1 | 12/2005 | Nortrup et al. |
| 2006/0077654 A1 | 4/2006 | Krieger et al. |
| 2006/0132923 A1 | 6/2006 | Hsiao et al. |
| 2006/0164725 A1 | 7/2006 | Horsten et al. |
| 2006/0184993 A1 | 8/2006 | Goldthwaite et al. |
| 2006/0186314 A1 | 8/2006 | Leung |
| 2007/0050211 A1 | 3/2007 | Mandl |
| 2007/0097672 A1 | 5/2007 | Benn |

(56) References Cited

U.S. PATENT DOCUMENTS

| | | |
|---|---|---|
| 2007/0146616 A1 | 6/2007 | Nouchi et al. |
| 2007/0159846 A1 | 7/2007 | Nishiyama et al. |
| 2007/0183037 A1 | 8/2007 | De Boer et al. |
| 2007/0263999 A1 | 11/2007 | Keam |
| 2007/0297189 A1 | 12/2007 | Wu et al. |
| 2008/0078796 A1 | 4/2008 | Parsons |
| 2008/0088244 A1 | 4/2008 | Morishita |
| 2008/0118080 A1 | 5/2008 | Gratke et al. |
| 2008/0130305 A1 | 6/2008 | Wang et al. |
| 2008/0244940 A1 | 10/2008 | Mesika |
| 2008/0258110 A1 | 10/2008 | Oshio |
| 2008/0265799 A1 | 10/2008 | Sibert |
| 2008/0271354 A1 | 11/2008 | Bostrom |
| 2008/0294012 A1 | 11/2008 | Kurtz et al. |
| 2008/0297586 A1 | 12/2008 | Kurtz et al. |
| 2008/0298080 A1 | 12/2008 | Wu et al. |
| 2009/0027902 A1 | 1/2009 | Fielding et al. |
| 2009/0194670 A1 | 8/2009 | Rains, Jr. et al. |
| 2009/0207339 A1 | 8/2009 | Ajichi et al. |
| 2009/0213604 A1 | 8/2009 | Uken |
| 2009/0244740 A1 | 10/2009 | Takayanagi et al. |
| 2009/0301927 A1 | 12/2009 | Fvlbrook et al. |
| 2010/0033988 A1 | 2/2010 | Chiu et al. |
| 2010/0118422 A1 | 5/2010 | Holacka |
| 2010/0118520 A1 | 5/2010 | Stern et al. |
| 2010/0296298 A1 | 11/2010 | Martin, Jr. |
| 2010/0309159 A1 | 12/2010 | Roettcher |
| 2011/0058269 A1 | 3/2011 | Su |
| 2011/0074225 A1 | 3/2011 | Delnoij et al. |
| 2011/0080374 A1 | 4/2011 | Feng et al. |
| 2011/0194200 A1 | 8/2011 | Greenlee |
| 2011/0211079 A1 | 9/2011 | Rolston |
| 2011/0273659 A1 | 11/2011 | Sobecki |
| 2011/0283577 A1 | 11/2011 | Cornelissen et al. |
| 2012/0056738 A1 | 3/2012 | Lynam |
| 2012/0080903 A1 | 4/2012 | Li et al. |
| 2012/0081915 A1 | 4/2012 | Foote et al. |
| 2012/0229789 A1 | 9/2012 | Kang et al. |
| 2012/0307490 A1 | 12/2012 | Ellis |
| 2013/0026512 A1 | 1/2013 | Tsai |
| 2013/0077292 A1 | 3/2013 | Zimmerman |
| 2013/0120989 A1 | 5/2013 | Sun et al. |
| 2013/0190845 A1 | 7/2013 | Liu et al. |
| 2013/0235610 A1 | 9/2013 | Yang et al. |
| 2014/0240964 A1 | 8/2014 | Adachi et al. |
| 2015/0060431 A1 | 3/2015 | Yang et al. |
| 2015/0203970 A1 | 7/2015 | Mischel, Jr. et al. |
| 2015/0205110 A1 | 7/2015 | Mischel, Jr. et al. |
| 2015/0305113 A1 | 10/2015 | Ellis |
| 2016/0045015 A1 | 2/2016 | Baldwin |
| 2016/0070085 A1 | 3/2016 | Mischel, Jr. et al. |
| 2016/0082890 A1 | 3/2016 | Habibi et al. |
| 2016/0178964 A1 | 6/2016 | Sakai et al. |
| 2016/0193902 A1 | 7/2016 | Hill et al. |
| 2016/0200256 A1 | 7/2016 | Takada et al. |
| 2016/0243989 A1 | 8/2016 | Habibi |
| 2017/0028924 A1 | 2/2017 | Baur et al. |
| 2017/0139302 A1 | 5/2017 | Tonar |
| 2017/0158139 A1 | 6/2017 | Tonar et al. |
| 2017/0164719 A1 | 6/2017 | Wheeler |
| 2017/0190290 A1 | 7/2017 | Lin et al. |
| 2017/0257543 A1 | 9/2017 | Rowles et al. |
| 2017/0285392 A1 | 10/2017 | Hirata et al. |
| 2017/0297495 A1 | 10/2017 | Lundy, Jr. et al. |
| 2017/0297498 A1 | 10/2017 | Larson et al. |
| 2017/0313251 A1 | 11/2017 | Uken et al. |
| 2017/0349102 A1 | 12/2017 | Habibi |
| 2018/0012526 A1 | 1/2018 | Dunn et al. |
| 2018/0015880 A1 | 1/2018 | Olesen et al. |
| 2018/0017823 A1 | 1/2018 | Saenger Nayver et al. |
| 2018/0032227 A1 | 2/2018 | Broxson |
| 2018/0050641 A1 | 2/2018 | Lin et al. |
| 2018/0105114 A1 | 4/2018 | Geerlings et al. |
| 2018/0147993 A1 | 5/2018 | McCabe et al. |
| 2018/0162269 A1 | 6/2018 | Bredeweg et al. |
| 2018/0251069 A1 | 9/2018 | LaCross et al. |
| 2018/0263362 A1 | 9/2018 | Yang et al. |
| 2018/0270410 A1 | 9/2018 | Lyle et al. |
| 2019/0003699 A1 | 1/2019 | Mondora |
| 2019/0054863 A1 | 2/2019 | Roth |
| 2019/0291647 A1 | 9/2019 | Yang et al. |
| 2019/0328161 A1 | 10/2019 | Wei |
| 2019/0351830 A1 | 11/2019 | Bosma et al. |
| 2020/0008592 A1 | 1/2020 | Meyers et al. |
| 2020/0085170 A1 | 3/2020 | Yang et al. |
| 2020/0278514 A1 | 9/2020 | Yang et al. |
| 2020/0333934 A1 | 10/2020 | Pestl et al. |
| 2021/0025584 A1 | 1/2021 | Yang et al. |
| 2021/0137266 A1 | 5/2021 | Pestl et al. |
| 2021/0196028 A1 | 7/2021 | Yang et al. |
| 2021/0364892 A1 | 11/2021 | Copeland et al. |
| 2022/0282861 A1 | 9/2022 | Yang et al. |

FOREIGN PATENT DOCUMENTS

| | | | | |
|---|---|---|---|---|
| CN | 3357935 | | 3/2004 | |
| CN | 2852806 Y | | 1/2007 | |
| CN | 2925206 Y | | 7/2007 | |
| CN | 300746709 | | 2/2008 | |
| CN | 101160003 A | | 4/2008 | |
| CN | 101382025 A | | 3/2009 | |
| CN | 300973066 S | | 8/2009 | |
| CN | 300983799 S | | 8/2009 | |
| CN | 300990023 S | | 8/2009 | |
| CN | 301001894 S | | 9/2009 | |
| CN | 301108997 S | | 1/2010 | |
| CN | 301209880 S | | 5/2010 | |
| CN | 101787830 A | | 7/2010 | |
| CN | 301278203 S | | 7/2010 | |
| CN | 301340032 S | | 9/2010 | |
| CN | 301502988 S | | 4/2011 | |
| CN | 102057756 A | | 5/2011 | |
| CN | 301583101 S | | 6/2011 | |
| CN | 301811715 S | | 1/2012 | |
| CN | 302103915 S | | 10/2012 | |
| CN | 302140631 S | | 10/2012 | |
| CN | 302140632 S | | 10/2012 | |
| CN | 302337970 S | | 3/2013 | |
| CN | 302363850 S | | 3/2013 | |
| CN | 302396166 S | | 4/2013 | |
| CN | 302442518 S | | 5/2013 | |
| CN | 302638575 S | | 11/2013 | |
| CN | 302668773 S | | 12/2013 | |
| CN | 106377049 A | | 2/2017 | |
| CN | 108185741 A | | 6/2018 | |
| CN | 207626762 U | | 7/2018 | |
| CN | 211577476 U | | 9/2020 | |
| CN | 211600392 U | | 9/2020 | |
| CN | 111759073 A | * | 10/2020 | ........... G02B 6/0096 |
| CN | 306124222 | | 10/2020 | |
| DE | 2924529 A1 | | 1/1981 | |
| DE | 29904039 U1 | | 6/1999 | |
| DE | 20014279 U1 | | 2/2001 | |
| DE | 102004042929 A1 | | 3/2006 | |
| DE | 202007013393 U1 | | 12/2007 | |
| DE | 102006060781 A1 | | 4/2008 | |
| DE | 202009004795 U1 | | 9/2009 | |
| DE | 202010000170 U1 | | 7/2010 | |
| DE | 202012103555 U1 | | 2/2014 | |
| EP | 1792553 A2 | | 6/2007 | |
| EP | 2636336 A1 | | 9/2013 | |
| FR | 2 788 951 | | 8/2000 | |
| GB | 2346206 A | | 8/2000 | |
| GB | 2363712 | | 1/2002 | |
| JP | S49-131097 | | 11/1974 | |
| JP | 55-129073 | | 10/1980 | |
| JP | 59-166769 | | 11/1984 | |
| JP | 3057292 | | 12/1998 | |
| JP | 2003-79495 | | 3/2003 | |
| JP | 2004-290531 A | | 10/2004 | |
| JP | 2006-202602 A | | 8/2006 | |
| JP | 2008-073174 A | | 4/2008 | |
| JP | 2013-172802 | | 9/2013 | |
| JP | 2014-212075 | | 11/2014 | |

(56) References Cited

FOREIGN PATENT DOCUMENTS

| KR | 30-0318286 | | 2/2003 |
|---|---|---|---|
| KR | 2003-0017261 | A | 3/2003 |
| KR | 30-0330692 | | 8/2003 |
| KR | 30-0507873 | | 10/2008 |
| KR | 30-0586341 | | 1/2011 |
| KR | 30-0692452 | | 5/2013 |
| KR | 30-0712086 | | 10/2013 |
| WO | WO 2013/047784 | A1 | 4/2013 |
| WO | WO 2018/045649 | A1 | 3/2018 |

OTHER PUBLICATIONS

U.S. Appl. No. 29/723,452, filed Feb. 6, 2020, Yang et al.
Illumay M-97 LED Smart Sensor Mirror, available from internet https://www.alibaba.com/product-detail/ilumay-M-97-led-smart-sensor_60701769220.html, availablility as early as Dec. 16, 2017.
Advanced Lighting Guidelines, 1993 (second edition), Chapter entitled, "Occupant Sensors", Published by California Energy Commission (CEC Pub.), in 14 pages.
Kore, "Building an intelligent voice controlled mirror," retrieved from the internet on Jul. 11, 2019: https://medium.com/@akshaykore/building-an-intelligent-voice-controlled-mirror-2edbc7d62c9e, Jun. 26, 2017, in 10 pages.
Simple Human Vanity Mirror, available from internet at http://www.bedbathandbeyond.com/store/products/simplehuman-reg-5x-sensor-vanity-mirror/1041483503?categoryId=12028, apparently available Dec. 19, 2013, site visited Dec. 2, 2014.
Simple Human Sensor Mirror, Internet Archive Wayback Machine webpage capture of http://www.tuvie.com/stainless-steel-sensor-mirror-by-simplehuman/, apparently available Jan. 27, 2013, site visited Dec. 2, 2014.
Simplehuman Mini Sensor Mirror, available from internet at http://www.amazon.com/gp/product/B00FZ3MFAA/ref=pd_lpo_sbs_dp_ss_2?pf_rd_p=1944579862&pf_rd_s=lpo-top-stripe-1&pf_rd_t=201&pf_rd_i=B00M8MC5H4&pf_rd_m=ATVPDKIKX0DER&pf_rd_r=0RHFJEABM9QKSWJKK99N#Ask, apparently available Mar. 11, 2014, site visited Jan. 8, 2015.
Simplehuman Sensor Mirror, available from internet at http://www.amazon.com/simplehuman-Sensor-Sensor-Activated-Lighted-Magnification/dp/B00M8MC5H4#customerReviews, apparently available Dec. 31, 2014, site visited Jan. 8, 2015.
Simplehuman Wall Mount Mirror, available from internet at http://www.amazon.com/simplehuman-Wall-Mount-Sensor-Mirror/dp/B00FN92ELG#customerReviews, available at least as early as Jan. 31, 2013, site visited Jan. 8, 2015.
Simplehuman Wide View Sensor Mirror, available from internet at http://www.amazon.com/simplehuman-Wide-View-Sensor-Mirror/dp/B01C2RXD7K, site visited Aug. 9, 2016.
Simplehuman Sensor Mirror Pro Wide-View, available from internet at http://www.simplehuman.com/wide-view-sensor-mirror, site visited Aug. 9, 2016.
Brookstone Shower Mirror, available from internet at http://www.brookstone.com/9-Lighted-Fogless-Shower-Mirror?bkiid=?SubCategory_Bath_Spa_Mirrors_Lighting_Makeup_Mirrors%7CSubCategoryWidget%7C608364p&catId=n/, apparently available Jan. 15, 2013, site visited Dec. 2, 2014.
Jerdon Wall Mounted Mirror, available from internet at http://www.amazon.com/Jerdon-HL1016NL-9-5-Inch-Lighted-Magnification/dp/B00413G9K2/ref=sr_1_26?ie=UTF8&qid=1420579897&sr=8-26&keywords=wall+mounted+mirror#customerReviews, apparently available Feb. 21, 2009, site visited Jan. 8, 2015.
Jerdon Wall Mounted Mirror, available from internet at http://www.amazon.com/Jerdon-JD7C-9-Inch-Lighted-Magnification/dp/B001DKVC08/ref=sr_1_54?ie=UTF8&qid=1 420580127&sr=8-54&keywords=wall+mounted+mirror, apparently available Oct. 6, 2010, site visited Jan. 8, 2015.
Zadro Z'fogless Mirror with Light, available from internet at http://www.amazon.com/Zadro-1X-Zfogless-Adjustable-Magnification/dp/B000ARWLIW/ref=sr_1_16?s=beauty&ie=UTF8&qid=1439229012&sr=1-16&keywords=zadro+lighted+fogless+mirror, apparently available Nov. 27, 2006, site visited Aug. 10, 2015.
U.S. Appl. No. 15/073,990, filed Mar. 18, 2016, Yang et al.
Jerdon, Model JRT910CL5X Magnified Lighted Tabletop Rectangular Mirror, Chrome Finish, 67.2 Ounce, https://www.amazon.com/Jerdon-JRT910CL-Magnified-Tabletop-Rectangular/dp/B00N1WE3UC?th=1, Jun. 2015, in 8 pages.
Pinterest, Plug-in wall-mount makeup mirror has adjustment handle, https://www.pinterest.com/pin/856035841641838288/?d=t&mt=login, in 3 pages.
Sharper Image, Model JRT718CL Product Specification, Slimline Series LED Lighted Wall Mount Mirror, copyright 2015, https://www.ameraproducts.com/Shard/ProductLitirature/Jerdon/JRT718CLamera.pdf, in 1 pages.
Sharper Image, Model JRT950NL , Slimline LED Lighted Tabletop 8X Magnification Mirror, https://www.amazon.com/Sharper-Imange-JRT950NL-Slimline-Magnification/dp/B015W76T3M?th=1, Jan. 20, 2016, in 8 pages.

\* cited by examiner

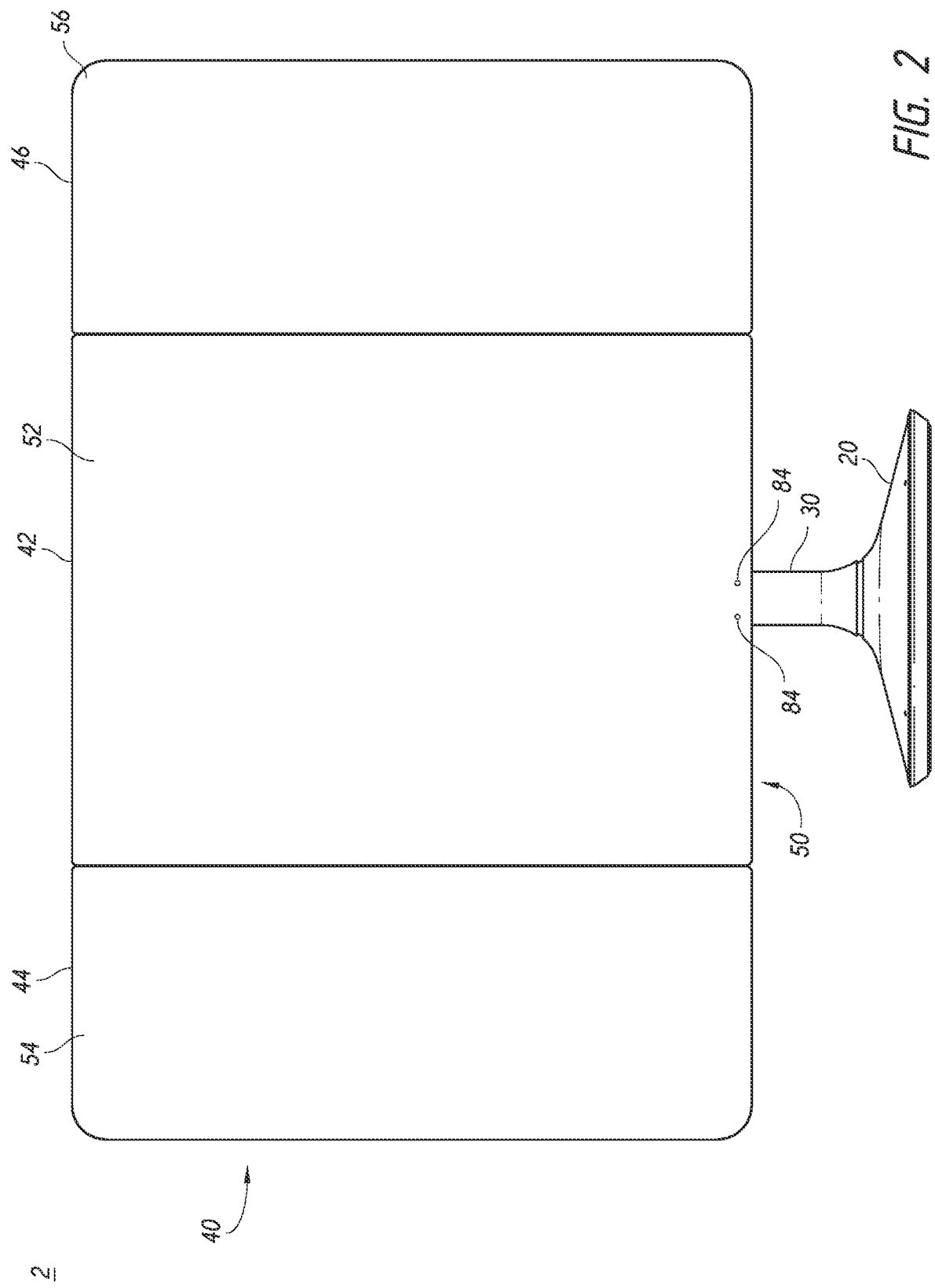

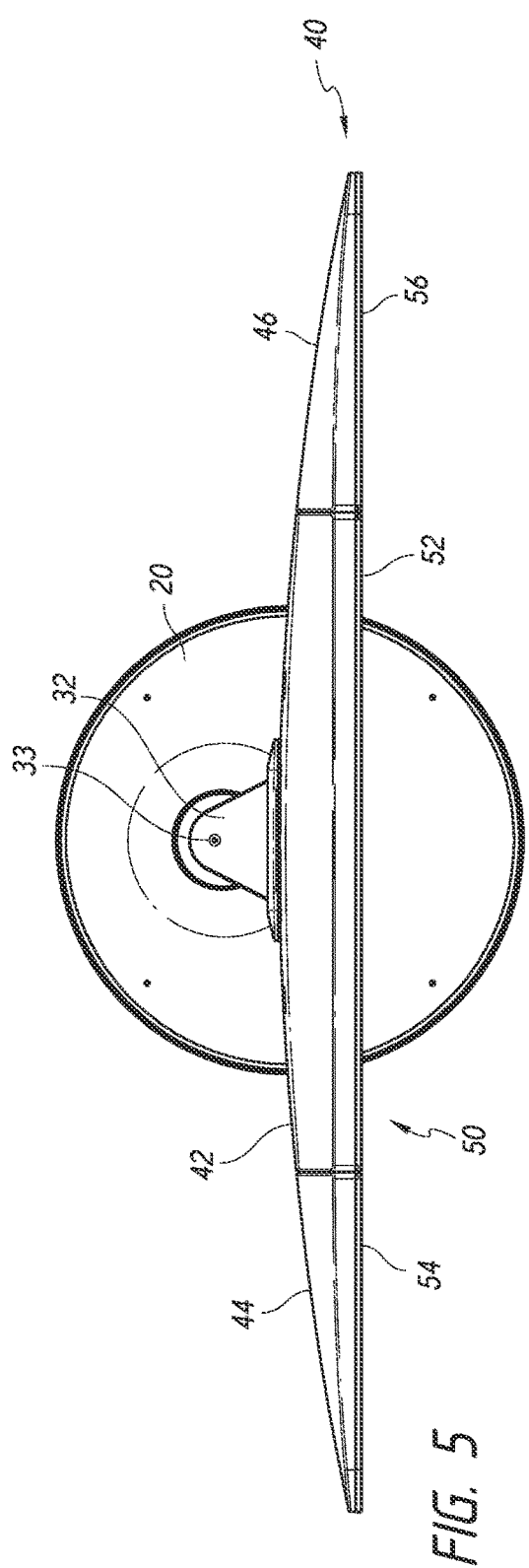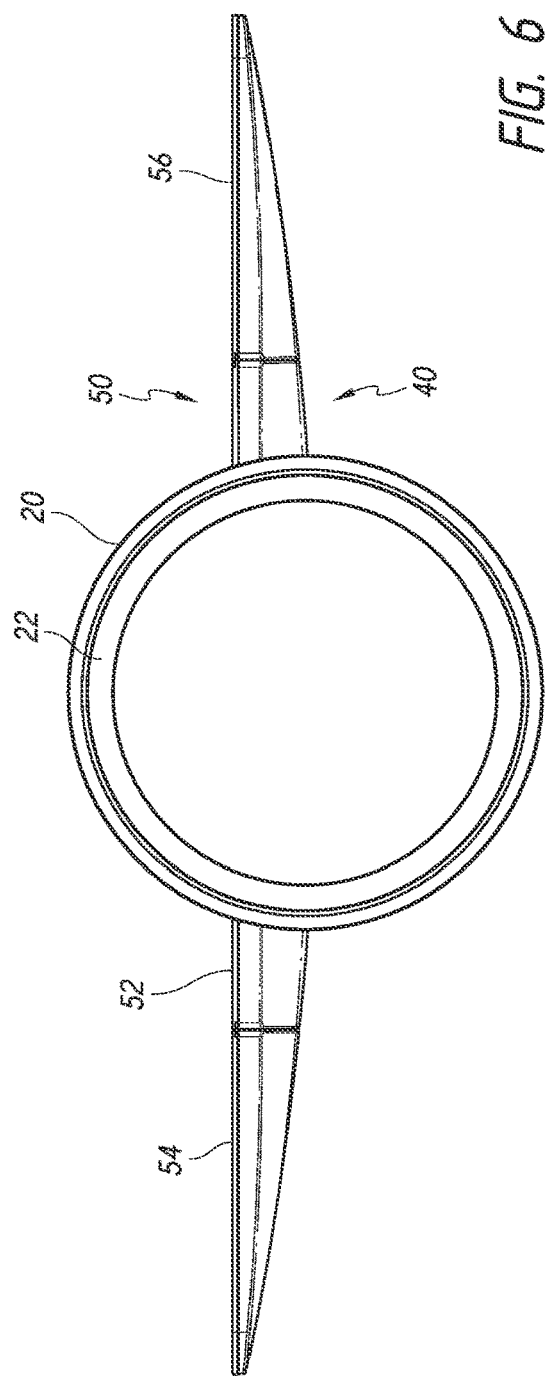

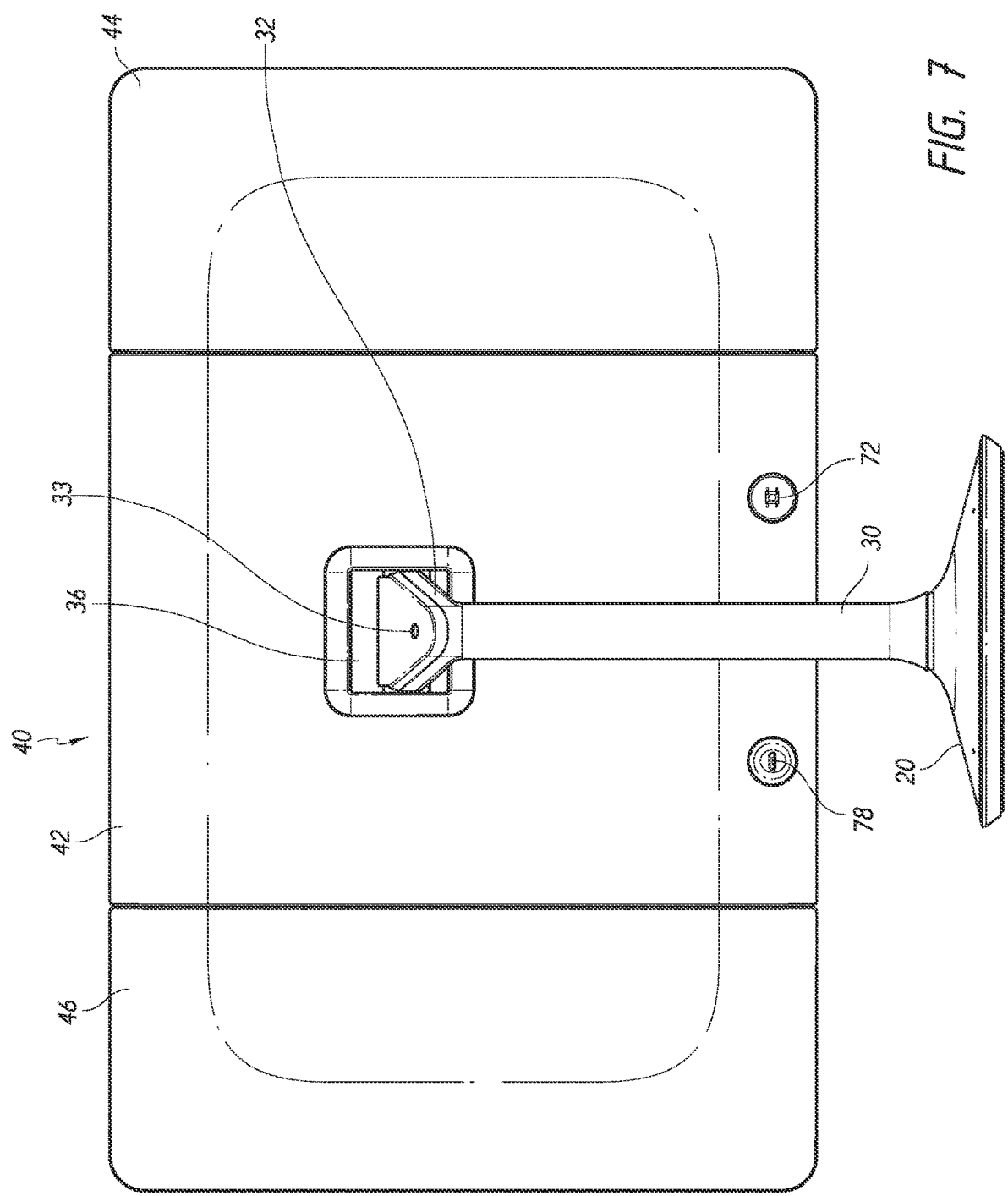

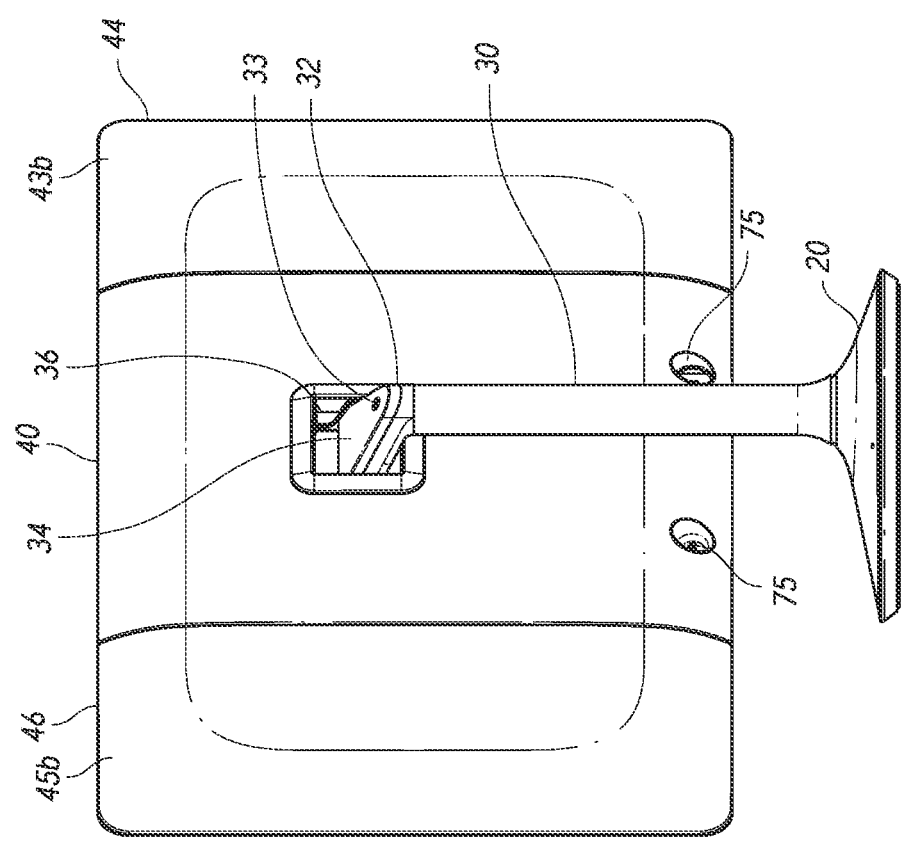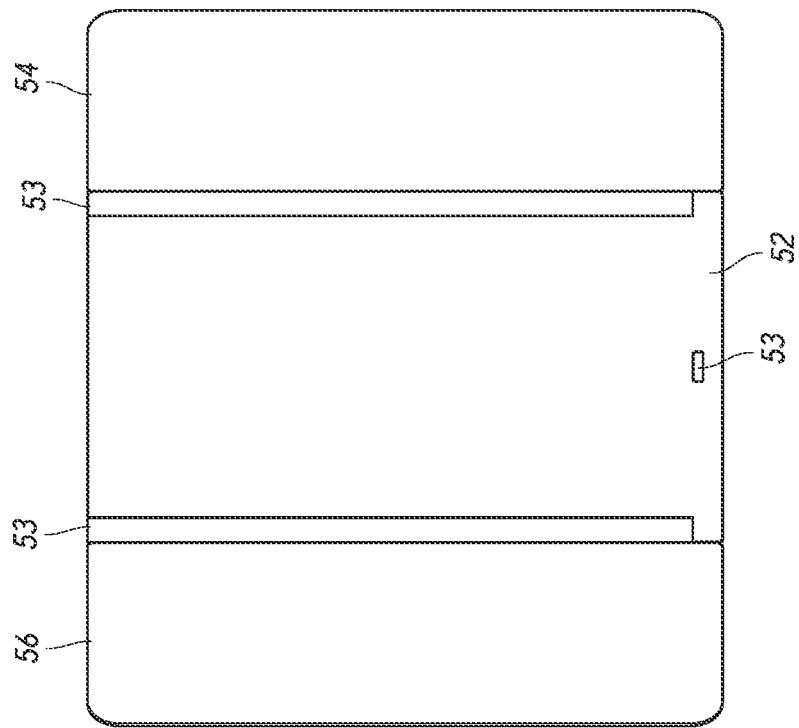
FIG. 9

VANITY MIRROR

CROSS-REFERENCE TO RELATED APPLICATIONS

This present application is a continuation of U.S. application Ser. No. 15/930,287, filed May 12, 2020 of which is a continuation of U.S. application Ser. No. 16/103,363, filed Aug. 14, 2018, which is a continuation of Ser. No. 15/060,080, filed Mar. 3, 2016, now U.S. Pat. No. 10,076,176, which claims priority benefit under 35 U.S.C. § 119(e) to U.S. Provisional Application No. 62/129,205, filed Mar. 6, 2015, entitled "VANITY MIRROR," which is hereby incorporated by reference in its entirety.

BACKGROUND

Field

The present disclosure relates to reflective devices, such as mirrors.

Description of the Related Art

Vanity mirrors are mirrors that are typically used for reflecting an image of a user during personal grooming, primping, cosmetic care, or the like. Vanity mirrors are available in different configurations, such as free-standing mirrors, hand-held mirrors, mirrors connected to vanity tables, wall mirrors, car mirrors, and/or mirrors attached to or produced by electronic screens or devices.

SUMMARY

In some embodiments, a mirror system comprises a head comprising a first mirror assembly, at least a second mirror assembly disposed laterally adjacent to the first mirror assembly and in mechanical communication with the first mirror assembly via a pivoting member that is configured to allow movement of the second mirror assembly with respect to the first mirror assembly, such that a reflective face of the first mirror assembly and a reflective face of the second mirror assembly are configured to form a plurality of angles $\alpha$ relative to each another. In some embodiments, the mirror system can comprise at least one light source disposed on or in a lateral side of the first mirror assembly, the light source comprising a plurality of light emitting sources (e.g., at least a first light emitting diode and a second light emitting diode) having different color temperatures and disposed to emit light in a general direction along a length of a first light path; and wherein the first light path is disposed so that the length of the first light path is adjacent to at least a portion of a periphery of the second mirror assembly; and a controller configured to adjust relative light intensities of the first light emitting diode and the second light emitting diode.

In some embodiments, one or more electronic features or settings or characteristics of the mirror system, such as light brightness or light temperature or battery level, can be viewed, selected, and/or adjusted remotely by a mobile electronic device, such as by way of a wireless communication protocol and/or using a software module or app on the mobile electronic device.

Some embodiments provide a mirror assembly or mirror system comprising a head. In some embodiments, the head comprises a first mirror/first mirror assembly. In some variants, the head further comprises a second mirror/second mirror assembly, disposed adjacent to the first mirror assembly. In certain implementations, the second mirror is disposed laterally adjacent to the first mirror assembly. In some variants, the first and second mirror assemblies are in mechanical communication with the first mirror via a hinge. In some variants, the hinge is configured to allow movement of the second mirror assembly with respect to the first mirror assembly such that a reflective face of the first mirror assembly and a reflective face of the second mirror assembly are configured to form a plurality of angles (e.g., a) relative to each another. In various embodiments, the angle $\alpha$ between the first and second mirror assemblies (or of reflective surfaces thereof) ranges from about 90° to about 180°.

Any of the embodiments described above, or described elsewhere herein, can include one or more of the following features.

Certain implementations of the mirror system further comprise a light source. In some embodiments, the light source is disposed on a lateral side of the first mirror assembly. In some variants, the light source comprises a light emitting diode. In some embodiments, the light source comprises a first light emitting diode and a second light emitting diode disposed to emit light in a general direction along a length of a first light path. In some variants, the first light path is disposed so that the length of the first light path is adjacent to at least a portion of a periphery of the second mirror assembly.

In some implementations, the mirror assembly/system comprises a controller configured to adjust relative light intensities of the first light emitting diode and the second light emitting diode to selectively simulate a plurality of different lighting environments including natural sunlight and indoor light. In multiple variants, the first light emitting diode emits light of a first color temperature and the second light emitting diode emits light of second, different color temperature. In certain embodiments, the first light emitting diode emits light of a first color and second light emitting diode emits light of second, different color.

In certain embodiments, the controller allows a user to control one or more of the color, brightness, or color temperature of light emitted from the light source. In some variants, the controller allows a user to produce an emitted light from the light source having a color temperature in a range from about 2700 K to about 6500K.

In certain variants, the controller comprises a capacitive touch sensor in electronic communication with the light source and configured to transmit information sent by a user to the light source. In some embodiments, the controller receives commands sent by a user. In certain variants, the user can send information to the controller using one or more of a computer, a mobile device, or a NEST® system. In some embodiments, the computer, the mobile device, or the NEST® system is in wireless communication with the controller. In certain variants, the computer is a handheld device (e.g., a smartphone or the like).

The some implementations, the mirror system/mirror assembly further comprises a sensor assembly comprising a transmitter. In some embodiments, the mirror system/mirror assembly further comprises a sensor assembly comprising a receiver. In some variants, the sensor is configured to relay information to the controller.

In some implementations, the sensor assembly comprises one or more of a housing, a gasket, and a cover. In some variants, the housing supports the transmitter and/or the receiver. In certain embodiments, the gasket provides a seal between the cover and the housing. In some variants, the gasket prevents signal (e.g., electromagnetic radiation) from bleeding from the transmitter to the receiver.

In some implementations, the mirror assembly or mirror system further comprises a third mirror/third mirror assembly. In some embodiments, the third mirror assembly is laterally adjacent to the first mirror assembly or the second mirror assembly. In some variants, the third mirror assembly is disposed on a side of the first mirror assembly opposite the second mirror assembly. In some embodiments, the third mirror assembly is in communication with the first mirror assembly or the second mirror assembly via a hinge. In some embodiments, the hinge is configured to allow movement of the third mirror assembly with respect to the first mirror such that a reflective face of the first mirror and a reflective face of the third mirror are able to form angles α' relative to one another.

In some variants, the mirror system comprises a second light source. In some implementations, the second light source is disposed to a side of the first mirror assembly and is configured to emit light in a general direction along a second light path. In multiple variants, the second light path is disposed so that the length of the second light path is adjacent to at least a portion of a periphery of the third mirror assembly.

In some implementations, a first light source is disposed between the first mirror assembly and the second mirror assembly and a second light source is disposed between the first mirror assembly and the third mirror assembly.

In some variants, where a hinge is provided, the hinge comprises a cam. In certain implementations, the hinge is configured to reduce the distance between mirror assemblies during opening of the hinge.

In certain implementations, the mirror assembly further comprising a light scattering region disposed along the length of a light path. In certain implementations, the light scattering region has a gradient of light scattering elements. In some embodiments, the gradient has a lower density of light scattering elements nearer one or more light emitting diodes and a higher density of light scattering elements farther from the light emitting diodes. In some embodiments, the light scattering elements are configured to encourage a portion of light contacting the light scattering region to be emitted out of the light path and toward a user of the mirror assembly. In certain embodiments, this emission facilitates a substantially constant amount of light emitted along the length of the light path.

In various embodiments, the mirror assembly or mirror system further comprises a shaft portion connected to the head portion. In some embodiments, the head portion and the shaft portion are connected by a joint that allows movement of the head with respect to the shaft. In some embodiments, the joint is a pivoting joint.

In some embodiments, the mirror system further comprises a base portion. In some implementations, the base portion is connected to the shaft portion at a distal side of the shaft with respect to the head portion. In certain variants, the base portion is configured to support the mirror assemblies and to allow the mirror assembly to stand substantially upright on a surface.

In some variants, the mirror system comprises an additional mirror. In some embodiments, the additional mirror is configured to reversibly adhere to one or more mirror assemblies to provide an additional view of a user. In some embodiments, the mirror assembly has a storage slot, port, etc. that allows storage of the additional mirror out of sight of the user (when the additional mirror is not in use).

In certain embodiments, the mirror assembly comprises an alarm feature that provides a sensory cue to a user. In some embodiments, the mirror assembly comprises an LCD screen disposed behind a portion of a reflective mirror surface. In some implementations, the LCD is visible only when activated. In multiple variants, the LCD screen provides visual information to a user.

Certain embodiments provide a method of manufacturing a mirror assembly. In some embodiments, the method comprises coupling a first mirror section to a second mirror section. In some embodiments, the first mirror section and the second mirror section are connected using a hinge. In some variants, the method comprises disposing a light source comprising a one or more light emitting diodes to a side of a mirror section. In some embodiments, the method comprises disposing a controller within the mirror assembly, the controller configured to adjust one or more features of the mirror assembly (e.g., relative light intensities of a first light emitting diode and a second light emitting diode). The controller can be configured to communicate wirelessly with a mobile communication device in a manner that permits the mobile communication device to provide one or more instructions to the controller regarding actuation of the plurality of different lighting states by the mirror assembly.

BRIEF DESCRIPTION OF THE DRAWINGS

The features of the mirror systems and assemblies disclosed herein are described below with reference to the drawings of certain embodiments. The illustrated embodiments are intended to demonstrate, but not to limit, the present disclosure. The proportions and relative dimensions and sizes of each component as shown in these drawings forms part of the supporting disclosure of this specification, but should not be limiting on the scope of this specification, except to the extent that such proportions, dimensions, or sizes are included in any individual claims. The drawings contain the following Figures:

FIG. 2 illustrates a front view of the embodiment of FIG. 1.

FIG. 5 illustrates a top view of the embodiment of FIG. 1.

FIG. 6 illustrates a bottom view of the embodiment of FIG. 1.

FIG. 7 illustrates a rear view of the embodiment of FIG. 1.

FIG. 9 illustrates a partially exploded rear perspective view of an embodiment of the mirror assembly with the reflective surfaces removed.

DETAILED DESCRIPTION OF CERTAIN EMBODIMENTS

Certain embodiments of a mirror assembly are disclosed in the context of a portable, freestanding vanity mirror, as it has particular utility in this context. However, the various aspects of the present disclosure can be used in many other contexts as well, such as wall-mounted mirrors, mirrors mounted on articles of furniture, automobile vanity mirrors (e.g., mirrors located in sun-visors), and otherwise. None of the features described herein are essential or indispensable. Various types of vanity mirrors are provided in U.S. Patent Application Publication No. 2013/0235610, published on Sep. 12, 2013, which is incorporated herein by reference for all that it discloses. Any feature, structure, or step disclosed anywhere in this specification can be replaced with, or combined with any other feature, structure, or step disclosed elsewhere in this specification, including in U.S. Patent Application Publication No. 2013/0235610. Any features, structure, or step disclosed herein can be omitted. While the illustrated examples include features designated by numbers used herein, these features need not be present in all embodiments. Further, for purposes of summarizing the disclosure, certain aspects, advantages, and features of the inventions have been described herein. However, not all embodiments include or achieve any or all of those aspects, advantages, and features.

Many vanity mirrors distort the reflected image because of, for example, poor quality reflective surfaces, harsh light sources, and/or uneven distribution of light. Additionally, the light sources of conventional vanity mirrors are typically energy inefficient. Further, the light sources of conventional vanity mirrors are not adjustable or are difficult to effectively adjust.

Figure 4:
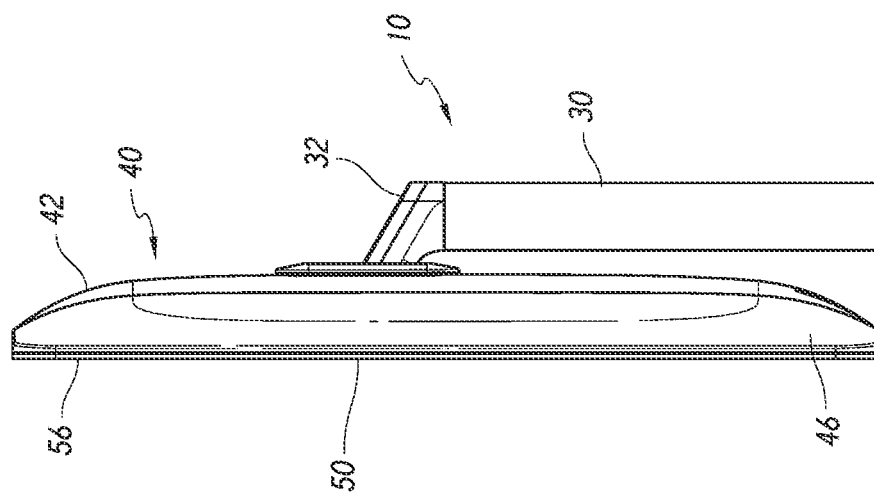
FIGS. 3 and 4 illustrate side views of the embodiment of FIG. 1.
Figure 3:
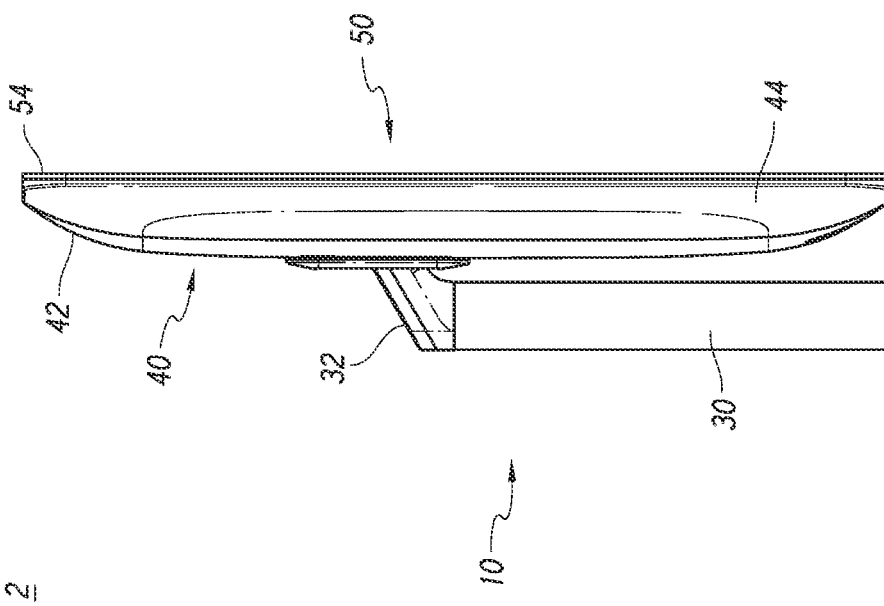

Certain embodiments disclosed herein pertain to a mirror assembly 2. As shown in FIGS. 1-6, the mirror system or assembly 2 can include a visual image reflective surface, such as a mirror 50. In certain embodiments, the mirror system or assembly 2 comprises a housing portion 10. As shown in FIGS. 3 and 4, the housing portion 10 can include a head portion 40, a shaft portion 30, and/or a base portion 20. In some implementations, the housing portion 10 can include a pivot portion 32 connecting the head portion 40 and the shaft portion 30. In certain embodiments, the mirror system or assembly 2 comprises one or more light sources.

In some embodiments, certain components of the housing portion 10 can be integrally formed or separately formed and connected together to form the housing portion. The housing portion 10 can comprise plastic, metal (e.g., stainless steel, aluminum, etc.) composite, or other suitable materials.

Figure 1:
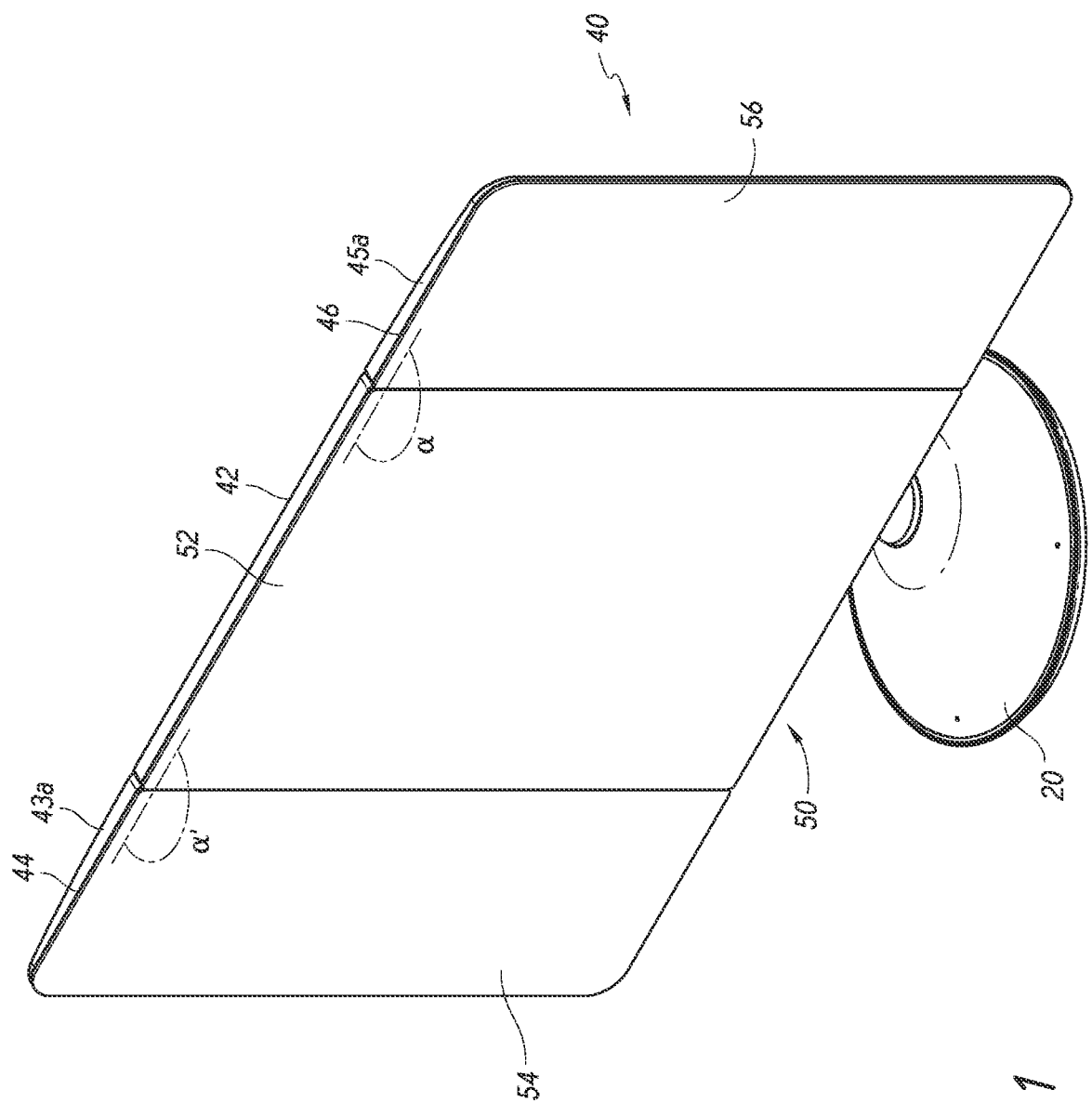
FIG. 1 illustrates a perspective view of an embodiment of a mirror assembly.

In some embodiments, the head portion 40 comprises a mirror 50. In certain variants, the head portion comprises a single section/assembly or a plurality of sections/assemblies (e.g., two, three, four, five, or more sections) optionally comprising mirrored surfaces. As shown collectively in FIGS. 1-7, in some implementations, the head portion 40 comprises a central section 42 (e.g., a primary section/ primary mirror assembly) comprising a central mirror surface 52 and one or more flanking additional sections (e.g., secondary sections/secondary assemblies). In some variants, as shown in FIG. 1, the head portion 40 can comprise a left section 44 (e.g., a first additional section) comprising a first side mirror surface 54 and a right section 46 (e.g., a second additional section) comprising a second side mirror surface 56. In some embodiments, as illustrated, the central mirror surface 52 has a greater surface area (e.g., is larger) and/or a greater width than either of the individual first or second side mirror surfaces 54, 56. In some embodiments, as illustrated, the central mirror surface 52 has a width that is at least as wide as an average human face of the target population that is expected to use the mirror assembly 2, and each of the first and second side mirror surfaces 54, 56 has a width that is smaller than the width of an average human face of the target population that is expected to use the mirror system or assembly 2. In some embodiments, the central mirror surface 52 has a width that is at least: about 4", about 5", about 6", about 7", or about 8". In some variants, the first and second side mirror surfaces 54, 56 independently have widths that are at least: about 90%, about 80%, about 70%, about 60%, about 50%, about 40%, about 30%, about 20%, or about 10% of the width of the central mirror surface 52. As shown, in some embodiments, the vertical height of each of the mirror sections (e.g., mirror surfaces 52, 54, 56) can be approximately the same. While the mirror assembly 2 of FIG. 1 comprises a central section 42 laterally adjacent to (or in between) one or more of additional sections 44, 46 (e.g., mirrored surfaces), this configuration is merely illustrative and it should be appreciated that other configurations and section positions are possible. For instance, in certain variants, the central section can have one or more sections to the top, bottom, sides, and/or diagonal directions. In some embodiments, a central mirror is not required and alternative configurations (e.g., side-by-side and top-bottom) are possible.

Figure 8:
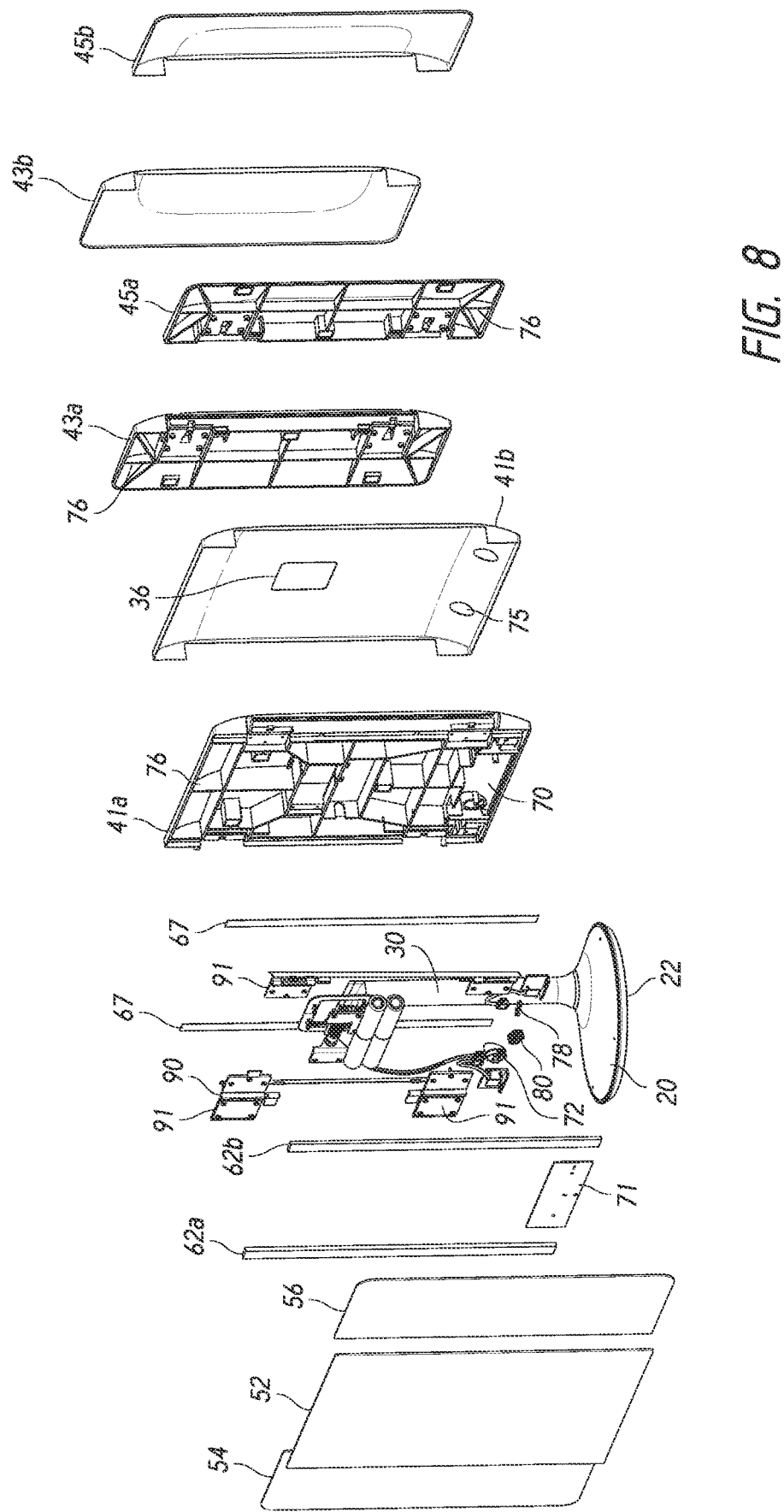
FIG. 8 illustrates an exploded view of an embodiment of the mirror assembly.

As shown in FIG. 8, the sections can further comprise support frames and/or backings. For instance, the central section 42 can comprise one or more of a central mirrored surface 52, a support frame 41a, and a support backing 41b. In some variations, the left section 44 can comprise one or more of a mirrored surface 54, a support frame 43a, and a support backing 43b. In certain embodiments, the right section 46 can comprise one or more of a mirrored surface 56, a support frame 45a, and a support backing 45b. These frames and backings can provide additional stability and/or rigidity to the individual sections and to the mirrored surfaces. The frames and backings can also provide a matrix to support electronic components and other devices (e.g., light sources) of the mirrored assembly 2, holding them in place. In some embodiments, the matrices within the frames 41a, 43a, 45a act as heat dissipaters for internal components. In certain variants, the sections 42, 44, 46 comprise mirrored surfaces without frames and backings. In certain variants, each section can provide a platform on which one or a plurality of mirrors can be attached. In some embodiments, the head portion can comprise a single section without additional sections.

Figure 10:
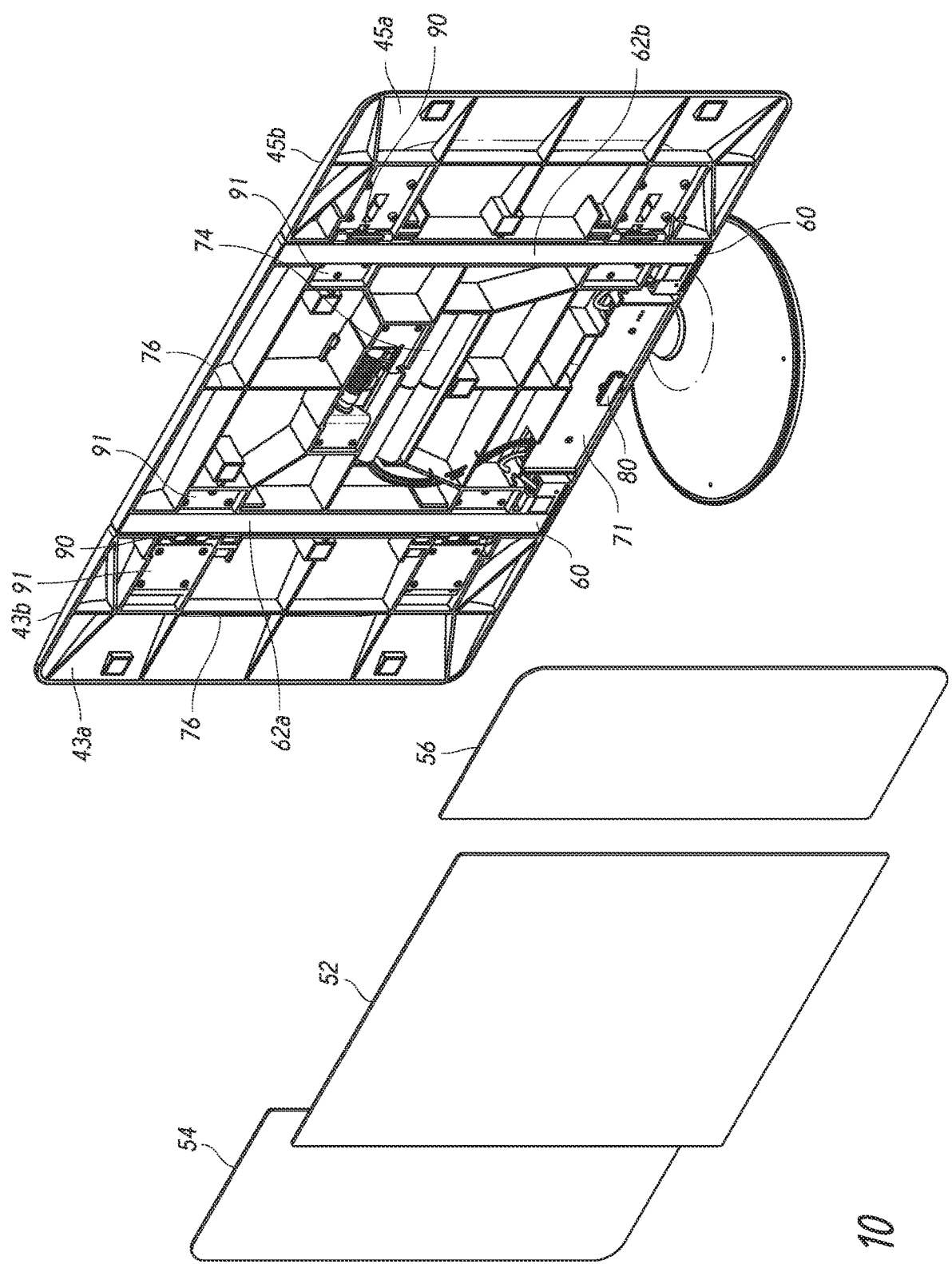
FIG. 10 illustrates a partially exploded front perspective view of an embodiment of the mirror assembly with the reflective surfaces removed.
Figure 11:
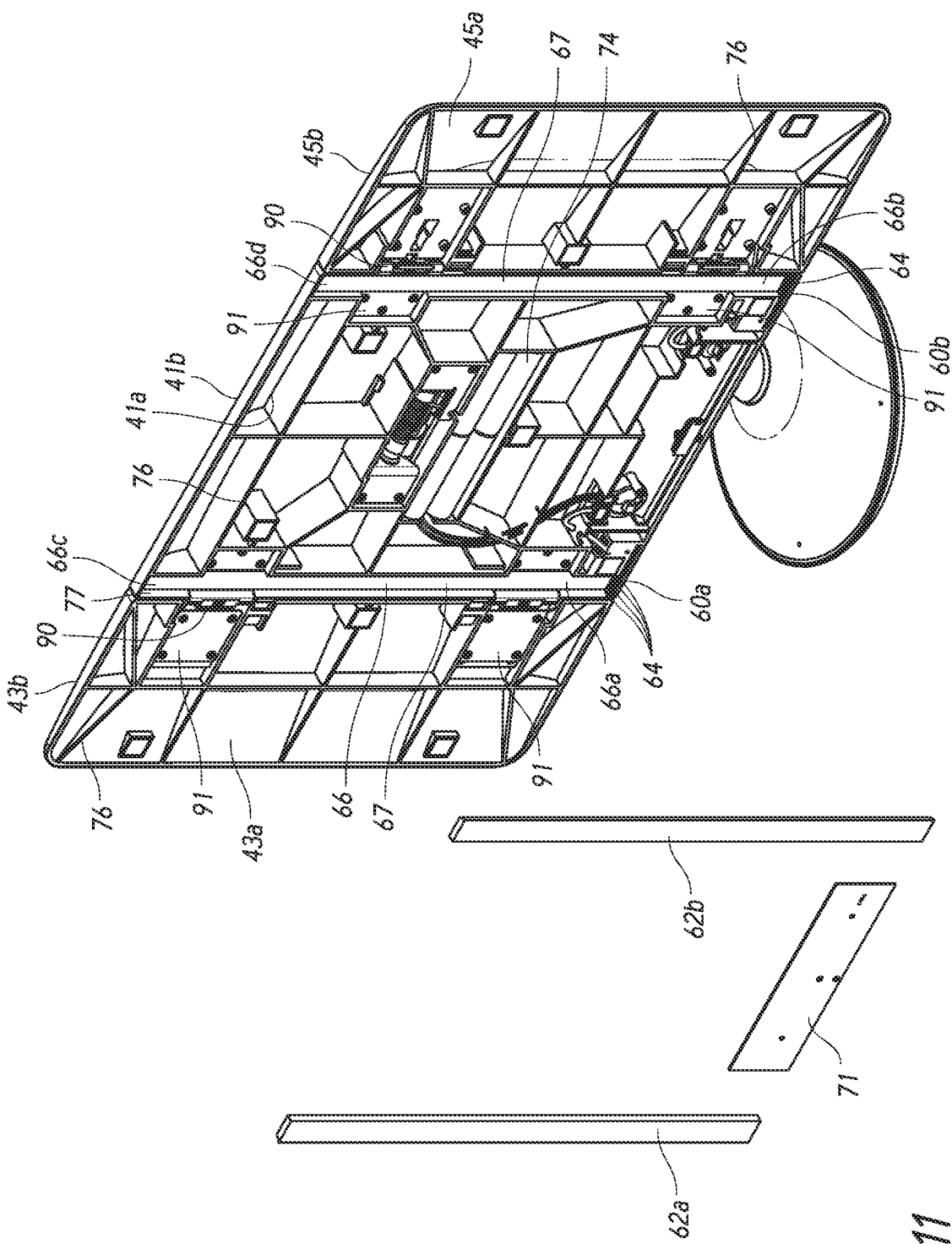
FIG. 11 illustrates a partially exploded perspective front view of an embodiment of the mirror assembly.
Figure 13:
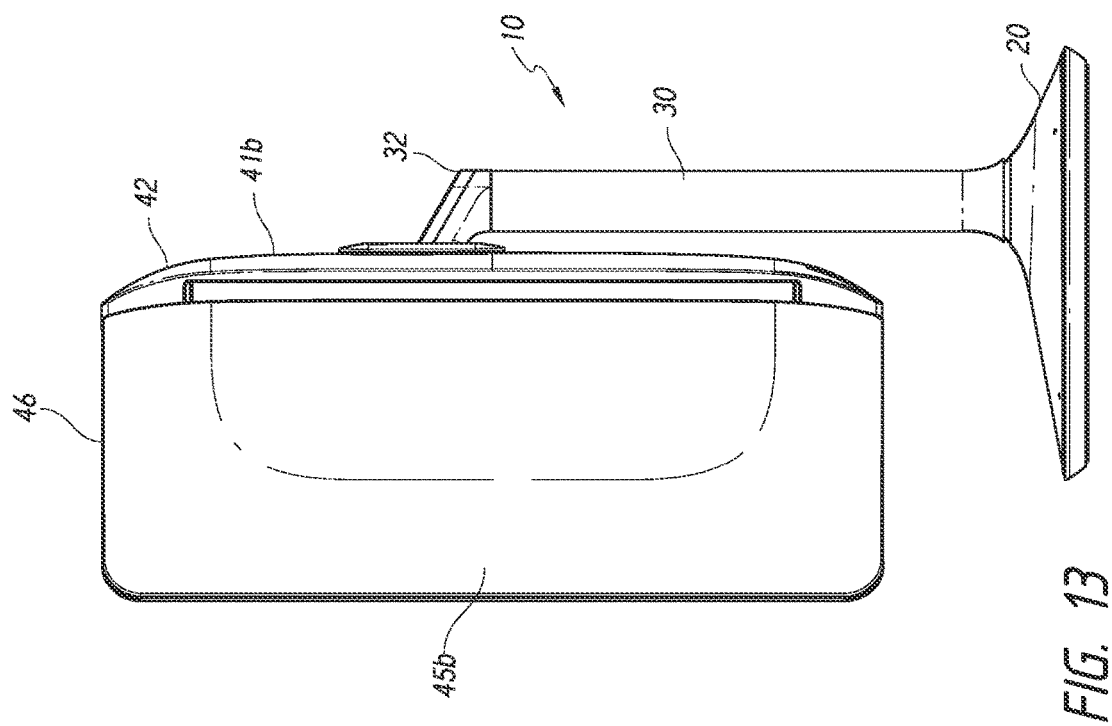
FIG. 13 illustrates a side view of the configuration of FIG. 12.

In some variants, the head portion 40 comprises one or more mechanisms to actively and/or passively dissipate, transfer, or radiate heat energy away from heat-producing features (e.g., a light source, transistors, memory components, power sources, etc.). In some embodiments, as shown in FIG. 8, the mirror assembly can comprise an active heat dissipater such as a fan 72. In some embodiments, as shown in FIGS. 8 and 9, the mirror assembly can comprise passive heat dissipaters such as vents 75. In certain implementations, as shown in FIGS. 10 and 11, the mirror assembly 2 may comprise one or more passive heat dissipating radiating structures 76 (e.g., walls, ribs, blades, ridges, etc.). In some implementations, the radiating structures 76 provide additional structural support to one or more mirror assembly features. In some embodiments, the radiating structures 76 can include one or more components that are generally comparatively long in one dimension, generally comparatively wide in another dimension, and generally comparatively narrow in another dimension, to provide a large surface area over a thin surface to conduct heat efficiently and away from heat-sensitive electronic components in the mirror assembly 2. For example, the length of a passive heat dissipating structure can be substantially greater than the width of the heat dissipating structure, and the width of the heat dissipating structure can be substantially greater than the thickness.

The heat dissipating structures can be formed of materials with a high rate of heat conduction, such as aluminum or steel, to help remove heat generated by heat-producing features from the mirror assembly. Many other heat-dissipating materials, such as copper or brass, can be used. For active heat dissipation, plastics and other non-conductive materials are suitable.

In some embodiments, the head portion 40 can include a compartment 70 located in the head portion 40 of the mirror assembly 2 for receiving a heat dissipating structures (e.g., a fan 72).

In some embodiments, the radiating structures 76 or portions of the radiating structures are configured to conduct electricity to mirror assembly 2 features requiring power (e.g., light sources, fans, circuitry, etc.). This electrical conduction reduces the total number of necessary components. In some embodiments, the heat dissipating structures 72, 76 can be electrically connected via conduits 73*a* (e.g., wires) to a power source 74 (e.g., batteries packs, electrical outlets etc.) and/or circuit boards. In some embodiments, the power source 74 provides electric power and signals to the fan 72. In some embodiment, other electronic components can be connected to power sources and/or control systems via conduits. For example, in certain variants, light sources 60 for the mirror assembly 2 can be electrically connected via conduits 73*b* (e.g., wires) or conducting features (e.g., conductive portions of the frame or backing) to a power source 74 (e.g. batteries packs, etc.). In some embodiments, light sources 60 can be connected to power sources via circuit boards that provide, in addition to electric power, signals and/or data to the light sources 60.

In some embodiments, the temperature of heat generating components (e.g., light sources 60, etc.) can be controlled to be less than or equal to about 70° F. using the heat dissipating structures. In some embodiments, the temperature of the light sources 60 can be controlled to be between about 50° F. and 60° F. using heat-dissipating structures. In certain implementations, the active heat dissipating structures can be controlled by circuit boards and processing units to automatically dissipate heat from the light sources once a certain temperature is achieved (e.g., at least about 70° F., 80° F., 90° F., 100° F., 120° F., 140° F., etc.). In some embodiments, the fan 72 is controlled (e.g., by an algorithm, a controller, etc.) to dissipate heat above a certain temperature.

Figure 12:
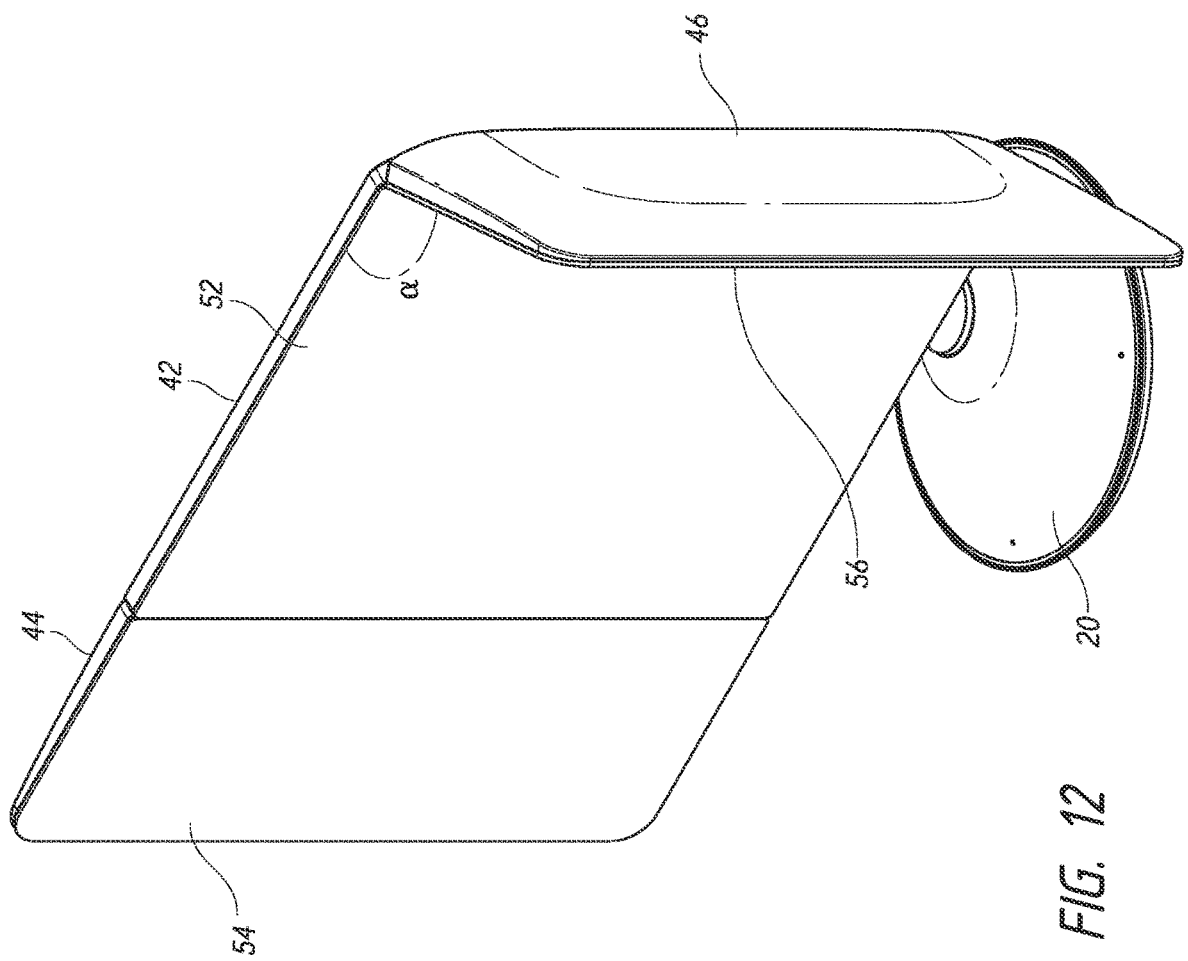
FIG. 12 illustrates a configuration of the embodiment of FIG. 1.

In some embodiments, one or more of the sections are independently adjustable or articulatable or rotatable with respect to one or more of the other sections, such as in various opened or closed positions. A fully opened position can exist, for example, where one or more mirrored surfaces of adjacent mirrored sections form an a angle (or a') that is equal to or greater than about 180° (e.g., adjacent mirrored surfaces that are essentially flush or form obtuse angles with respect to each other, such that each of the adjacent mirrored surfaces are essentially co-planar). A partially opened position can exist, for example, where one or more surfaces of adjacent mirrored sections form an a angle that is equal to or greater than about 90° and less than about 180°. A partially closed position can exist, for example, where one or more surfaces of adjacent mirrored sections creates an angle α that is less than about 90° and greater than about 10°. A fully closed position can exist, for example, where one or more surfaces of adjacent mirrored sections create an angle α that is less than or equal to about 10°, such as in a storage or compact or travel mode. In some embodiments, the mirror assembly 2 can comprise or can be configured to be oriented or positioned in and/or between any one or any combination of the following positions: fully opened, partially opened, partially closed, and/or fully closed. An "opened" position encompasses both a "fully opened" and a "partially opened" position; and a "closed" position encompasses both a "fully closed" and a "partially closed" position. In some embodiments, as shown, when at least two mirror sections are partially open or partially closed with respect to each other, the mirror assembly 2 is configured to enable a user to view a side or rear portion of the user's head or face, when the user is facing forward into the mirror assembly 2, a view that would not normally be visible in an essentially planar orientation or fully open position of the mirror assembly 2. In certain implementations, the left section 44 and right section 46 can be independently or cooperatively placed in closed positions or opened positions. In certain embodiments, as shown in FIGS. 1 and 12, the sections 42, 44, 46 of the head portion 40 are independently adjustable. In some embodiments, the sections of the head portion are cooperatively adjustable and as, for example, the left section is moved to an angle α with respect to the central section, the right section automatically moves to approximately that same angle α. In some embodiments, the sections 42, 44, 46 are independently positionable and movable with respect to one or more of the shaft portion 30, the base portion 20, and/or with respect to other head portion sections.

Figure 14A:
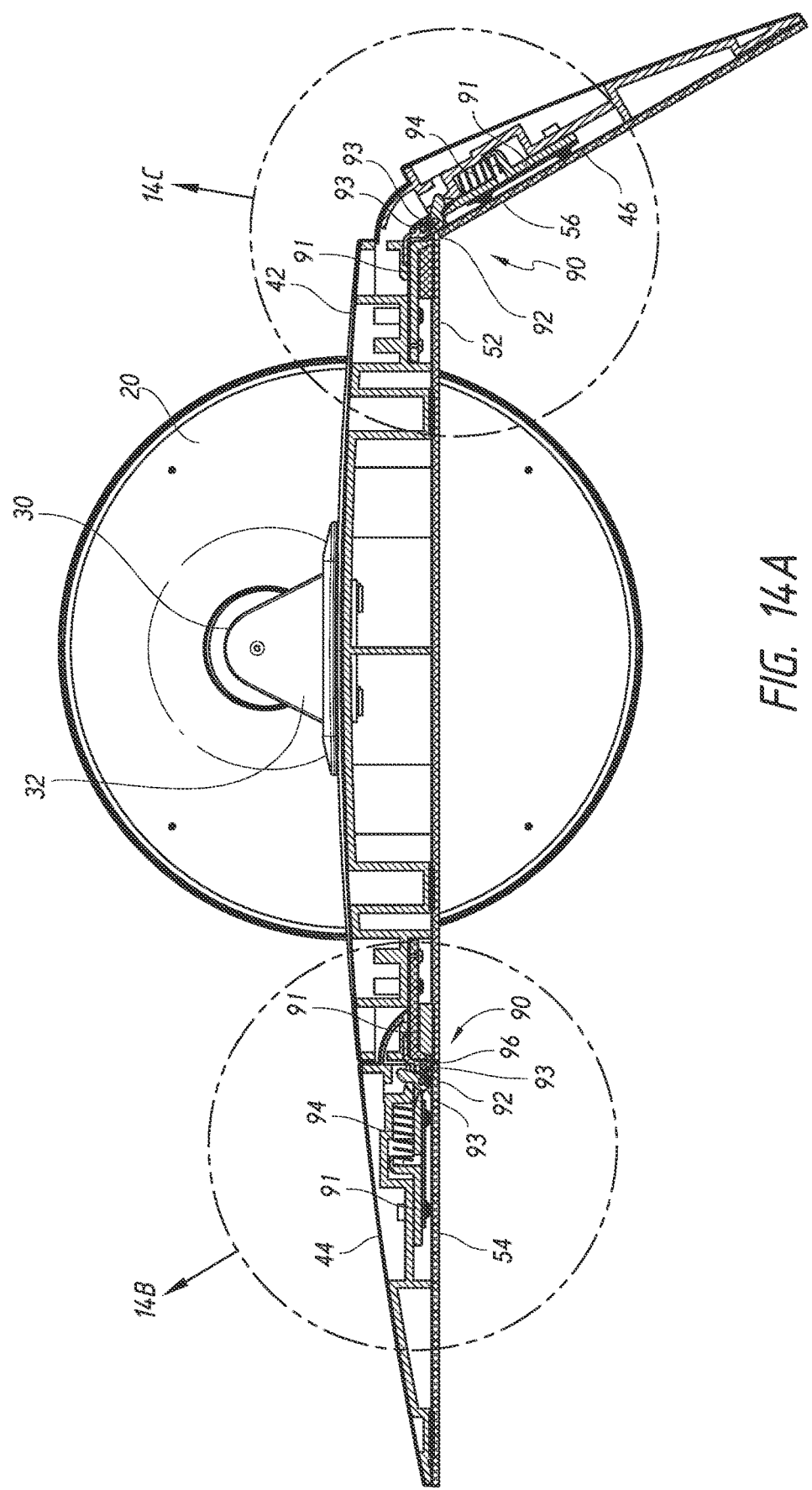
FIGS. 14A-C illustrate cross-sectional top views of the embodiment of FIG. 12.
Figure 14B:
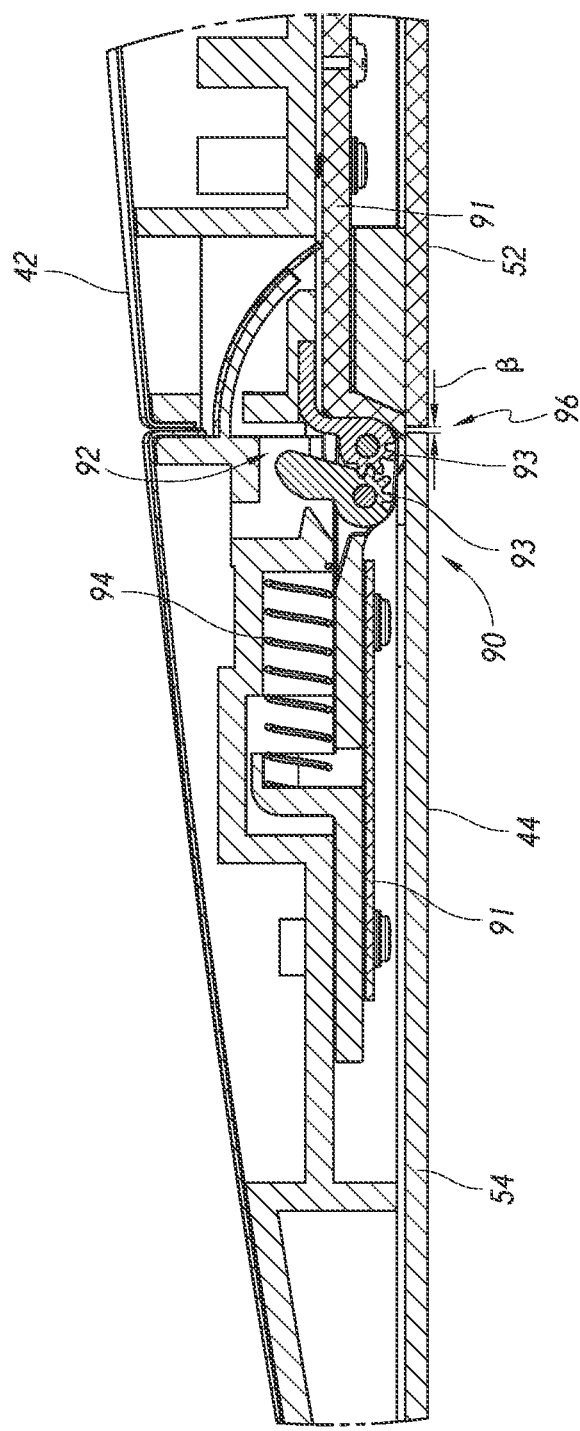
Figure 14C:
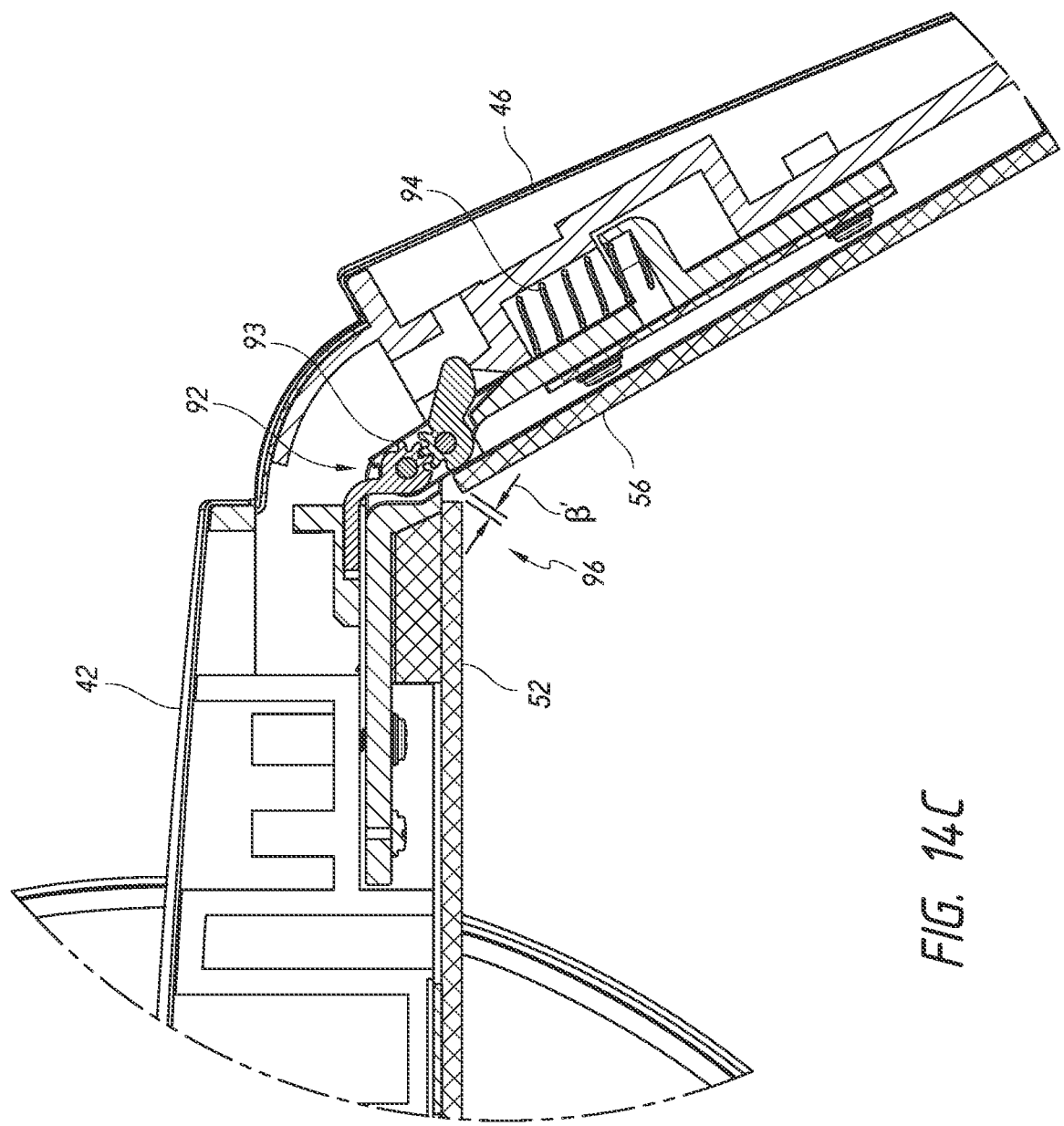
Figure 15:
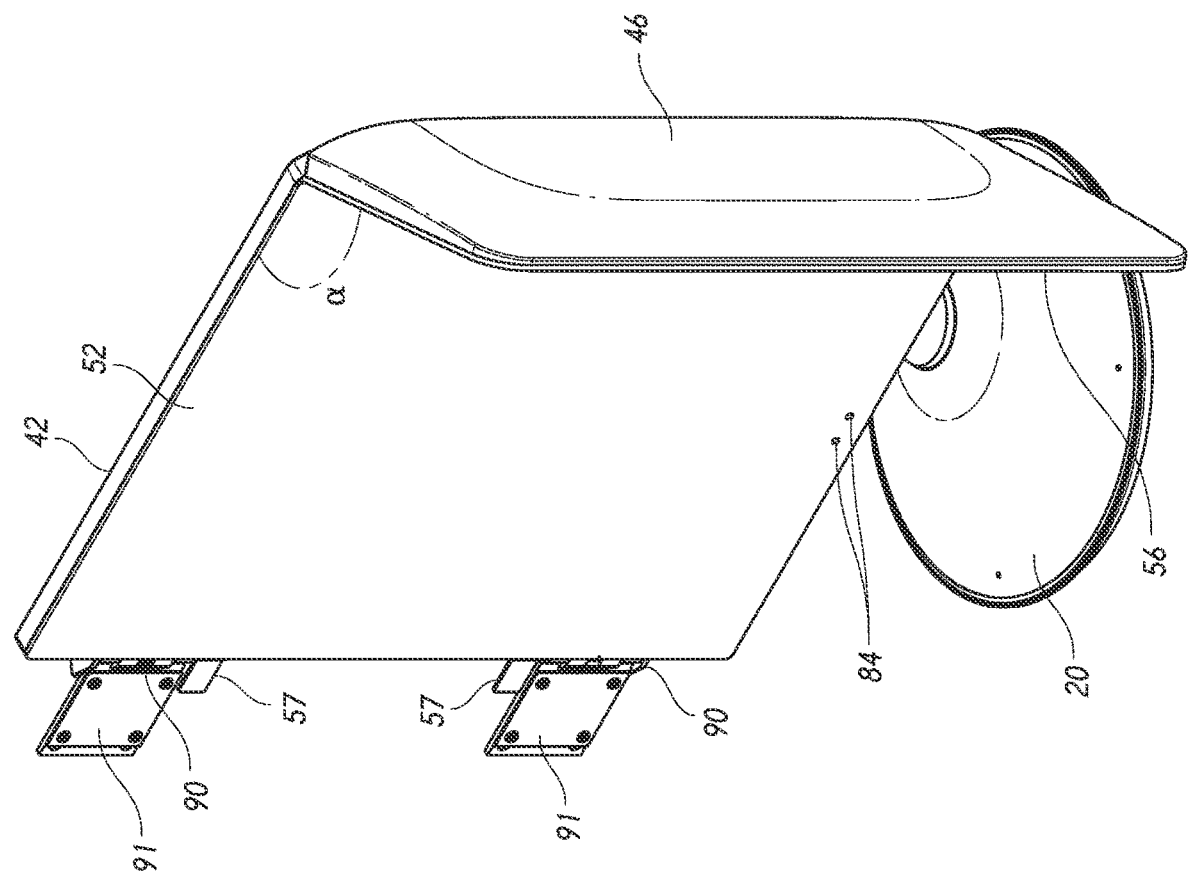
FIG. 15 illustrates a view of the embodiment of FIG. 12 that is partially disassembled.
Figure 16:
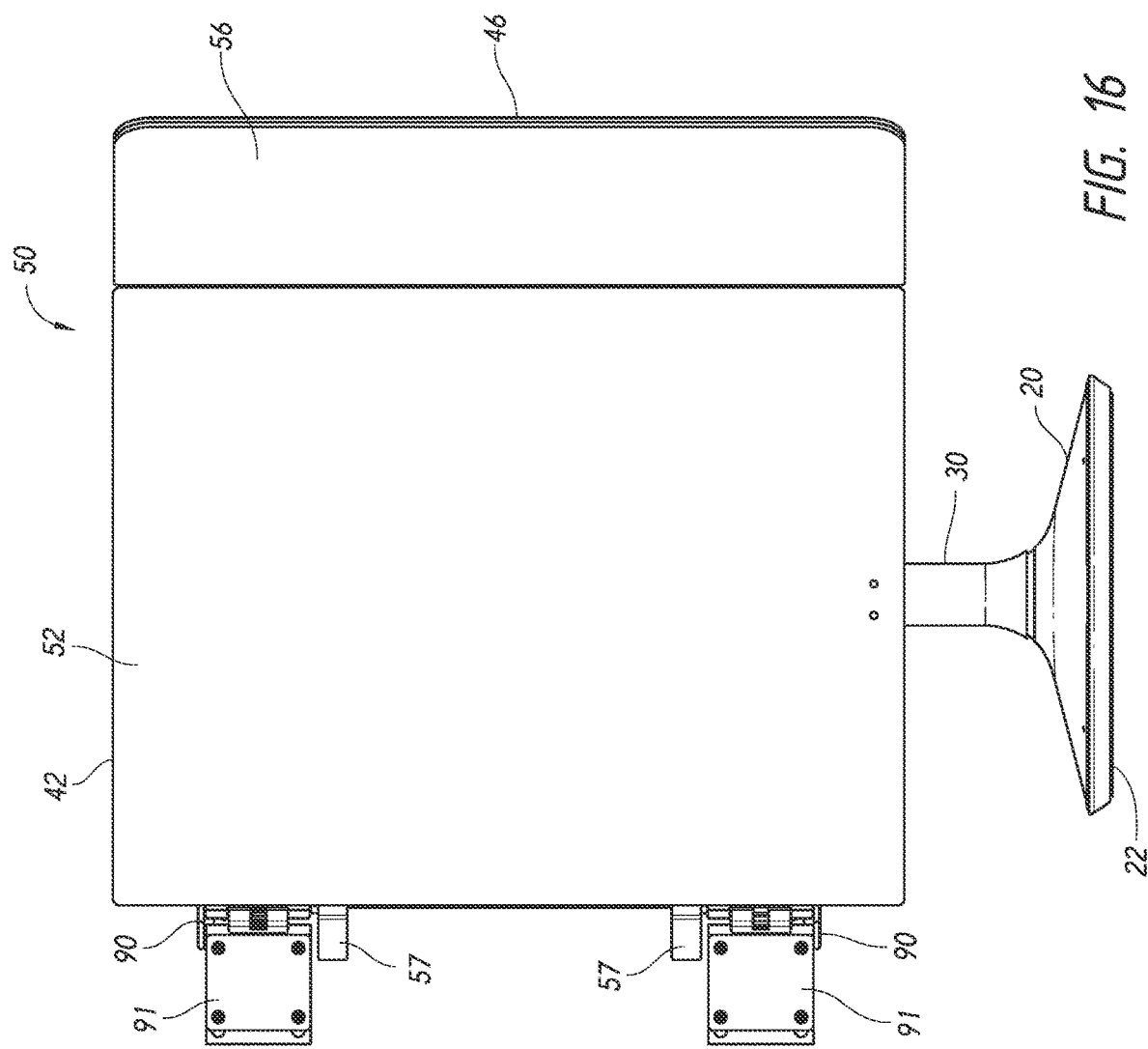
FIG. 16 illustrates a front view of the embodiment of FIG. 15.
Figure 17:
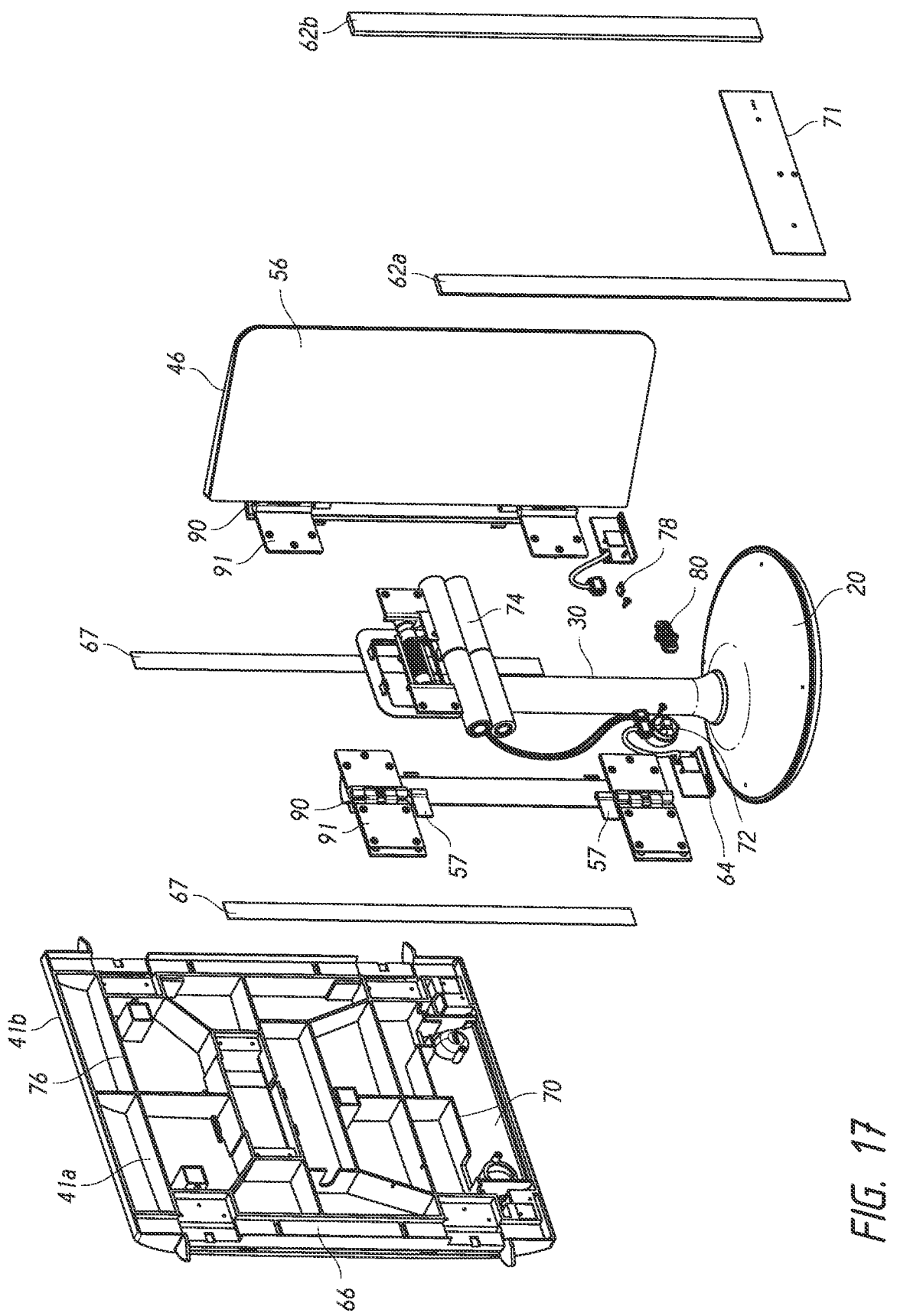
FIG. 17 illustrates an exploded view of the embodiment of FIG. 15.

In certain variants, as illustrated, two or more of the sections 42, 44, 46 are interconnected via one or more moveable attachment features (e.g., hinges, ball joints, telescoping arms, or the like). For instance, as shown in FIGS. 14A-C, a first section, such as the central section 42, can be connected to a second section, such as the left side section 44, via one or more hinges 90 and to the right side section 46 via one or more right side hinges 90. FIGS. 15-17 (where FIG. 17 is an exploded view) show an embodiment of the mirror assembly 2 with section 44 removed and illustrate certain features of the hinges 90. In some implementations, as shown in FIGS. 14A-17, the hinges 90 can be fastened (e.g., screwed, bolted, glued, riveted, etc.) into place via an attachment implement 91 (e.g., a surface plate, etc.). In certain variants, the attachment implement secures the hinge to one or more of the frame, the support backing, and/or the mirrored surface directly (e.g., in embodiments where the support and frame features are not present). As shown in FIGS. 14-17, in some embodiments, the hinges comprise surface plates 91 that can engage the support frame, backing, or mirror of one section and connect it to the support frame, backing, or mirror of another section.

In some embodiments, as shown in FIGS. 15-17, supplemental support implements 57 (e.g., tabs, swivels, etc.) provide an additional stabilizing feature for the side sections 44, 46. In some embodiments, the support implements 57 prolong the life of the hinges by reducing the load on the hinges.

In some assemblies, the attachment features (e.g., one or more hinges, struts, sliders, joints, etc.) and/or the supplemental support elements provide resistance (e.g., with friction and/or traction caused by rubber or plastic gaskets, teeth, or otherwise) to the movement of the sections 42, 44, 46 relative to one another. In certain variants, this resistance (e.g., stiffness) allows a user to make fine adjustments or movements to the positioning of one or more of the side mirror surfaces 54, 56 and central mirror surface 52, such that the one or more side mirror surfaces 54, 56 and/or central mirror surface 52 remain in place after the user has adjusted or moved the one or more side mirror surfaces 54, 56 or central mirror surface 52. In certain implementations, the user is able to position one or more of the mirrored surfaces at desired angles to view particular features of the user. This positionability allows the user to visualize hard-to-see features during grooming. In some embodiments, the hinges can be temporarily locked in place to prevent movement of one or more of the sections. In some embodiments, the hinges have a plurality of preset positions. In certain implementations, one or more of the attachment features can comprise or can be functionally connected with a damper. In some variants, the damper restrains (e.g., slows down, depresses, deadens, etc.) the movement of the attachment feature. In some variants, the damper allows one or more of the mirrored sections to move slowly, softly, and/or in a controlled manner, into one or more preset positions (e.g., the opened position, the closed position, and positions in between). In some embodiments, an audible or tactile click or bump or momentary stop or increase in resistance to movement occurs as a mirrored section moves into or past one or more of the preset positions. In certain variants, the damper prevents mirrored sections from abruptly slamming into a preset position (e.g., the opened position, the closed position, etc.). In some embodiments, the damper reduces vibration of the mirrored sections as they move about the axis of the hinge. In some implementations, the damper is positioned along a portion of a shaft connecting the central and side mirrors.

In certain implementations, as mentioned above, adjacent mirror sections (e.g., 52 and 54 or 52 and 56) are independently adjustable to angles α relative to each other. For example, adjacent sections (and/or mirrored surfaces) of the head portion can be placed in an opened position or in one or more closed positions. For example, FIG. 1 shows an embodiment of the mirror assembly in an open position (e.g., where adjacent mirrored surfaces central mirrored surface 52 is at a maximum angle α to the left mirror surface 54 and the right mirror surface 56). FIG. 12 shows the mirror assembly of FIG. 1 in a partially closed position (e.g., where one or more of the mirrored sections form an a angle that is smaller than when in the fully open position). FIG. 12 shows a view where the central mirror section 52 and right mirror section 56 are at least partially closed and where the central mirror section 52 and the left mirror section 54 are in an opened position.

In certain variants, adjacent mirrored surfaces can be positioned at a angles equal to or less than about 180°, about 170°, about 160°, about 150°, about 140°, about 130°, about 120°, about 110°, about 100°, about 90°, about 80°, about 70°, about 60°, values between the aforementioned values, or otherwise. In certain embodiments, the opened position can have an angle α greater than about 180°. In some variants, adjacent mirrors can be positioned with respect to one another at angles α in a range between about 45° and about 180°, about 90° and about 180°, or about 120° and about 180°. In some variants, adjacent mirrors can be positioned with respect to one another at angles α in a range between about 45° and about 90°, about 90° and about 120°, about 120° and about 130°, about 130° and about 140°, about 140° and about 150°, about 150° and about 160°, about 160° and about 170°, or about 170° and about 180°. In some embodiments, different, discrete, preset a angle positions can be selected so that when the user urges the mirror out of one preset position, the mirrored surface slips into the next preset position. In some embodiments, the mirrored surfaces have a plurality (e.g., 1, 2, 3, 4, 5, 6, or more) of preset positions.

As shown, for example, in FIG. 14B, in some variants, the hinge 90 comprises a positioning assembly or system that concurrently or simultaneously provides an "invisible" or recessed rotatable hinge while also providing a very small gap or virtually no gap distance between adjacent mirror sections. For example, as illustrated, the positioning assembly or system can comprise a rotational assembly that in some embodiments includes a cam 92, and a translational or linear movement assembly that in some embodiments includes a sliding relationship between at least two supporting components of one or more mirror assemblies. As illustrated, for example, in FIGS. 1 and 2, an "invisible" or recessed hinge (e.g., positioned behind the mirrored surface) can permit multiple mirror sections to be positioned adjacent to each other with a very small or essentially no distracting visible interruption between them. In contrast, if a hinge assembly is provided that is even or flush with or in front of one or more of the mirrored surfaces, or if one or more of the mirrored surfaces are notched or otherwise shaped to expose a hinge assembly in the front view, as in some embodiments, then the user of the mirror system will lose a portion of the mirrored viewing surface to the hinge assembly. However, in a mirror system where the hinge assembly is recessed or positioned behind the mirrored surface, a significant, visually distracting gap between the adjacent mirror surfaces would ordinarily be needed to provide clearance for one or more of the edges of the adjacent mirror surfaces to rotate with respect to each other. Some embodiments, as illustrated in FIGS. 14A-14C, can be configured to simultaneously provide a recessed or "invisible" hinge and a very small or virtually non-existent gap between adjacent mirror sections. In some embodiments, as illustrated, the gap between adjacent mirror sections can be smaller when fully opened (e.g., when two or more of the adjacent mirrored surfaces form an angle of approximately 180 degrees) than when the adjacent mirrored surfaces are in an angled or rotating orientation. In some embodiments, as shown, the gap or seam between adjacent mirror sections when fully opened can be approximately equal to or less than the front-to-back thickness of the reflective portion of either or both of the mirror sections. As shown, for example in FIG. 14B, both the rotational assembly and the translational or linear movement assembly can be positioned within the housing of the mirror system, and/or can be positioned in close proximity or adjacent to each other, and/or can be positioned behind the mirror surface, and/or can be positioned in direct contact with each other during at least one or more stages of orientation of the adjacent mirror sections. In some embodiments, as shown, the axis of rotation of the rotational assembly can be non-parallel or generally perpendicular to the direction of translation of the translational or linear movement assembly.

In certain implementations, at least a portion of the rotational assembly, such as the cam 92, allows adjacent mirrored surfaces (e.g., 52 and 54) to remain in close proximity to one another during operation of the hinge 90 (e.g., opening and closing of the hinge). For instance, as the hinge 90 is opened (e.g., brought from an smaller angle to a larger angle), as shown in FIGS. 14A-C, the cam 92 can allow the side mirror surface 54 to move laterally inward or outward by way of the translational or linear movement assembly relative to the central mirror surface 52, better aligning or positioning the mirrored surfaces for rotation and minimizing the distance between mirrored surfaces 96. Conversely, as the hinge is closed (e.g., where the mirrored surfaces are brought from a larger angle to a smaller angle), the cam 92 urges the side mirror surface 54 to stay in proximity to (e.g., stays tightly associated to) the central mirror surface 52 so that the mirrored surfaces maintain a minimal seam 96 (e.g., a minimal gap).

In some embodiments, the gap or seam 96 between the central mirror surface 52 and an adjacent side mirror surface 54, 56 cannot be readily perceived by a user (e.g., is not visible or not visible in a manner that distracts from or appreciably obstructs the user's view in the mirror system) when the mirror assembly 2 is in the fully open position and/or in an angled or closed position (e.g., when a side mirror surface has been placed in a position that is at an angle smaller than 180° with respect to the central mirror surface). As illustrated, in some embodiments, the width β of the seam 96 between any two adjacent mirrors in a first position is different from the width β' of the seam 96 in a second position. For example, the width β of the seam 96 between any two adjacent mirrors in an essentially fully opened or essentially planar position can be smaller than the width β' of the seam 96 in an angled or non-planar position. In some embodiments, the width of the seam 96 between a side mirror and the central mirror is the same when the mirror assembly is in the fully opened position or a closed position (e.g., β=β'). In some embodiments, the difference between the width β of the seam 96 between mirrors when the mirror assembly is in the fully opened position from the width β' of the seam 96 a closed position differs by less than or equal to about: 1%, 2%, 5%, 10%, 15%, 25%, 40%, or 50%. FIGS. 14A-C illustrate that the action of the cam 92 allows the mirror surfaces to remain in close proximity to each other with minimal width β, β of the visible seam 96 between the mirrors. In some embodiments, the widths β, β of the seam 96 are less than or equal to: about 4 mm, about 2 mm, about 1.5 mm, about 1.0 mm, about 0.5 mm, or about 0.25 mm. In some embodiments, when a user is centrally positioned about 12 inches from the central mirror, the seam 96 is not perceived as a gap between the mirrored surfaces by the user.

In some embodiments, as shown in FIG. 14B, the translational or linear movement assembly of the hinge 90 further comprises a spring 94. In certain implementations, as shown, the spring loading of the translational or linear movement assembly of the hinge helps to exert a force that urges adjacent mirror sections toward each other, and/or that holds the mirrored surfaces and/or sections in proximity to one another during movement about the axis of the hinge 90 via the cam 92. In certain variants, as shown, the cam of the rotational assembly contacts or presses on the spring of the translational or linear movement assembly when pivoting and the spring biases the side mirror back toward the seam. In certain implementations, the spring loading provides some resistance and oppositional force to movement of the mirrored surfaces with respect to one another and/or allows smooth movement of the surfaces. In certain implementations, the spring loading allows the mirrored surfaces to easily adjust into the next available preset mirror position.

In some embodiments, the cam 92 has engaging features 93 (e.g., teeth, traction implements, etc.) that engage one another during movement of the hinge 90. In certain variants, the teeth 93 allow smooth and steady movement of the hinges 90 without slippage. In some implementations, where the hinge 90 comprises both teeth 93 and a spring 94, the spring provides additional resistance to the movement of the sections 42, 44, 46 with respect to one another. In some embodiments, this resistance ensures that the sections 42, 44, 46 move without slippage, reliably, smoothly, and/or with little applied force from the user. In certain embodiments, the hinge assembly gives the mirrored section a weighted feel when force is first applied and then freer movement as the section begins to move.

In certain embodiments, the hinges can comprise plastic, rubber, metal (e.g., stainless steel, aluminum, etc.), composite, or other suitable materials.

In some embodiments, as illustrated, the mirrored surfaces 52, 54, 56, together or individually, can have a generally rectangular or generally square shape. In certain variants, the mirrored surface can instead have an overall shape that is generally square, generally circular, generally ellipsoidal, generally rhomboidal, and/or any other suitable shape. In some embodiments, when present, the different mirrored surfaces of a given mirror assembly can have different shapes and those shapes can be mixed and matched and interconnected via attachment features, etc.

In certain embodiments, each mirror can have a width and a length, the dimensions of which can be independently selected. The height can be along the general direction extending from a bottom portion of the mirror assembly upwardly. The width can be along the general direction extending transversely with respect to the height. In some embodiments, a mirrored surface can have a height (in inches) that is greater than or equal to about: 1, 2, 4, 6, 8, 10, 12, 14, 16, 20, 30, ranges formed by the aforementioned values, values between the aforementioned values, or otherwise. In certain implementations, a mirrored surface can have a width (in inches) that is greater than or equal to about: 1, 2, 4, 6, 8, 10, 12, 14, 16, 20, 30, ranges formed by the aforementioned values, values between the aforementioned values, or otherwise. In certain embodiments, the ratio between the surface area of central mirrored surface and a side mirrored surface is at least about: 10:1, 5:1, 1:1, 1:5, 1:10, ratios between the aforementioned ratios, and otherwise. In some embodiments, where present, the primary or central mirror is larger than a secondary side mirror by at least about 10%, about 25%, about 50%, about 100%, values between the aforementioned values, or otherwise. In certain implementations, each mirror section is approximately the same size.

Rectangular mirrors can be selected by using a mirror having four sides at approximately right angles to one another with a height that is greater than the width (or a width that is greater than the height). Other shapes can be selected by selecting mirrors with curved corners and other length and width dimensions. For instance, configurations with ellipsoidal mirrors can be selected by using rounded mirrors with widths greater than their heights (or heights greater than their widths), square and circular dimensions can be implemented using mirrors having substantially the same height and width, etc.

In some embodiments, the mirror 50 can have a thickness of at least about 2 mm and/or less than or equal to about 3 mm. In some embodiments, the thickness is less than or equal to about two millimeters and/or greater than or equal to about three millimeters, depending on the desired properties of the mirror 50 (e.g., reduced weight or greater strength). In some embodiments, the surface area of the mirror 50 is substantially greater than the surface area of the base portion 40. In other embodiments, the surface area of the image-reflecting surface of the mirror 50 is greater than the surface area of the base 20.

The mirror 50 can include a generally flat or generally spherical surface, which can be convex or concave. The radius of curvature can depend on the desired optical power. In some embodiments, the radius of curvature can be at least about 15 inches and/or less than or equal to about 30 inches. The focal length can be half of the radius of curvature. For example, the focal length can be at least about 7.5 inches and/or less than or equal to about 15 inches. In some embodiments, the radius of curvature can be at least about 18 inches and/or less than or equal to about 24 inches. In some embodiments, the mirror 4 can include a radius of curvature of about 20 inches and a focal length of about 10 inches. In some embodiments, the mirror 4 is aspherical, which can facilitate customization of the focal points. In some embodiments, the mirrored surface can be flexible. In certain implementations, the flexible mirror surface allows a user to transform a flat mirror into a parabolic/curved mirror when desired.

In some embodiments, the radius of curvature of the mirror 50 is controlled such that the magnification (optical power) of the object is at least about 1.25 times larger, at least about 1.5 times larger, at least about 2 times larger and/or less than or equal to about 7 times larger. In certain embodiments, the magnification of the object is about 5 times larger. In some embodiments, the mirror can have a radius of curvature of about 19 inches and/or about 7 times magnification. In some embodiments, the mirror can have a radius of curvature of about 24 inches and/or about 5 times magnification.

The mirror 50 can be highly reflective (e.g., has at least about 90% reflectivity). In some embodiments, the mirror 50 has greater than about 70% reflectivity and/or less than or equal to about 90% reflectivity. In other embodiments, the mirror 50 has at least about 80% reflectivity and/or less than or equal to about 100% reflectivity. In certain embodiments, the mirror has about 87% reflectivity. The mirror 50 can be cut out or ground off from a larger mirror blank so that mirror edge distortions are diminished or eliminated.

One or more filters can be provided on the mirror to adjust one or more parameters of the reflected light. In some embodiments, the filter comprises a film and/or a coating that absorbs or enhances the reflection of certain bandwidths of electromagnetic energy. In some embodiments, one or more color adjusting filters, such as a Makrolon filter, can be applied to the mirror to attenuate desired wavelengths of light in the visible spectrum.

The mirror 50 can be highly transmissive (e.g., nearly 100% transmission). In some embodiments, transmission can be at least about 90%. In some embodiments, transmission can be at least about 95%. In some embodiments, transmission can be at least about 99%. The mirror 50 can be optical grade and/or comprise glass. For example, the mirror 50 can include ultra-clear glass. Alternatively, the mirror 50 can include other translucent and/or transparent materials, such as plastic, nylon, acrylic, combinations thereof or other suitable materials. The mirror 50 can also include a backing layer comprising a reflective material (e.g., aluminum, silver, etc.). In some embodiments, the backing layer can impart a slightly colored tone to the mirror (such as a warm or cool color tone). In some embodiments, an aluminum backing can prevent rust formation and provide an even color tone. The mirror 50 can be manufactured using molding, machining, grinding, polishing, or other techniques.

The mirror assembly 2 can include one or more light sources 60 configured to emit light. For example, as shown in FIGS. 10 and 11, the mirror assembly can include a plurality (e.g., two, three, four, five, or more) of light sources 60 including, as shown, a left light source 60a and a right light source 60b. In some embodiments, as shown in FIGS. 10 and 11, the light source(s) 60 can be positioned within a portion and/or supported by the central support 42. In some embodiments, the light sources 60 are directly mounted to the mirror surfaces at spaced-apart intervals around the periphery of the mirror. For example, the light sources 60 can be positioned around some, substantially all, or all of the periphery of the mirror 50. In certain embodiments, the light source 60 can be separate from and not connected with the mirror assembly 2.

Figure 18:
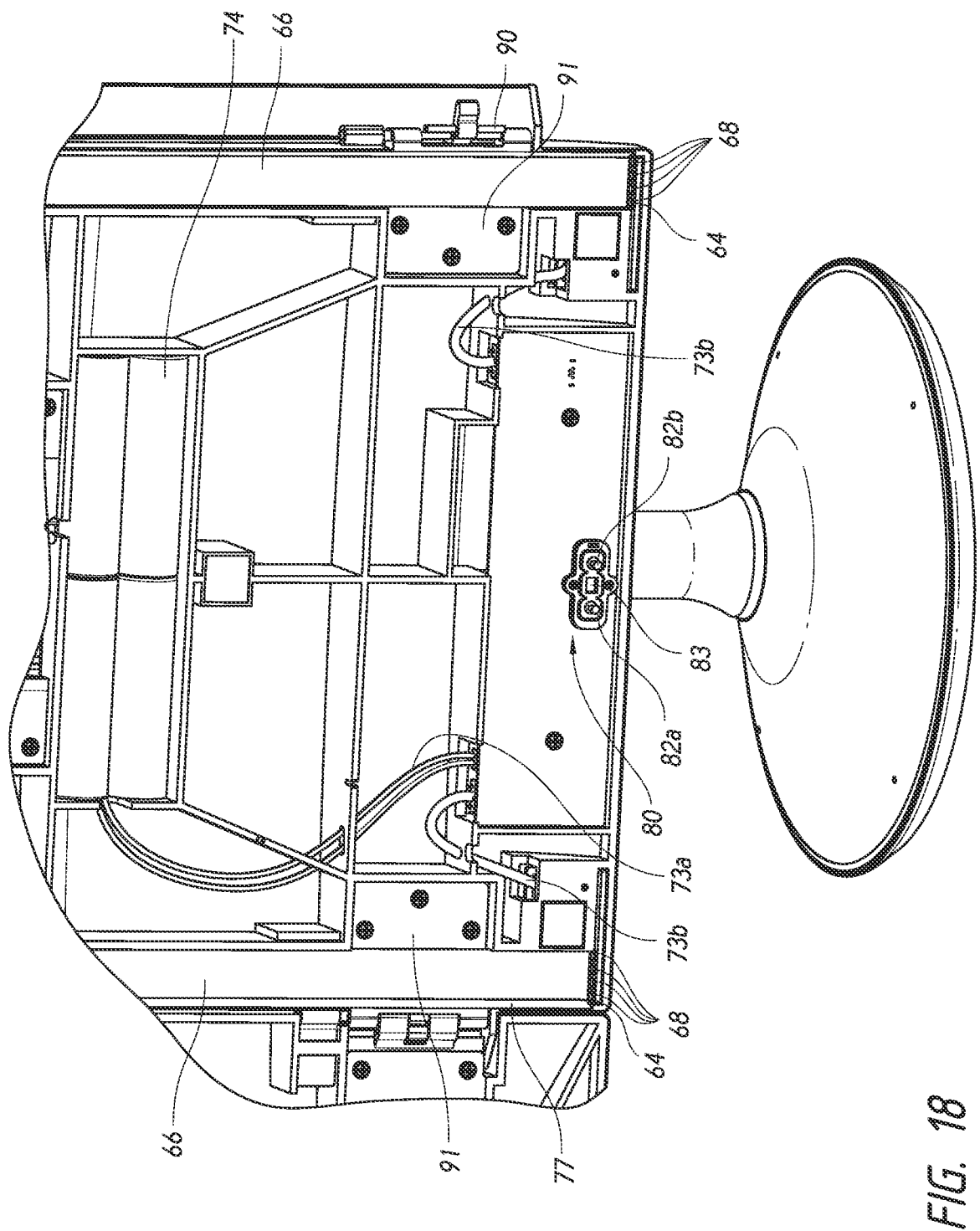
FIG. 18 illustrates an enlarged view the embodiment of FIG. 10.
Figure 19:
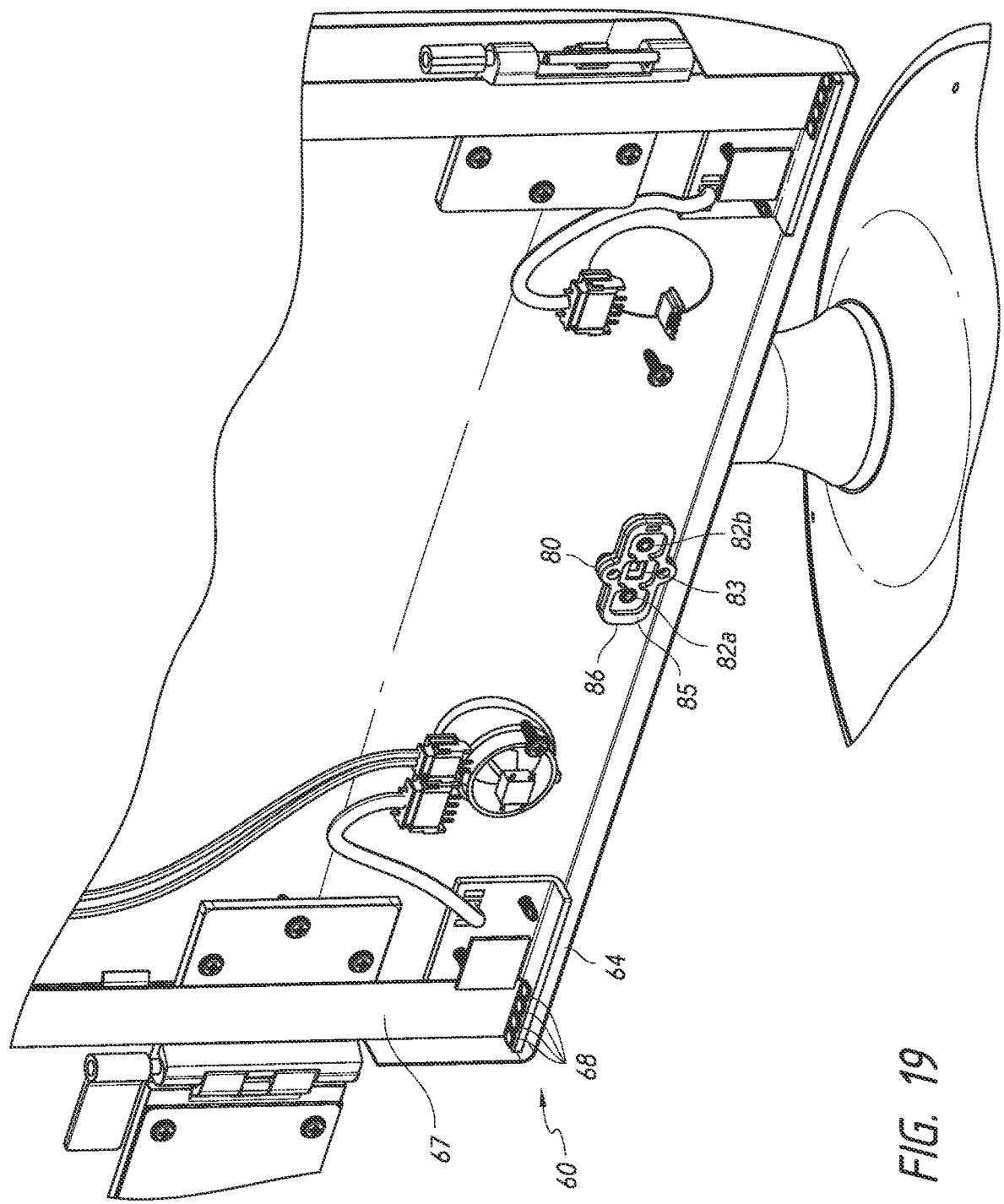
FIG. 19 illustrates an enlarged, partially exploded view of the embodiment of FIG. 1.
Figure 20:
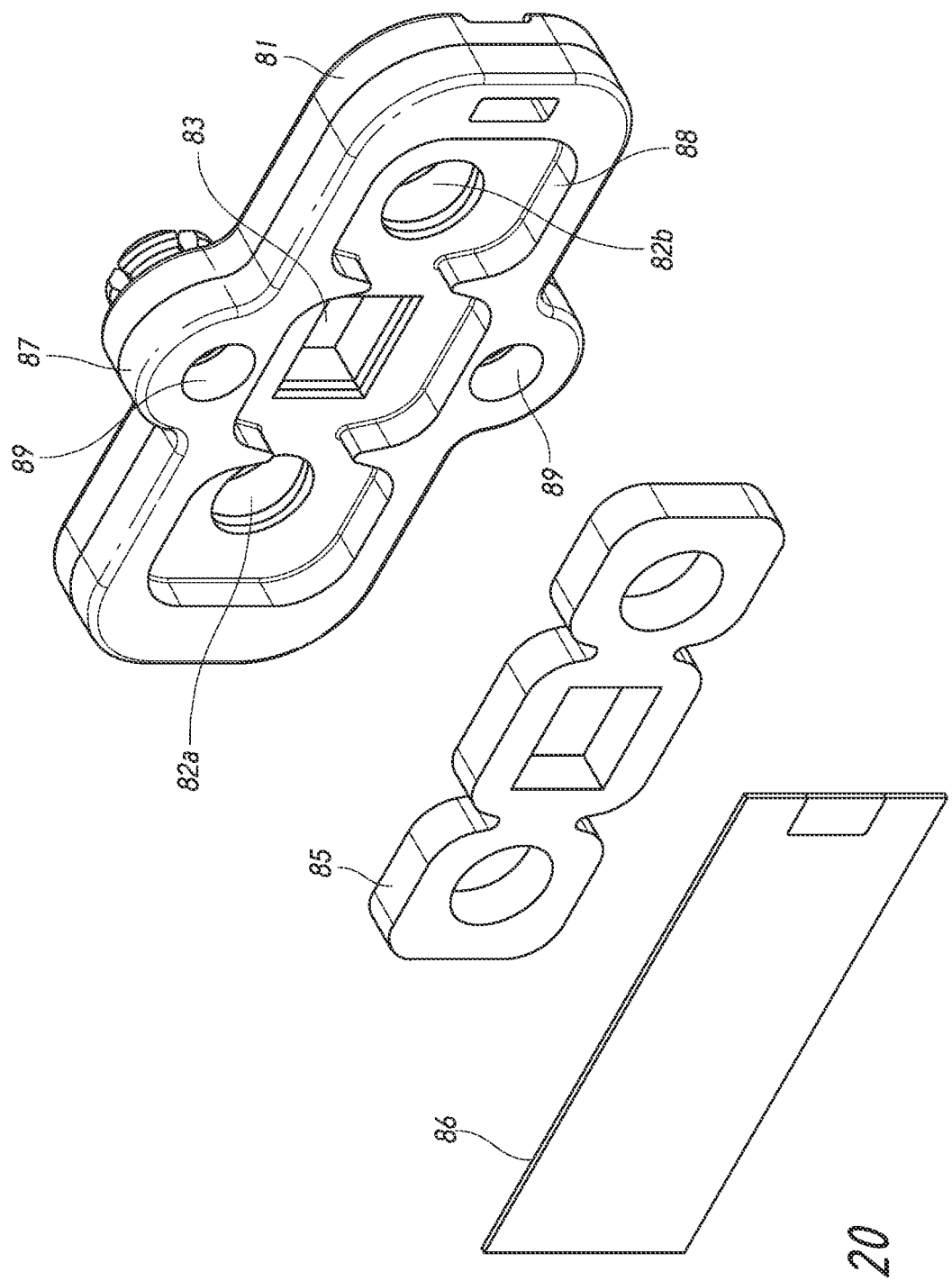
FIG. 20 illustrates a view of a sensor assembly.

The light sources 60 can be positioned in various orientations in relation to each other, such as side-by-side, or otherwise. In some embodiments, as shown in FIGS. 11, 18, and 19, the light sources 60 can be positioned to emit light in the same direction by placing light emitters 64 facing in the same general direction. As shown in FIG. 11, in certain implementations, a left light source 60a projects light upwardly at one peripheral side of the central mirrored surface 52 and a right light source 60b projects light in the same general direction at a peripheral side of the central mirrored surface 52 opposite that of the left light source 60a. In certain embodiments, the light sources can be positioned to emit light in opposing directions (e.g., up versus down, etc.). In some embodiments, the light sources can be positioned to transmit light parallel, orthogonally, or otherwise with respect to other light sources. In certain embodiments, the light sources 60 can be positioned to emit light generally orthogonally to the viewing surface of the mirror assembly 2. In certain embodiments, the light sources 60 can be positioned to emit light in a direction generally within the plane (or in a direction parallel to the plane) of a mirror surface 52, 54, 56. In some embodiments, the light sources can be positioned to emit light diagonally along the mirrored surface, downwardly, upwardly, or at combinations of these directions.

Various light emitters 64 can be used in the light sources 60. For example, as shown in FIGS. 18 and 19, the light sources 60 can comprise one or a plurality of (e.g., 2, 3, 4, 5, 6, 7, 8, or more) light emitting diodes (LEDs) 68. In some embodiments, other light emitters 64 can be used (e.g., fluorescent light sources, incandescent light sources, halogen light sources, etc.). LEDs may offer advantages such as longer lifetimes and higher color rendering indices. In some embodiments, as shown in FIGS. 18 and 19, each light source 60a, 60b can comprise a plurality (e.g., one, two, three, four, five, or more) of LEDs 68. In some embodiments, as shown in FIG. 18, the left light source 60*a* can comprise four LEDs 68 and the right light source 60*b* can comprise four LEDs 68. In some embodiments, one or more LEDs of a single light source can be the same or different (e.g., have the same or a different color or color temperature). For example, in certain variants, a light source comprising four LEDs can comprise two pairs of LEDs where the LEDs in a pair are identical. In other embodiments, each LED in a single light source is different. In some embodiments, when multiple light sources are present, the light sources can comprise LEDs that are the same (e.g., having the same color, temperature, and number of LEDs in an each light source) or different (e.g., having one or more LED that is different from an LED of different light source). In some embodiments, different light sources of the mirror assembly are independently adjustable to provide accomplish any lighting environment desired. In some embodiments, LEDs can be paired with other LEDs of lower or higher color temperatures. In certain implementations, LEDs can be paired with other LEDs of with colors that have lower or higher wavelengths.

In some embodiments, as shown FIG. 11 and as exploded views in FIGS. 17 and 18, a light path can be formed using the light emitters 64. In some embodiments, the light path is path of light that can be perceived by a user. For instance, a plurality (e.g., two) light paths are present in FIG. 11, each running from the bottom of the head portion 40 to the top of the head portion 40 and each located on an opposite side of the central section 42. As shown, one or more of the light paths can extend in an approximately straight direction from a top portion to a bottom portion. In some embodiments, a light path comprises a light transmissive elongate tube, strip, or column. For instance, the light emitters 64 can be positioned in a space that forms a column 66 (i.e., a light column or light pipe), as shown with the cover 62*a* removed in FIG. 11. In some embodiments, the column 66 creates an illuminated light path along the direction of the column 66. While these light paths project straightwardly, where curved mirrors are implemented, curved light paths can be used.

In certain embodiments, the column 66 comprises a light transmissive cover (in FIGS. 10 and 11, the left column comprises a left transmissive cover 62*a* and the right column comprises a right transmissive cover 62*b*). In some embodiments, the transmissive covers 62*a*, 62*b* are fixed in place by attachment to the head portion 40 (via an engagement means, by snapping into the frame 41*a*, etc.).

In certain implementations, as shown in FIGS. 8, 11, and 17, the backside of the light column 66 can include a reflective material to achieve high reflectivity. This reflective backing material 67 along the rear side of the light column 66 can reflect light and project it towards the user. In some embodiments, the reflective material can reflect at least about 95% of light. In some embodiments, the reflective material reflects about 98% of light. In certain implementations, the reflective material can be optically reflective paper. As shown in FIG. 11, the head portion 40 can include a structure, such as a ridge 77, which can comprise a wall of the column 66 (e.g., a portion of the light column 66 can be disposed along the ridge 77) or otherwise support the light column 66. In some embodiments, the ridge 77 is configured to dissipate heat.

Some or all of the light from the light sources 60 can be transmitted generally toward, or into, the one or more light columns 66. For example, as shown in FIG. 11, the light column 66 can include proximal ends 66*a* and 66*b*, and the light emitters 64 can emit light from the proximal ends 66*a*, 66*b* of the light column 66 in the general direction of the column to distal ends of the column 66*c*, 66*d*. The light sources 60 can be positioned such that light is emitted orthogonally with respect to the direction of the light emitter 64 and generally toward a user facing the viewing surface of the mirror assembly 2. For example, some or all of the light from the light sources 60 can be emitted toward, and/or reflected off of, another component before contacting the user.

In some embodiments, the column 66 can be filled with a transparent material (e.g., a gas, a solid, or a liquid). In some variants, the column can be evacuated. In certain variants, the column 66 can be filled with a partially transparent material suitable for allowing light to travel along the direction of the light path. In some embodiments, the light path comprises a light transmissive elongate tube or a light transmissive strip of material (e.g., porous or clear plastic).

As shown in FIG. 11, the light column 66 can be rectangular prism shaped. In certain embodiments, the light column can be substantially cylindrically shaped. In some embodiments, the light column can be substantially linearly shaped, or, as discussed above, the light column 66 can have a non-linear or circular shape. The light column can include acrylic, polycarbonate, or any other clear, highly transmissive, or partially transmissive material.

As stated above, light can pass along and through a portion of the light column 66 and/or emit from the light column 66 via an outer face (e.g., a light transmissive cover 62*a*, 62*b*) of the light column 66. In some embodiments, the light column 66 is configured to transmit at least about 95% of the light emitted from the light sources 60. The light sources 60 can be configured, in combination with light column 66, to emit light generally around the periphery of the mirror 50 or the periphery of a mirrored surface 52, 54, 56. The light column 66 can be configured to disperse light from the light sources 60 through the light column 66. The light sources 60 and the light column 66 can be configured such that the amount of light emitted from the outer face is substantially constant along the length of the light column 66. Many different ways of achieving a substantially constant intensity of conveyed light around the light column 66 can be used.

The head portion 40 and/or the light column 66 can include features to facilitate generally even or uniform diffusion, scattering, and/or reflection of the light emitted by the light sources 60 around the periphery of the mirror, and/or along a length of the light column 66 (e.g., from a top portion of the light column 66 to a bottom portion of the light column 66). For example, the head portion 40 and/or light column 66 can include an irregular anterior and/or posterior surface (e.g., on a transmissive cover 62*a*, 62*b*) that is molded in a non-flat and/or non-planar way, etched, roughened, painted, and/or otherwise surface modified. The light scattering elements can be configured to disperse a substantially constant amount of light along the periphery of the mirror (e.g., the central mirrored surface 52). These features can help achieve high energy-efficiency, reducing the total number of light sources necessary to light substantially the entire periphery of the mirror and reducing the running temperature of the mirror assembly 2.

The light transmissive covers 62*a*, 62*b* of the light column 66 can comprise a generally translucent material with varying degrees of scattering. In some embodiments, the minimum amount of scattering occurs in a region of the light column 66 proximal 66*a*, 66*b* to the light emitters 64 and the maximum scattering occurs in a region of the light column 66 that is located farthest from the light emitters 64 (e.g., at the distal ends of the column 66*c*, 66*d*). The light column 66 can comprise a region configured to scatter light in a varying and/or gradient manner. In some embodiments, the light conveying pathway or light column 66 can comprise a varying, non-constant, non-smooth anterior, posterior, and/or interior surface formed from any suitable process, such as molding, etching (e.g., sand blasting), roughening painting, coating, and/or other methods. In some embodiments, one or more surface irregularities can be very small bumps, protrusions, and/or indentations.

In some embodiments, light passing through the light column 66 can be scattered at a plurality of different intensity levels, depending on the location of the light within the light column 66. For example, light at a first location on the light column 66 can be scattered at a first intensity level, light at a second location on the light column 66 can be scattered at a second intensity level, and light at a third location on the light column 66 can be scattered at a third intensity level, with the third intensity level being more than the second intensity level, and the second intensity level being more than the first intensity level, etc. Many other levels of scattering and many ways of spatially increasing or decreasing scattering can be used instead of or in addition to providing macro scattering elements, such as spatially varying a level of die or a frosting effect within the material of the light column 66, or by spatially varying scattering particles embedded within the material, or by spatially varying a surface pattern on one or more outside surfaces of the material. In some embodiments, a smooth gradient of scattering elements can be used to achieve the desired lighting effect (e.g., constant light intensity emission or gradient light intensity emission).

The light column 66 (e.g., the transmissive cover 62a, 62b) can include a surface pattern, such as light scattering elements (e.g., a dot pattern). The light scattering elements can be configured to encourage a portion of the light passing through the light column 66 to exit the outer face of the light column 66, thereby generally illuminating the user in a generally even or generally uniform manner. The light scattering elements 64 can be configured such that the light intensity emitted from the outer face of the light column 66 is substantially constant along a substantial portion of, or virtually the entirety of, the length of the light column 66. Accordingly, the user can receive generally constant light volume or intensity around the periphery of the mirror. For example, the light scattering elements can include one or more of varied density, irregular patterns, or varied sizes.

The light scattering elements can be less dense near the light sources 60, and become increasingly dense as a function of increased distance from the light sources 60. Such a configuration can, for example, reduce the amount of light that is scattered or reflected (and thus exits the outer face) in areas having generally increased light volume or light intensity, such as portions of the light column 66 that are near the light sources 60. Further, such a configuration can encourage additional scattering or reflection (and thus increase the amount that exits the outer face) in areas having generally decreased light volume or intensity, such as portions of the light column 66 that are spaced away from the light sources 60. Accordingly, the mirror assembly 2 can avoid bright areas at some portions of the periphery of the mirror and dark areas at other portions. The mirror assembly 2 can have a substantially constant amount of light emitted along some, substantially all, or all of the periphery of the mirror surface(s).

The light scattering elements can be dispersed in an irregular pattern, such that the light scattering pattern in a first region is different than a light scattering pattern in a second region. A distance between a first light scattering element and a second light scattering element can be different than a distance between a first light scattering element and a third light scattering element.

The sizes (e.g., the diameter) of the light scattering elements can be varied. In some variants, the light scattering elements near the light sources 60 can have a smaller size when compared to light scattering elements that are farther from the light sources 60. For example, the light scattering elements can include a smaller diameter near the light sources 60 and become increasingly larger as a function of distance from the light sources 60. Such a configuration allows substantially even reflection of light to the outer surface 60. In certain embodiments, each light scattering element has a diameter of less than or equal to about one millimeter. In some embodiments, the light scattering elements each have a diameter greater than or equal to about one millimeter.

In some embodiments, the light scattering elements can be generally circular. In some embodiments, the light scattering elements have other shapes, such as generally square, generally rectangular, generally pentagonal, generally hexagonal, generally octagonal, generally oval, and otherwise. In certain embodiments, the pattern in the light column 66 is a series of lines, curves, spirals, or any other pattern. In certain embodiments, the light scattering elements are white. The light scattering elements can be dispersed such that the light column 66 appears frosted. In some embodiments, the light scattering elements are not easily visible to the user. For example, the light column 66 can be slightly opaque to conceal the appearance of the surface pattern. In some embodiments, the light scattering elements are visible to the user, the light column 66 can be clear to show the general color and pattern of the surface elements.

In some embodiments, the light path is concealed by the mirror 50 and only visible when the light emitters 64 are activated. For instance, in some embodiments, the mirror 50 has at least some portion that is partially transparent at or along the general direction of the light strip. In some embodiments, the light sources can be hidden behind a portion of mirrored surface so that they are out of sight. For instance, as shown in FIG. 9, partially transparent mirrored surfaces 53 (e.g., two-way mirrored glass) can form the side portions of the central mirrored surface 52. When viewed from the front of the mirror, these partially transparent surfaces are reflective and appear as a normal part of the mirrored surface. As a light emitter or a light source is activated, light can then transmit through the two-way mirror and illuminate the user. In some embodiments, only when illuminated are the light sources visible from the on the mirror system. In some variants, the light strip is not concealed by the viewing surface. For instance, in certain implementations, even when inactive, the light source(s) are visible when a user is positioned in front of the mirror.

In some embodiments, as shown in FIG. 11, one or more of light columns 66 can be positioned along the side portions of the central mirrored surface 52. In certain embodiments, as illustrated, a light column 66 is positioned along a lateral side portion of the left side mirror surface 54 and another light column 66 is positioned along a lateral side portion of the right side mirror surface 56 (e.g., sides adjacent to the central mirrored surface 52 or on a side of the right and left side mirrors opposite the central mirrored surface 52). As illustrated, in some embodiments, the plurality of light paths or columns are separate from each other; are positioned only in generally or substantially vertical orientations; and/or are not positioned around the entire periphery of the mirror assembly 2. In some embodiments, as shown, there is no light path or light column 66 positioned horizontally along the entire top or bottom edges of the mirror assembly 2 or along the entire top or bottom edges of discrete sections of the mirror assembly 2. In certain embodiments, the light column 66 extends around at least majority of the periphery of one or more of the mirrored surfaces, substantially the entire periphery of one or more of the mirrored surfaces, or around the entire periphery of one or more of the mirrored surfaces.

In some embodiments, the light sources 60 are positioned behind a portion of the mirror 50 (e.g., creating a backlighting effect of the mirror 50). In some embodiments, the light sources are positioned (e.g., by tilting) such that light emitted from the light sources contacts the viewing surface of the mirror assembly 2 at an angle, such as an acute angle. In some embodiments, the light sources are positioned such that light emitted from the light sources contacts the viewing surface of the mirror assembly 2 at an obtuse angle.

When installed on the support member 40, the light column 66 has a length (measured alone the general direction of light emitted from the light emitter) a width (measured in a general direction transverse to the length and the along the same general plane of the viewing surface) and an depth (measured in a direction generally transverse to the length and generally orthogonal to the viewing surface). Some variants have a width that is greater than or equal to than the depth. In some embodiments, the width is less than the depth. In certain implementations, the light column 66 is configured to provide adequate area for the reflecting surface of the mirror 50 and to provide sufficient area for light to be emitted from the light column 66, as will be discussed in more detail below. For example, in some embodiments, the ratio of the width of the light column 66 to the width of the mirror (e.g., the central mirrored surface 52) can be less than or equal to about: $1/5$, $1/15$, $1/30$, $1/50$, values in between those values, ranges between those values, or otherwise.

In certain variants, the mirror assembly can also include a diffuser. The diffuser can be positioned on the surface of the light column and/or around the periphery of the mirror. For example, the diffuser can be positioned between the light column and the user to provide a diffuse, scattered light source, not a focused, sharp light source, which would be less comfortable on the user's eyes. In some embodiments, the transmissivity of the diffuser is substantially constant along its length. In certain embodiments, the diffuser can extend the length of light column or light path. The diffuser can include an at least partially opaque material. For example, the diffuser can include optical grade acrylic.

The diffuser can include an irregular anterior and/or posterior surface formed from etching, roughening, painting, and/or other methods of surface modification. For example, the diffuser can include a pattern of light scattering elements created using any of the methods discussed herein. The light scattering elements can be modified to include any of the shapes and/or sizes discussed in connection with the light column 66.

The light scattering elements can be configured to create soft light by further scattering the light. For example, the light scattering elements can include a plurality of dots having the same diameter or different diameters. In some embodiments, the light scattering elements can be evenly dispersed across the diffuser. In other embodiments, the light scattering elements can be randomly dispersed across the diffuser. In some embodiments, one or more of the mirrored surfaces (e.g., the central mirrored surface 52) comprises light scattering elements and/or diffusing surface portions.

For instance, in certain implementations, one or more side portions of the central mirrored surface 52 can comprise a semi-opaque, non-smooth (at a micro or macro level), and/or non-uniform surface that can be formed in any suitable manner, such as by molding, scraping, thermal treatment, particle bombardment (e.g., "sand blasting"), and/or chemical treatment, such as etching, to provide light diffusion or scattering. In some variants, these light scattering elements and/or diffusing portions of the mirrored surface can be positioned over or adjacent to or otherwise in light communication with the light sources. In certain implementations, these light scattering elements and/or diffusing surfaces adjust the light properties from the light sources as discussed elsewhere herein. In some embodiments, these surfaces can be used in addition to, or instead of the transmissive light covers. In some embodiments, these diffusing or otherwise light scattering portions can be integrally formed with a mirrored surface, such as by changing or treating a portion of the mirrored surface to produce a light scattering region.

In some embodiments, each light source consumes at least about 2 watts of power and/or less than or equal to about 3 watts of power. In certain embodiments, each light source 60 consumes about 2 watts of power.

In certain embodiments, the width of each light source 60 (measured generally laterally along the width of the mirror assembly) can be less than or equal to about 30 mm, about 20 mm, about 10 mm, about 7.5 mm, about 6.5 mm, about 5.0 mm, about 4.0 mm, values between the aforementioned values, or otherwise.

In some implementations, either or both the color and the color temperature of the light emitted from the mirror is independently adjustable. Using this adjustability, the light emitted from the light sources 60 can be configured to mimic or closely approximate light encountered in one or a plurality of different natural or non-natural light environments. For example, in some variations, the light emitted from the mirror can mimic natural light (e.g., ambient light from the sun, moon, lightning, etc.). In certain implementations, lighting conditions that match (or closely approximate) restaurants (e.g., incandescent lights, candlelight, etc.), offices (e.g., fluorescent lights, incandescent lights, and combinations thereof), outdoor venues at different times of day (dawn, morning, noon, afternoon, sunset, dusk, etc.), outdoor venues at different seasons (spring, summer, fall, winter), outdoor venues having different weather conditions (sunny, overcast, partly cloudy, cloudy, moonlit, starlit, etc.), sporting arenas, opera houses, dance venues, clubs, auditoriums, bars, museums, theatres, and the like can be achieved using the mirror assembly. In some variants, the light emitted from the mirror comprises a substantially full spectrum of light in the visible range. The mirror assembly can be configured to permit a user to select among the different types of light (e.g., color, temperature, intensity, etc.) emitted from the one or more light sources, either on the mirror assembly or from a remote source, or the mirror assembly can be configured to automatically select among the different types of light emitted from the one or more light sources.

In some variants, the intensity of individual light sources (e.g., LEDs or combinations of LEDs) is independently adjustable. In certain implementations, changes in color temperatures can be achieved by pairing LEDs having one color temperature with one or more different LEDs having one or more separate color temperatures. The relative intensity of light from those LEDs can then be individually adjusted (e.g., by adjusting the brightness of one or more LEDs) to increase or decrease the color temperature. In some embodiments, changes in colors (e.g., hues, shades, tints, tones, tinges, etc.) can be achieved by pairing one or more LEDs having one color with one or more LEDs having a different color. In some embodiments, the intensity of light emitted from different colored LEDs can be individually adjusted to cause a color change (e.g., to a color an individual LED or to colors achieved through combinations of the light emitted from the LEDs—color mixing). Adjusting the relative intensity of different LEDs can allow the user to adjust the color of the light emitted by the light sources, the color temperature of the light emitted by the light sources, the brightness of the light emitted by the light sources, or combinations thereof. In some embodiments, by adjusting the intensity of individual LEDs automatically (by selecting a preset light configuration, a downloaded light configuration, or an uploaded configuration) or manually (e.g., by adjusting color, tint, brightness, intensity, temperature, or others with manual user adjustments), the light conditions for any environment can be achieved.

As an example and as discussed elsewhere herein, in some embodiments, light emitters 64 can be paired with other light emitters to give desired colors and color temperatures. For instance, in some embodiments, LEDs (e.g., 1, 2, 3, 4 or more) having one color temperature (e.g., of 2700K) can be paired with LEDs (e.g., 1, 2, 3, 4 or more) having a different color temperature (e.g., of 6500K) to form a single light source (e.g., 60a). In some variants, one or more LEDs (e.g., 1, 2, 3, 4 or more) having a first color (e.g., red, orange, yellow, green, blue, indigo, violet, and the like) can be paired with one or more LEDs (e.g., 1, 2, 3, 4 or more) having a different color.

In certain variants, a light source (e.g., 60a) can be formed using LEDs (e.g., one or more LEDs) that emit incandescent light color temperatures and LEDs (e.g., one or more LEDs) that emit sunlight color temperatures. In certain variants, a pair of LEDs that emit warm (e.g., yellow-orange) color temperatures and a pair of LEDs that emit white light (e.g., cool white light) are used.

In some embodiments, LEDs having color temperatures of at least: about 1700K, about 1800 K, about 1900K, about 2000 K, about 2200 K, about 2400K, about 2600K, about 2800 K, about 3000 K, about 3200 K, about 3400 K, about 3600 K, about 3800 K, about 4000 K, about 4200 K, about 4400 K, about 4600 K, about 4800 K, about 5000 K, about 5200 K, about 5400 K, about 5600 K, about 5800 K, about 6000 K, about 6200 K, about 6400 K, about 6600 K, about 6800 K, about 7000 K, ranges spanning any two of the aforementioned values, values greater than the aforementioned values, or otherwise can be selected for use in the mirror assembly. In some embodiments, LEDs having color temperatures in the range from about 1700 K to about 2500 K, from about 2500K to about 3500 K, from about 3500 K to about 4500 K, from about 4500K to about 5500 K, from about 5500 K to about 6500K or from about 6500K to about 7000K can be independently paired with LEDs having colors temperatures within these same or different ranges. In some embodiments, light with color temperatures of at least: about 1700K, about 1800 K, about 1900K, about 2000 K, about 2200 K, about 2400K, about 2600K, about 2800 K, about 3000 K, about 3200 K, about 3400 K, about 3600 K, about 3800 K, about 4000 K, about 4200 K, about 4400 K, about 4600 K, about 4800 K, about 5000 K, about 5200 K, about 5400 K, about 5600 K, about 5800 K, about 6000 K, about 6200 K, about 6400 K, about 6600 K, about 6800 K, about 7000 K, ranges spanning any two of the aforementioned values, values greater than the aforementioned values, or otherwise can be achieved using mirror assembly.

By adjusting the intensity of paired LED lights, different color temperatures and intensities can be achieved (e.g., a color temperatures and intensities that approximate the light emitted by indoor lighting, such as an incandescent bulb or a fluorescent bulb, natural sunlight, an open flame from a candle or fireplace, or others). These color temperatures and intensities can be selected by a user to duplicate or replicate particular light environments to improve the selection of make-up color palates, to apply make-up in optimal configurations and patterns, and to optimize grooming and make-up application outcomes. For instance, a person applying make-up to be worn at a candlelit restaurant may wish to match the color temperature and light intensity of that environment when applying make-up. A person who is applying make-up to be worn at a sunlit picnic may wish to match the color temperature and light intensity of that environment when applying make-up. Thus, a user can select particular temperatures of light to replicate lighting conditions.

In certain embodiments, differing light emitters (e.g., LEDs) can be positioned at each end of a light path. For instance, LEDs with different emission characteristics can be positioned both at the proximal end 66a and the distal end 66c of a light path. This configuration gives maximal variability for light emitted from the light sources. For example, different LEDs can be used on each end of the light path to increase the number of color, color temperatures, and brightness settings that can be achieved.

In certain variants, the light emitters are controlled by an algorithm that selects individual light emitter intensities to provide an array of intensities, color temperatures, and color palates. In some embodiments, the light sources 60 can be adjusted to have a color temperature in the range from about 1700 K to about 6500 K from about 4500K to about 6500 K. In some embodiments, the light sources 60 have a color temperature of greater than or equal to about 2400 K and/or less than or equal to about 6800 K. In some embodiments, the color temperature of the light sources 60 is at least about 5500 K and/or less than or equal to about 3000 K. In certain embodiments, the color temperature of the light sources 60 is about 2700 K or about 6500K.

In some embodiments, the light sources 60 have a color rendering index of at least about 45 and/or less than or equal to about 95. Certain embodiments of the one or more light emitters 64 have a color rendering index (CRI) of at least about 50 and/or less than or equal to about 100. In some embodiments, the light emitters have a color rendering index of at least about 87 and/or less than or equal to about 92. In some embodiments, the light emitters have a color rendering index of at least about 80 and/or less than or equal to about 85. In some embodiments, the light emitters have a color rendering index of at least about 70 and/or less than or equal to about 75. In some embodiments, the light emitters have a color rendering index of at least about 45 and/or less than or equal to about 55.

In some embodiments, the luminous flux can be in a range from about 1 lm to about 110 lm. In some embodiments, the luminous flux can be adjusted to be less than or equal to about 1 lm, about 10 lm, about 20 lm, about 30 lm, about 40 lm, about 50 lm, about 60 lm, about 70 lm, about 80 lm, about 90 lm, about 100 lm, about 110 lm, about 140 lm, about 160 lm, about 170 lm, about 180 lm, values between the aforementioned values, ranges spanning the aforementioned values, or otherwise. In some embodiments, the luminous flux can be at least about 80 lm and/or less than or equal to about 110 lm. In some embodiments, the luminous flux can be at least about 90 lm and/or less than or equal to about 100 lm. In some embodiments, the luminous flux can be about 95 lm.

In some embodiments, the forward voltage of each LED 68 can be at least about 2.4 V and/or less than or equal to about 8.0 V. In some embodiments, the forward voltage can be at least about 5.5 V and/or less than or equal to about 7.5 V. In some embodiments, the forward voltage is about 2.5 to about 3.5 V.

The illuminance level can be higher at a distance closer to the face of the mirror. In certain variants, the lux at a distance of 6 inches from the sensor 80 (and/or the mirror 50) is about 600 lux. In certain variants, the lux at a distance of 6 inches from the sensor 80 (and/or the mirror 50) is at least about 1 lux and/or less than about 1400 lux, at least about 100 lux and/or less than about 1100 lux, at least about 200 lux and/or less than about 1000 lux, at least about 300 lux and/or less than about 900 lux, at least about 400 lux and/or less than about 800 lux, at least about 500 lux and/or less than about 700 lux, ranges between the values comprising the aforementioned ranges, or otherwise. In some embodiments, the illuminance at an outer periphery of the sensing region is at least about 500 lux and/or less than or equal to about 1000 lux. In some embodiments, the illuminance at an outer periphery of the sensing region is about 700 lux. In some embodiments, the illuminance at an outer periphery of the sensing region is about 600 lux. In some embodiments, the illuminance at an outer periphery of the sensing region is at least about $5 \times 10^{-5}$ lux (about the illuminance of starlight) and/or less than about $1 \times 10^5$ lux (about the illuminance of direct sunlight). In certain variants, the lux at the outer periphery of the sensing region is at least about $1 \times 10^{-4}$ lux and/or less than about $1 \times 10^4$ lux, at least about $1 \times 10^{-3}$ lux and/or less than about $1 \times 10^3$ lux, at least about $1 \times 10^{-2}$ lux and/or less than about $1 \times 10^3$ lux, at least about $1 \times 10^{-1}$ lux and/or less than about $1 \times 10^4$ lux, ranges between the aforementioned values, or otherwise.

In some embodiments, the sensing region extends about 8, 10, 12, 16, 18, or 24 inches away from the face of the mirror. Many other sensing regions can also be utilized, some of which are described herein. In certain variants, the mirror assembly 2 can include a dimmer to adjust the intensity of the light.

In some embodiments, the light sources 60 are configured to provide multiple colors of light and/or to provide varying colors of light. For example, the light sources 60 can provide two or more discernable colors of light, such as red light and yellow light, or provide an array of colors (e.g., red, green, blue, violet, orange, yellow, and otherwise). In certain embodiments, the light sources 60 are configured to change the color or presence of the light when a condition is met or is about to be met. For example, certain embodiments momentarily change the color of the emitted light to advise the user that the light is about to be deactivated.

In certain variants, an actuator, such as a button or a sensor (e.g., a capacitive touch sensor 71) is located behind a portion of a mirrored surface and can be activated by touching the mirrored surface in designated locations. In some embodiments, the capacitive touch sensor 71 sends signals to a controller module and allows the user to control one or more aspects of the light emitted from the light columns through directional finger movements or by touching specific areas of the capacitive touch sensor. For instance, in some embodiments, a user can swipe (or drag) a finger in one direction (i.e., left, right, down, up, or otherwise) over the capacitive touch sensor 71 to increase the color temperature. The user can then swipe a finger in an opposite direction to decrease the color temperature. In some variants, the user can drag a finger in a different direction over the capacitive touch sensor 71 to increase the brightness of the light emitted from the light columns and in an opposite direction to dim the light. In some embodiments, the color of the light emitted can be adjusted. In some embodiments, the user can tap a portion of the capacitive touch sensor to apply a light setting. In some embodiments, a capacitive touch sensor is not present.

In some embodiments, the capacitive touch sensor is operably connected (via a wire or a conduit) to the controller and/or one or a plurality of printed circuit boards (PCBs), which can provide hard wired feedback control circuits, a processor and memory devices for storing and performing control routines, or any other type of controller.

The mirror assembly 2 can include a sensor assembly 80, as shown in FIGS. 17-21. The sensor assembly 80 can be positioned near a lower region of the mirror assembly 2 or elsewhere (e.g., the top of the mirror, the bottom, a side, or otherwise). Alternatively, the sensor assembly can disposed along any other portion of the mirror assembly 2 or not positioned on the mirror assembly 2. For example, the sensor assembly can be positioned in any location in a room in which the mirror assembly 2 sits. In some embodiments, the sensor assembly can be located in a phone or other handheld device that activates the mirror assembly 2 when the user is in proximity to it.

In certain embodiments, the sensor assembly 80 comprises a housing 87 that supports one or more light transmitters 82a, 82b and one or more receivers 83. In some implementations, the housing 87 comprises hard or rigid plastic (e.g., injection molded or otherwise), rubber, synthetic polymer, metal, composite, or another similar material. In some embodiments, the housing 87 comprises a projection 88 (e.g., a step, lip, elevated platform, etc.) that projects from the main body 81 of the sensor assembly 80. In some embodiments, the sensor assembly 80 further comprises a gasket 85. In certain variants, the sensor assembly 80 further comprises a coverslip 86. In some embodiments, the coverslip 86 holds the gasket 85 in contact with or within the housing 87 and the gasket 85 is held in place by the housing 87 via the projection 88. In some variants, the coverslip fastens into the housing 87 using a fastener (e.g., a snap, clip, screw, etc.). In certain embodiments, the coverslip 86 provides consistent distributed pressure against the gasket 85 partially compressing it and/or holding it flush against the housing 87 via the projection 88. In some variants, the coverslip 86, the gasket 85, housing 87 assembly reproducibly provides a separation of the transmitter 82a, 82b signal from the receiver 83 signal.

In some embodiments, sensor assemblies can comprise hard plastics, semi-soft polymer, and/or partially pliable materials. However, these materials can warp and bend when affixed in a device or over time. This warping and bending may allow a signal from the transmitter to bleed directly into the receiver disrupting the settings of a device. In some embodiments, the sensor assembly 80, housing 87, gasket 85, and coverslip 86 configuration can allow reliable sealing of the transmitter from the receiver. Furthermore, the entire assembled sensor assembly 80 can be affixed to the head portion 40 of the mirror assembly via fasteners inserted through a sensor aperture 89. This sensory assembly 80 beneficially minimizes bleeding of signal from the transmitters 82a, 82b to the receiver 83 (e.g., laterally escaping or otherwise diffusing from the transmitters to the receiver through a portion of the sensor assembly). In some embodiments, this configuration can facilitate replacement and fixation of the sensor assembly in the mirror assembly 2.

In some embodiments, the gasket 85 is composed of a soft, resilient, and/or flexible material, such as a material selected from one or more of the following: silicone, PTFE, rubber, polyethylene, nylon, polypropylene, composite, and the like.

The sensor assembly 80 can include a proximity sensor or a reflective-type sensor. For example, the sensor 80 can be triggered when an object (e.g., a body part) is moved into, and/or produces movement within, a sensing region. The sensor assembly 80 can include one or more transmitters and receivers. In some embodiments, the mirror assembly 2 comprises two transmitters 82a, 82b and a receiver 83. The transmitters can be configured to produce a signal (e.g., electromagnetic energy such as infrared light), and the receiver can be configured to receive that signal (e.g., electromagnetic energy such as infrared light). In certain embodiments, as shown in FIGS. 1 and 2, transmitter apertures 84 can be present to facilitate signal transmission by the transmitters through the mirror 50. In some embodiments, the receiver apertures are not present or necessary. In some embodiments, these apertures are not present on the surface of the mirror or are so small that they are not noticeable to the user. In some embodiments, when the apertures are not present, the transmitters transmit through a two-way portion of the mirror surface (e.g., a partially transparent and partially reflective portion of the mirror where, when one side of the mirror is lit and the other is dark, it allows viewing—or transmission—through the mirror from the darkened side but not from the lit side). The beam of light emitting from the light emitting portions 82a, 82b can define a sensing region. In certain variants, the transmitter can emit other types of energy, such as sound waves, radio waves, or any other signals. The transmitter and receiver can be integrated into the same sensor or configured as separate components.

In some embodiments, the light emitting portions 82a, 82b can emit light in a generally perpendicular direction from the front face of the mirror assembly. In some embodiments, the light emitting portions 82a, 82b emit light at an angle from a perpendicular to the front face of the mirror assembly by at least about 5 degrees and/or less than or equal to about 45 degrees. In some embodiments, the light emitting portions 82a, 82b emit light at an angle from a perpendicular to the front face of the mirror assembly by at least about 15 degrees and/or less than or equal to about 60 degrees. In certain embodiments, the light emitting portions 82a, 82a emit light at a downward angle of about 15 degrees.

In some embodiments, the sensor assembly 80 can detect an object within a sensing region. In certain embodiments, the sensing region can have a range from at least about 0 degrees to less than or equal to about 45 degrees downward and/or upward relative to an axis extending from the sensor assembly 80, and/or relative to a line extending generally perpendicular to a front surface of the sensor assembly, and/or relative to a line extending generally perpendicular to the front face of the mirror and generally outwardly toward the user from the top of the mirror assembly. In certain embodiments, the sensing region can have a range from at least about 0 degrees to less than or equal to about 25 degrees downward and/or upward relative to any of these axes or lines. In certain embodiments, the sensing region can have a range from at least about 0 degrees to less than or equal to about 15 degrees downward relative to any of these axes or lines. In some embodiments, the sensing region extends a particular distance away from a mirrored surface of the mirror system, such that any objected detected within such distance will cause the sensor assembly 80 to trigger, causing the one or more mirror lights, or some other functionality of the mirror system, to actuate. Any feature, structure, material, or step that is described and/or illustrated in U.S. Patent Application Publication No. 2013/0235610 for sensing proximity to assist in actuating one or more functions, or for increasing the sensitivity of a sensor assembly, can be used with or instead of any feature, structure, material, or step that is described and/or illustrated in the rest of this specification, as with all other disclosure.

In some embodiments, the sensing region can be adjusted by mounting the sensor assembly 80 at an angle. In certain embodiments, the sensor assembly 80 can be mounted such that the front surface of the sensing assembly 80 can be generally parallel or coplanar with a front surface of mirror 50. In certain embodiments, the sensor assembly 80 can be mounted such that the front surface of the sensing assembly 80 can be at an angle relative to the front surface of the mirror.

In certain embodiments, the sensor assembly 80 requires only enough power to generate a low power beam of light, which may or may not be visible to the human eye. Additionally, the sensor assembly 80 can operate in a pulsating mode. For example, the light emitting portion 82 can be powered on and off in a cycle such as, for example, for short bursts lasting for any desired period of time (e.g., less than or equal to about 0.01 second, less than or equal to about 0.1 second, or less than or equal to about 1 second) at any desired frequency (e.g., once per half second, once per second, once per ten seconds). Cycling can greatly reduce the power demand for powering the sensor assembly 80. In operation, cycling does not degrade performance in some embodiments because the user generally remains in the path of the light beam long enough for a detection signal to be generated.

If the receiving portion 83 detects reflections (e.g., above a threshold level) from an object within the beam of light emitted from the light emitting portions 82a, 82b, the sensor assembly 80 send a signal to the controller to activate a light source. In some embodiments, the controller assembly is operably connected (via a wire or a conduit) to one or a plurality of printed circuit boards (PCBs), which can provide hard wired feedback control circuits, a processor and memory devices for storing and performing control routines, or any other type of controller.

In some embodiments, the sensor assembly 80 can send different signals to a controller based on the amount of light reflected back toward the receiver 83a, 83b. For example, in certain variants, the sensor assembly 80 is configured so that the amount of light emitted by the light sources 60 is proportional to the amount of received light, which can indicate the distance between the mirror 50 and the user. In certain variants, if the user is in a first sensing region, then the controller causes the one or more light sources 60 to activate from an off state or to emit a first amount of light. If the user is in a second sensing region (e.g., further away from the sensor assembly 80 than the first sensing region), then the controller causes the one or more light sources 60 to emit a second amount of light (e.g., less than the first amount of light).

In certain variants, the controller can trigger at least two different levels of brightness from the light sources 60, such as brighter light or dimmer light. For example, if the user is anywhere in a first sensing region, then the controller signals for bright light to be emitted; if the user is anywhere in a second sensing region, then the controller signals for dim light to be emitted.

The controller can also trigger more than two brightness levels. In certain implementations, the level of emitted light is related (e.g., linearly, exponentially, or otherwise) to the distance from the sensor to the user. For example, as the user gets closer to the sensor assembly 80, the one or more light sources 60 emit more light. Alternatively, the mirror assembly 2 can be configured to emit more light when the user is further away from the sensor assembly 80, and less light as the user moves closer to the sensor assembly 80 (as may be configured using user settings). In some embodiments, the multiple sensing regions allow the mirror assembly to calculate the distance an object is from the mirror and to adjust lighting settings accordingly. For instance, in certain implementations, based on the distance the object is from the mirror assembly, an algorithm can calculate the amount of illumination necessary to illuminate the object. Based on the distance, more or less light can be emitted from the light source to illuminate the object.

In some embodiments, the sensor assembly can include at least two light emitting portions. Each transmitter can emit a cone of light with proper shielding or guiding on the transmitters, which defines the detection zones of the sensors (subject to the nominal range of the sensors). The area in which the two cones overlap creates a primary sensing region, and areas in which the two cones emit light but do not overlap create a secondary sensing region. If a user is detected in the primary sensing region, then the sensor assembly can send an appropriate signal to the controller, which triggers a first level of light from the light sources. If a user is detected in the secondary sensing region, then the sensor assembly sends an appropriate signal to the controller, which activates a second level of light from the light sources. In some embodiments, the first level of light is brighter than the second level of light. In other embodiments, the second level of light is brighter than the first level of light. In some embodiments, the sensor assembly defines more than two sensing regions and triggers more than two levels of light.

In some embodiments, the light emitting portions 82a, 82b can be positioned generally along the same horizontal plane (e.g., relative to the ground). The sensor assembly can issue an appropriate signal to the controller, which can trigger brighter light when the user is within a first sensing region, directly in front of the sensor assembly 80. The sensor assembly 80 can trigger dimmer light when the user is within a second sensing region, in the periphery of the mirror assembly 2.

The sensor assembly 80 can include two or more light emitting portions 82a, 82b that do not create overlapping detection cones within the nominal range of the sensors 80. A first cone of light defines a first sensing region and a second cone of light defines a second sensing region. If a user is detected in the first sensing region alone or the second sensing region alone, then the sensor assembly 80 signals the controller, which activates a first level of light from the light sources 60. In certain variants, if a user is concurrently detected in the first and second sensing regions, then the sensor assembly 80 signals the controller to activate a second level of light from the light sources 60. In some embodiments, the first level of light is brighter than the second level of light. In other embodiments, the second level of light is brighter than the first level of light.

Activation of the light sources 60 or adjusting the amount of light emitted from the light sources 60 can be based on factors other than the presence of a user within a sensing region. For example, the amount of light emitted from the light sources 60 can adjust based on motion within the detection zone and nominal range of the sensor 80. Certain implementations are configured such that, if a user moves his/her hand in an preset direction (e.g., up, down, left, right, diagonally, etc.), then the controller changes an aspect of the light emitted from the light source 60 (e.g., color temperature change, color, or light intensity). If the user moves then moves his/her hand in a in the opposite direction, the opposite light effect will be accomplished.

Once a light source 60 activates, the light source 60 can remain activated so long as the sensor assembly 80 detects an object in a sensing region. Alternatively, the light source 60 remains activated for a pre-determined period of time. For example, activating the light source 60 can initialize a timer. If the sensor assembly 80 does not detect an object before the timer runs out, then the light source 60 is deactivated. If the sensor assembly 80 detects an object before the timer runs out, then the controller reinitializes the timer, either immediately or after the time runs out.

In some embodiments, the sensor assembly 80 can detect an object's movement in a sensing region. In certain implementations, when the object's movement is sufficient in nature, the mirror assembly will activate. In some variants, the sufficiency of an object's movement is based on whether the moving object is of a certain minimum size (e.g., about that of a human adult or child), whether the movement of the object is of a certain minimum speed (e.g., an average walking speed, or the speed of waving hand), and/or whether the movement of the object is of a certain maximum distance from the mirror assembly (e.g., less than about 10, 5, 3, 2, or 1 foot).

Once activated, the light source 60 can remain activated for a pre-determined period of time. For example, as discussed above, activating the light source 60 can initialize a timer. If the sensor assembly 80 does not detect sufficient movement from the object before the timer runs out, then the light source 60 deactivates. However, if the sensor assembly 80 detects movement sufficient in nature before the timer runs out, then the controller reinitializes the timer, keeping the mirror assembly in an active state. In some embodiments, the amount of object movement required to reinitialize the timer can be the same as or smaller in kind, speed, or frequency than the amount of movement sufficient to initially activate a mirror assembly that is inactive, or the proximity distance of the object to the mirror assembly can be the same as or greater than the proximity distance of the object to the mirror assembly sufficient to initially activate the mirror system that is inactive. For instance, in certain embodiments, a movement that is insufficient to activate the mirror assembly in the first place can be sufficient to keep the mirror assembly active once in the active state. The timing and increased sensitivity features can be used to ensure that the mirror assembly does not deactivate prematurely or unexpectedly or at a time when it is still in use.

The one or more sensing regions can be used in any type of configuration that allows the user to control an aspect of the operation of the mirror assembly 2. For example, the one or more sensing regions can be used to trigger the mirror assembly 2 to emit different levels of light, operate for varying durations of time, pivot the mirror, or any other appropriate parameter.

In several embodiments, the mirror assembly 2 has one or more modes of operation, for example, an on mode and an off mode. A controller can activate different modes based on signals received from different sensing regions, motions, or any other parameter. Any of the modes described below can be used separately or in combination with each other.

The mirror assembly 2 can include a task mode. When the task mode is activated, the mirror assembly 2 can trigger a light source 60 to remain activated or cause the sensor to enter a hyper mode (e.g., during which the sensor is configured to have increased sensitivity to movement within a zone, or to have a larger or wider sensitivity zone, or to have some other increased sensitivity signal detection) for a pre-determined period of time. For example, in some embodiments, the task mode can be especially useful when the user plans to use the mirror assembly 2 for an extended period of time, especially if the user's body position is substantially still for an extended period, to avoid intermittent loss of lighting while the user is still looking into the mirror. The task mode can trigger a light source 60 to remain activated for a predetermined amount of time, even if the user is not detected within a sensing region. The pre-determined amount of time can be less than or equal to about: 3 minutes, 5 minutes, 10 minutes, or any other suitable period of time. If the sensor assembly 80 does not detect a user before the timer runs out, then the mirror assembly 2 deactivates task mode. In certain embodiments, the mirror assembly 2 remains in task mode until the user signals a light source 30 to deactivate.

The mirror assembly 2 can include a power saver mode. When the power saver mode is activated, the light source 60 emits less light than the mirror assembly 2 when not in power saver mode. The power saver mode can be user-activated and can be used when a user plans to use the mirror for a relatively long period of time. Alternatively, the mirror assembly 2 enters power saver mode automatically as a transition between on mode and off mode. For example, a controller can initialize a timer when a light source 60 activates. If the sensor assembly 80 does not detect a user before the timer runs out, then the controller enters power saver mode and initializes a second timer. If the sensor assembly 80 does not detect a user before the second timer runs out, then the controller deactivates the light source 60.

The mirror assembly 2 can include a hyper mode. As described above, in some embodiments, the mirror assembly 2 can have two light emitting portions. In certain implementations, the controller only triggers the light sources 60 to activate when the sensor assembly 80 detects an object in the region where the two cones of light intersect (e.g., the primary sensing region). In some embodiments, after the light source 60 has been activated, the mirror assembly 2 enters hyper mode. The controller can keep the light sources 60 activated as long as the sensor assembly 2 detects the user in either one or both of the cones of light (the secondary or the primary sensing regions). The secondary sensing region can be different from the primary sensing region. For example, the secondary sensing region can be larger than the primary sensing region. In some embodiments, this allows the user to move around and still keep the light source 60 activated. Hyper mode can also help save power by preventing unintentional activation when the user is near a periphery of the mirror assembly 2.

The mirror assembly 2 can also include ambient light sensing capabilities. For example, when the ambient light is relatively low, the light emitting from the light source 60 will be brighter than if the ambient light is relatively bright. The light receiving portion 83 can detect both ambient light and light emitted from the transmitter 82, or the mirror assembly 2 can include a second sensor assembly for detecting ambient light.

The controller can adjust the amount of signal necessary to trigger a light source 60 based on the amount of detected ambient light. For example, the amount of detected light required to activate the light sources 60 can be proportional to the ambient light. Such a configuration can allow the light source 60 to be activated even when the level of ambient light is modest (e.g., in dimmed bathroom lighting). When the ambient light is less than or equal to a first level, the controller activates light source 60 when a first level of the reflected signal is detected. When the ambient light is greater than the first level, the controller activates light source 60 when a second level (e.g., greater than the first level) of the reflected signal is detected.

The controller can also adjust the amount of light emitted by the light sources 60 based on the ambient light. Such a configuration can, for example, avoid emitting a starting burst of very bright light that would be uncomfortable to a user's eyes, especially when the user's eyes were previously adjusted to a lower light level, such as when the surrounding environment is dim. For example, the amount of light emitted by the light sources 60 can be proportional to the amount of ambient detected light.

The controller can also gradually increase the level of emitted light from the light sources 60 when the light sources 60 are activated and/or gradually decrease the amount of light emitted from the light sources 60 when the light sources 60 are deactivated. Such a configuration can inhibit discomfort to a user's eyes when the light sources 60 turn on.

The mirror assembly 2 can also include a calibration mode. For example, the calibration mode can calibrate the different sensing regions with different output characteristics as desired by the user. An algorithm can be configured to utilize multiple sensing regions to perform different functions. For example, a user can configure a first sensing region to correspond with a first level of light (e.g., lower intensity light) and configure a second sensing region to correspond with a second level of light (e.g., higher intensity light). In another example, the user can adjust the size (e.g., width or height) of the sensing region. The user can designate a first sensing region to correspond with a first level of light and designate a second sensing region to correspond with a second level of light. This calibration mode can be triggered by a user indicator, such as pressing a button, activating a sensor, or any other appropriate mechanism.

In some embodiments, an ideal sensing region is designed so that the center of a user's face is generally positioned at about the center of the mirror portion, at a suitable perpendicular distance away from the mirror to permit the user to generally closely fit the user's face within the outer periphery of the mirror. A proximity sensor, generally positioned at a bottom region of the mirror, can be tilted upwardly at an angle above horizontal (e.g., at least about 10 degrees upward, such as about 15 degrees upward), and an algorithm can trigger a power change to the mirror when a user's face (or any other object) is detected within a predetermined range of distances in a perpendicular forward direction from the front face of the mirror. For example, in some embodiments, the first region can be within a range of at least about 10 inches and/or less than or equal to about 12 inches (e.g., about 11 inches) from the front face of the mirror, and the second region can be in a range of at least about 7 inches and/or less than or equal to about 9 inches (e.g., about 8 inches) from the front face of the mirror.

An algorithm can be configured to send a command to activate the light sources 60 based on detected signals. The algorithm can also be configured to emit different levels of light or vary durations of time. The algorithm can also be configured to send a command to trigger one or more modes, including any of the modes discussed above. The command can vary based on the signal received. For example, the signal can depend on the distance between an object and the sensor assembly 80, and/or other parameters such as duration or path of motion.

The algorithm can initialize a timer when a light source is activated. The timer can run for at least 30 seconds and/or less than or equal to 60 seconds, or any other quantity of time. In some embodiments, the timer can run for less than 30 seconds. In some embodiments, the timer can run for about five seconds. In some embodiments, the light source will immediately turn off when the time runs out. In some embodiments, the light will remain activated so long as the sensor assembly 80 detects an object before time runs out. If the sensor assembly 80 detects the object, the timer can immediately restart, or restart when the time runs out. If the sensor assembly 80 does not detect an object before the time runs out, then the light source will turn off.

The algorithm can incorporate a delay that deactivates the sensor or otherwise prevents a light source 60 from emitting light immediately after the light source 60 deactivates. The delay can be for 1 second, 5 seconds, or any other amount of time. The delay helps prevent the user from unintentionally triggering the light source 60. During the delay period, the light source 60 will not emit light even if an object is in a sensing region during the delay period. If the sensor assembly 80 detects an object after the delay period, the light sources 60 can emit light again.

In some embodiments, the level of light emitted from the light sources 60 does not depend on the length of time that the user remains in the sensing region. The level of light emitted from the light sources 60 can differ depending on the location of the user in a different sensing region, even if certain other parameters are the same (such as the length of time that the user is sensed in a region).

In some embodiments, the mirror assembly 2 can include an algorithm configured to maintain the light source (e.g., LED) brightness at a generally constant level even as the battery capacity is nearing the end of its life (necessitating a recharge) by adjusting the electrical characteristics of the power source supplied to the light source depending on the stage of battery life (e.g., increasing the voltage as the current decreases or increasing the current as the voltage decreases).

In some embodiments, the mirror assembly 2 can include an algorithm configured to detect whether the mirror was inadvertently activated, such as with a false trigger or by the presence of an inanimate object. For example, when the sensor detects an object, the controller can initialize a timer. If the mirror assembly 2 does not detect any movement before the timer runs out, then the light sources will turn off. If the mirror assembly 2 does detect movement, then the timer can re-initialize.

As noted above, the mirror assembly 2 can include a processor, which can control, by various scheme and algorithms, input and output characteristics and functions of the mirror assembly 2. In some embodiments, the processor is responsive to signals received by the sensor assembly 80 and/or the capacitive touch sensor 71. In certain embodiments, the processor enables the sensor assembly 80 or the capacitive touch sensor 71 to control any one or more of the mirror assembly 2 algorithms (e.g., algorithms regarding the sensor regions, brightness of the light sources, warmth of the light sources, color of the light, CRI, etc.).

The mirror assembly 2 can also include memory, such as firmware, to store the various user settings, control schemes, and algorithms, as well certain instructions and/or settings related to various characteristics of the mirror assembly 2. For example, the memory can include instructions and/or settings regarding the size of the sensing regions, the sensitivity of the sensors, the level of output light, the length of various timers, and otherwise.

The mirror assembly 2 can be configured such that a user can modify (e.g., update, program, or otherwise) the memory, such as by connecting the mirror assembly 2 to a computer (e.g., a smartphone, laptop, etc.) that is equipped with software or an "app" that is configured to enable the computer and/or the mirror assembly to perform any of the functions, tasks, and/or steps described and/or illustrated herein. For example, the mirror 2 can be communicatively connected with a computer via the port 78 (e.g., using a USB, cable). Data can be transferred between the computer and the mirror assembly 2 via the port 78. The mirror assembly 2 can alternatively be configured to communicate with a computer or network wirelessly, such as by a cellular, Wi-Fi, or Bluetooth® network, infrared, or otherwise.

In some embodiments, a database containing light information for particular environments can be assembled (e.g., by a user or a third party) and stored in the memory on the mirror assembly 2 and/or on the computer. This database can contain, for example, particular light parameters (e.g., color temperature, light intensity, color hue, etc.) for individual environments (e.g., restaurants, outdoor venues at different times of day or season or with different weather conditions, sporting arenas, opera houses, dance venues, clubs, auditoriums, office, bar, etc.). In certain embodiments, individual outside light environments can include, for example, sunny, overcast, cloudy, rainy, dawn, dusk, twilight, etc. In some embodiments, a user can access this database in setting the light parameters of the mirror assembly 2 in order to perform light-matched personal grooming and make-up application (e.g., in preparation for attending a database-listed or similar venue). For instance, in certain variants, the user can download a venue's light parameters into a device (e.g., a handheld device, a tablet, a computer, a thumb drive, a smartphone) and transfer that information to the mirror assembly 2 (e.g., by connecting the device to the mirror assembly using a conduit and the port or wirelessly using Bluetooth® or Wi-Fi). Once downloaded (e.g., to a processor or to a memory storage unit), the mirror assembly can automatically set the light parameters to match the suggested settings in the database. In some embodiments, any of these light settings can be preset and/or included on a memory of the mirror assembly (e.g., without need for download from a database). In some embodiments, the user can manually select any of these preset settings (e.g., using a touch screen, capacitive touch sensor, buttons, a wireless device, etc.) or the user can manually create and save one or more different settings from the user's own personal adjustments. Personal (e.g., manual) adjustments can be performed by manipulating one or more of the tint, color, color temperature, brightness, and light intensity of the light emitted from the light assembly (e.g., using a touch screen, capacitive touch sensor, buttons, a wireless device, etc.).

In some embodiments, the mirror assembly 2 can be configured to access environmental information (date, time, season, weather, etc.) from an information source (e.g., the internet, a home system, etc.). In some embodiments, this information can be transferred to the mirror assembly wirelessly or through a wired connection. In some embodiments, the mirror assembly 2 can include a software or hardware module with an algorithm that selects particular light parameters automatically based on the environmental information to best match those conditions. In some embodiments, the mirror assembly comprises learning devices and/or can be integrated to communicate with such devices (e.g., NEST® devices). In some embodiments, this feature allows the mirror assembly to function and/or program or adjust itself based on user activity (e.g., whether the user is home, in bed, in the bathroom, etc.) and/or based on information gathered by an integrated device (e.g., a NEST® device). In some embodiments, after information is received, the mirror assembly can automatically select lighting settings based on, for example, outside weather (e.g., outside lighting conditions), ambient lighting, the presence of someone in the home (e.g., for power conservation, etc.), time of the day (e.g., to act as an alarm by flashing light, a night light, etc.), or otherwise. In some embodiments, any of the above features can be turned-off or overridden based on input from the user.

In some embodiments, the mirror assembly can act as an alarm or a reminder or a conveyor of one or more types of information to the user. For example, in some embodiments, the mirror assembly can indicate it is time for an event or that a particular amount of time has elapsed or a particular time of day has arrived. In certain implementations, the mirror assembly alarm feature operates by providing a cue to the user when a time is reached (e.g., time to wake-up, time to shower, time to apply make-up, time to leave for school, work, or some other event). In some embodiments, the alarm can be set manually by the user and/or can be set automatically. For instance, the user can set the alarm feature to activate (or deactivate) at a specific recurring time on weekdays and another different time on weekends. When set to automatically activate and deactivate, the mirror assembly can set alarms based on specific information regarding the user, such as specific entries in, for instance, the user's personal electronic calendar. In certain implementations, the automatic alarm setting can be based on past behaviors of the user, or on information gathered from public sources (e.g., the internet).

In some embodiments, the mirror assembly can automatically adjust the timing of an alarm when, for example, the timing of an event has been delayed, or traffic conditions to an event have changed. The mirror assembly can also display suggest alarm changes prior to making them and can display the reasoning for a suggested change (on a LCD screen or the like). Similarly, in some embodiments, the mirror assembly can adjust or suggest different light settings based on changed weather or other light characteristics.

In some embodiments, the alarm cue provided to the user is visual. Visual cues could include flashing of the light sources, dimming of the light sources, powering-down of the mirror assembly (and light sources), brightening of the light sources, color changes of the light source (intermittently flashing an alarm color to the user), etc. In some variants, other or additional features of the mirror assembly provide visual cues. For instance, in some embodiments, an LED (light bulb, colored panel, etc.) is provided on the periphery of one or more of the mirror surfaces or the mirror frame. In some embodiments, the alarm LED illuminates, blinks, or provides other visual cues to the user. In certain embodiments, the alarm can be hidden behind the a portion of a mirrored surface that functions as a two-way mirror such that the visual cue and alarm system only become visible through the mirrored surface when lit. In some embodiments, the mirror assembly comprises a display (as explained elsewhere herein) that includes features that can act as an alarm. For instance, the display can show a timer, a clock, reducing bar scale, a colored indicator (e.g., that changes from green to yellow to red), or the like to indicate it is time for an event (e.g., time to go).

In certain variants, the cue is auditory. Auditory cues include one or more of a ring, beep, beeping, a buzzer, turning on music or a radio broadcast, the quieting or silencing of music or a radio broadcast, statements made by a voice (e.g., indicating "good morning," "time to go," or "good night", etc.), etc. In some embodiments, where the auditory cue is a voice, the voice can be recorded (e.g., by the user), prerecorded (e.g., a preset installed during manufacture), a computerized, or downloaded using an app.

In certain implementations, the cue provided to the user is some other sensorially perceived indicator (e.g., a vibration or other physical cue). In some embodiments, more than one cue (or cue type) can be used in combination.

In some embodiments, a device providing the alarm (visual, auditory, physical, or otherwise) is located on the base, shaft, or head of the mirror assembly. In some embodiments, for instance, the cue is provided by a speaker that can be located on the back, front, side, top or bottom of the mirror assembly, the shaft, the base, or otherwise.

In some embodiments, the software or hardware module in the mirror assembly or computer can be configured to enable a user to set particular default settings of the mirror assembly 2 using a computing device (e.g., a computer, smartphone, or the like) to download particular desired settings from the mirror assembly (e.g., a favored color temperature, light intensity, color hue, etc.). In certain variants, software or hardware module in the mirror assembly or computer can be configured to enable the user can later reset the mirror assembly to those desired settings by uploading them from the computing device (e.g., wirelessly, wired, or otherwise). In certain embodiments, the user can set particular mirror assembly settings (e.g., lighting settings, mirror positions, etc.) and save/store those settings.

In some embodiments, when attending a particular venue, the user can use a sensing device (e.g., on a smart phone, other mobile electronic communication device, or another data collecting device) to detect particular light parameters of the environment. In certain implementations, the user can then capture light information at the venue using the sensing device. The user can later use this light parameter information to calibrate the mirror assembly 2 to match that particular environment (or to create a new preset light environment that can be stored in a memory of the mirror assembly). In some embodiments, an application (software, etc.) can be loaded onto the sensing device to allow the user to capture light information at a particular venue. In some variants, for instance, a light environment capture application (available at an app store or online) is downloaded to a mobile communication device and when the app is opened, light information can be captured automatically, by actuation of a button on the device, or by touching engaging a touchscreen. In some embodiments, the user can gather lighting information, such as by taking a picture or a "selfie" using the sensing device. Then, in certain implementations, the lighting information or picture or "selfie" can be analyzed by software or an application to capture light environment information therefrom.

In some embodiments, a calibrating implement can be used to detect particular light parameters of the environment. For instance, in certain implementations, a calibrating card can be used. In some variants, the calibrating card contains various shapes or images with various colors, or shades of colors. In some embodiments, when the sensing device views the calibrating card (e.g., when ambient light that is reflected off the card is sensed by the sensing device), the light parameters of the environment are captured.

Other types of interactions (additionally or alternatively) between the mirror system, mobile devices, and a user are possible in addition to those described above. For example, a user may be able to input data into or control the mirror system through other devices, such as keyboards, mouses, or remote controls. In some embodiments, the mirror system settings can be implemented with one or more computing devices, such as several interconnected devices. Thus, each of the components depicted in the mirror system can include hardware and/or software for performing various features.

In some embodiments, the mirror system and/or the computing device comprises a non-transitory, computer-readable medium storing computer-executable instructions for the mirror system or assembly. In certain embodiments, the computer-readable medium storing computer-executable instructions, when executed by one or more processors, cause the one or more processors to perform one or more of the following: receive a light environment information from a sensing device; compare the light environment received by the sensing device to light settings on a mirror assembly; indicate a deviation from or proximity to the light environment based at least in part on the comparison of the light environment and the light settings on the mirror assembly; adjust the light settings of the mirror assembly to match or approximate the light environment information.

In certain embodiments, the one or more processors are configured to cause a display to display an indication of one or more aspects of the light environment and/or the light settings. For example, in some embodiments, the display displays the deviation between the light environment and light settings, information about the light environment (when it was captured—date, time, season, temperature, etc.), a prompt (asking whether the user would like to change one or more of the light settings to match the light environment information), etc.

In some embodiments, the non-transitory, computer-readable medium storing computer-executable instructions is located in a mobile device or is located in a medium configured to be downloaded onto a mobile device (such as over the internet). In some embodiments, the non-transitory, computer-readable medium storing computer-executable instructions is located on the mirror assembly.

As described elsewhere herein, in some embodiments, the mirror assembly and its components are actuated by or include one or more computing devices. For example, in some embodiments, a computing device (either as part of or remote from the mirror system) that has components including a central processing unit (CPU), input/output (I/O) components, storage, and/or memory may be used to execute any, some, or all of the processes of the mirror system. The I/O components can include a display (e.g., a touch screen), a network connection to the network, a computer-readable media drive and other I/O devices (e.g., a keyboard, a mouse, speakers, a touch screen, etc.). Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces. In some embodiments, the mirror system may be configured differently than described above.

One or more of the settings of the mirror assembly or other information as described elsewhere herein can be stored as one or more executable program modules in the memory of the computing device and/or on other types of non-transitory computer-readable storage media, and the mirror system can interact with computing assets over a network or other communication link. In some embodiments, the mirror system may have additional components or fewer components than described above.

In certain implementations, each of the processes, methods and algorithms described anywhere in this specification may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

When the mirror assembly 2 is in electronic communication with the computer, a software or hardware module (e.g., an "app") can be configured to display a control panel on the computer and/or to perform any or all of the tasks, steps or functions that are illustrated and/or described herein. The control panel may allow the user adjust various input and output characteristics for the mirror assembly 2. For example, a user can use the control panel to adjust the output of the emitting portions and/or the sensitivity of the transmitter. The user can also configure the light levels associated with the first and second sensing regions. In another example, the user can adjust the size (e.g., depth, width, and/or height) of one or more of the sensing regions. In some implementations, the user can use the control panel to modify the operation and output (e.g., intensity and/or color of the light) of the light source 60 based on certain conditions, such as the time of day, level of ambient light, amount of battery power remaining, and otherwise. In certain variants, the ability to modify the operational parameters of the mirror assembly 2 with the control panel can reduce or obviate the need for one or more adjustment devices (e.g., buttons, knobs, switches, or the like) on the mirror assembly 2, thereby providing a generally uniform exterior surface of the mirror assembly 2 (which can facilitate cleaning) and reducing the chance of unintentional adjustment of the operational parameters (such as when transporting the mirror assembly 2).

In various embodiments, instead of or in addition to the control panel (and/or the capacitive touch sensor described elsewhere herein), one or more physical dials (or knobs, switches, slide keys, buttons, etc.) can be provided on the mirror assembly to perform or actuate any function described and/or illustrated in this specification. These physical structures, like the control panel (or capacitive touch sensor), can be used to change any of the various settings of the mirror assembly described herein (e.g., the quality of the light emitted, volume of sounds emitted, timing of alarms, brightness of displays, etc.).

In certain implementations, instead of or in addition to the other control mechanisms described herein, a display (e.g., a virtual display, touchscreen, LCD, OLED, LED, or the like) can be provided on the mirror assembly. In some embodiments, the display is hidden from sight (e.g., on the back of the mirror). In some variants, the display is behind (and/or is within) one or more portions of a mirrored surface of the mirrored assembly. For example, in some embodiments, the display is in a position that is behind a two-way mirror portion of a surface of the mirror assembly. Upon illumination, the display becomes visible to the user. In some variants, when inactive, the display is no longer visible and appears to be just another portion of the mirror. In certain implementations, the display is activated by an input from the user (e.g., by touching a portion of the mirror or the display, by stating a voice command, by making a movement that the mirror is programmed to recognize, or by any of the other activation methods described elsewhere herein).

In some embodiments, the display can be configured to perform any or all of the tasks, steps or functions that are illustrated and/or described herein. For example, in certain implementations, the display is in electronic communication with a capacitive touch sensor (e.g., a touch screen). When active, the display can indicate some level of a lighting variable (e.g., brightness, color temperature, etc.). The capacitive touch sensor can then receive an input from the user to change that variable through a predetermined slide, tap, or rotation of the finger. For example, in some embodiments, the display shows one or more virtual dials, knobs, or switches that can be used to change qualities of the light emitted from the light columns (e.g., the brightness, color, or temperature of the light).

In some variants, the display can also (or alternatively) be used to provide information to the user. For example, in some embodiments, the display can act as a clock, an advertisement block, a text message panel (displaying text messages received by a user's smart phone), an email panel (displaying email messages received by a user's email address), or the like. In some implementations, the display receives information from an information source (e.g., the internet, a home computer, etc.) and, based on a user's past behavior (e.g., purchases, websites visited, etc.), transmits related information to the user. As an illustration, based on past make-up purchases, the display may provide information about similar make-up, sales, promotions, etc. Based on past venues that the user has attended, the mirror may suggest other similar events. The display may also provide information about events that are upcoming (e.g., alarms) with updates as to traffic conditions or changed meeting times.

In certain variations, the mirror assembly may comprise facial recognition features. In some instances, several different subjects may make use of the same mirror assembly. Facial recognition allows the mirror assembly to recognize a particular user and to select certain baseline parameters based on that user. For instance, if "User 1" works under fluorescent lights on weekdays, the mirror assembly could load a corresponding light profile on weekday mornings when that "User 1" is recognized. If "User 2" works primarily in environments lit by incandescent bulbs on weekends, when that user is recognized, those light parameters could be selected. In some embodiments, a specific individual's email, texts, or suggested promotions are displayed based on that individual's proximity to the mirror.

In certain implementations, the facial recognition feature allows the display to show tailored/targeted promotions (e.g., for make-up etc.) to specific users. For illustration, in some embodiments, the mirror may assess the complexion, skin tone, or hair color of the user. In some variants, the display can then suggest products for the user to purchase. In some embodiments, when a product or promotion is displayed, the user can purchase or bookmark an item by touching the capacitive touch sensor in a specific area (e.g., a "purchase" or "bookmark" button).

In some implementations, when the mirror assembly 2 is in communication with a computer, data can be transferred from the mirror assembly 2 to the computer. For example, the mirror assembly 2 can transfer data, such as power consumption, estimated remaining battery power, the number of activations and/or deactivations of the light source 60, the length of use (e.g., of individual instances and/or in total) of the light source 60, and otherwise. Software can be used to analyze the transferred data, such as to calculate averages, review usage statistics (e.g., during specific periods), recognize and/or draw attention to unusual activity, and display usage statistics on a graph. Transferring usage statistics from the mirror assembly 2 to the computer allows the user to monitor usage and enables the user to calibrate different characteristics of the mirror assembly 2 (e.g., based on previous usage and parameters). Transferring data from the mirror assembly 2 to the computer can also reduce or avoid the need for one or more adjustment or display devices on the mirror assembly itself.

When the mirror assembly 2 is in communication with the computer, the mirror the computer can also transfer data to the mirror assembly 2. Furthermore, when the mirror assembly 2 is in communication with the computer, electrical potential can be provided to the battery 74 before, during, or after such two-way data transfer.

On the rear side of the mirror assembly 2, the housing 10 can include a central support backing 41b, which can be configured to at least partially enclose one or more components of the mirror assembly 2. As shown in FIGS. 7-9, and 21, the central support backing 41b can include an aperture 36 through which the pivot portion 32 can extend to engage with the head portion 40. The central support backing 41b can also include one or more vents 75 to reduce further the temperature. In certain variants, the mirror assembly 2 can include a gasket positioned between the head portion and support backing. As previously noted, the pivot portion 32 can connect the head portion 40 and the shaft portion 30.

Figure 21:
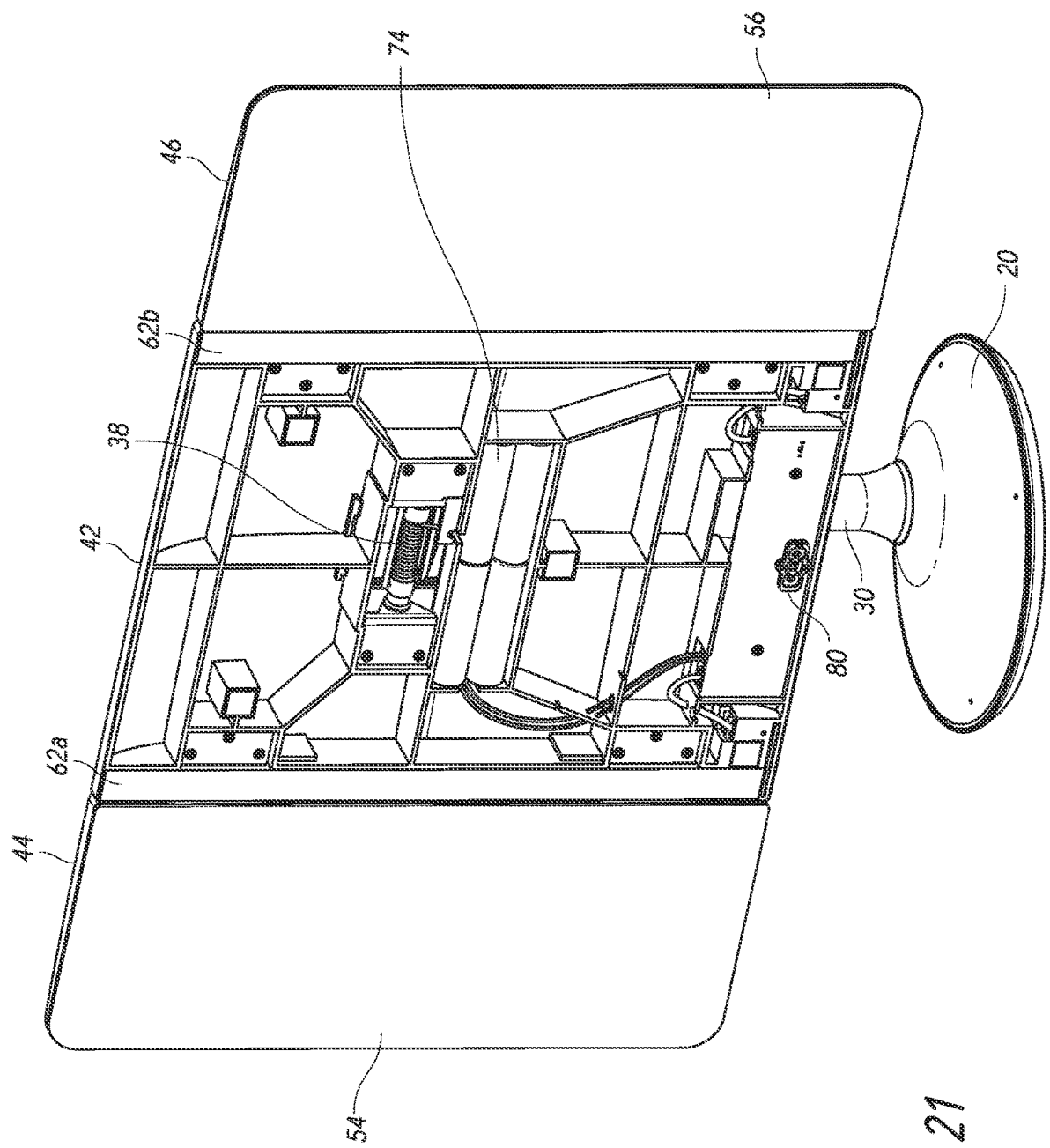
FIG. 21 illustrates a perspective view of an embodiment of the mirror assembly with a reflective surface removed.
Figure 22:
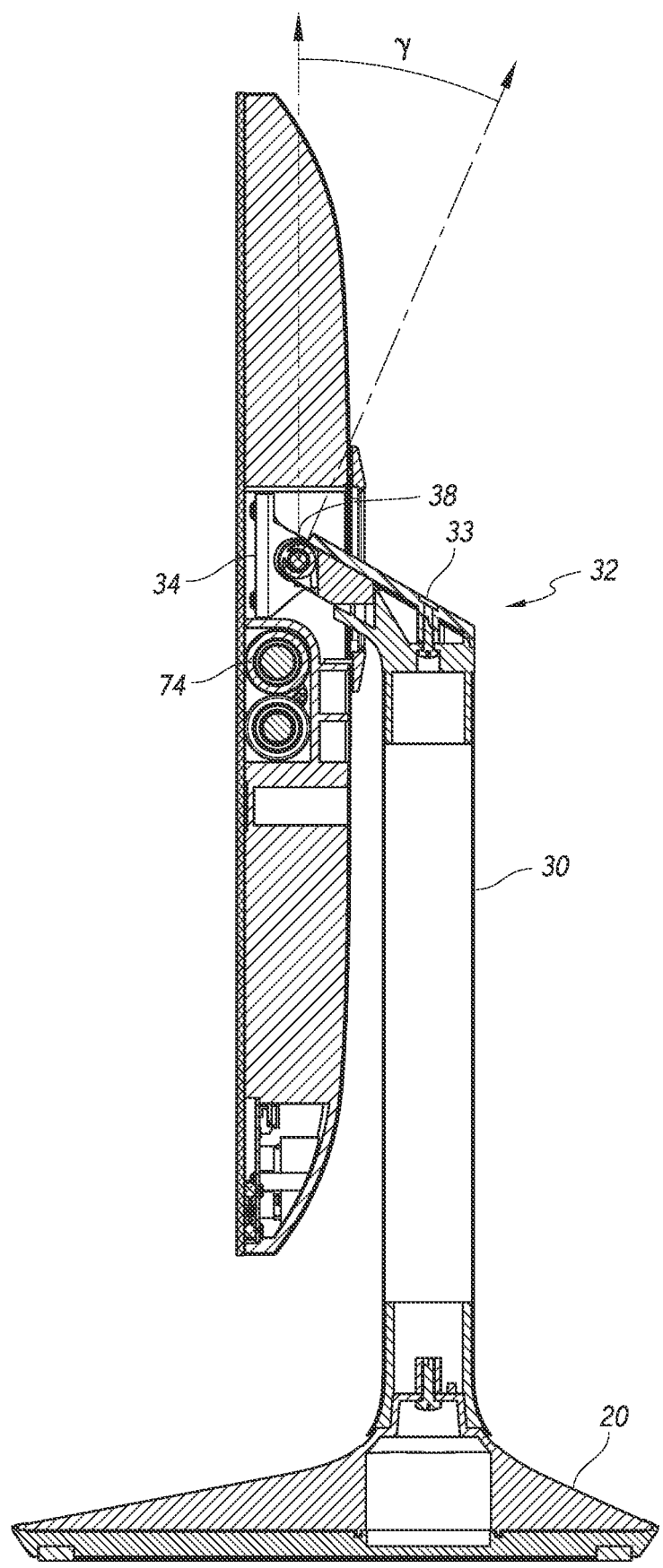
FIGS. 22 and 23 illustrate bisected views of the embodiment of FIG. 1.
Figure 23:
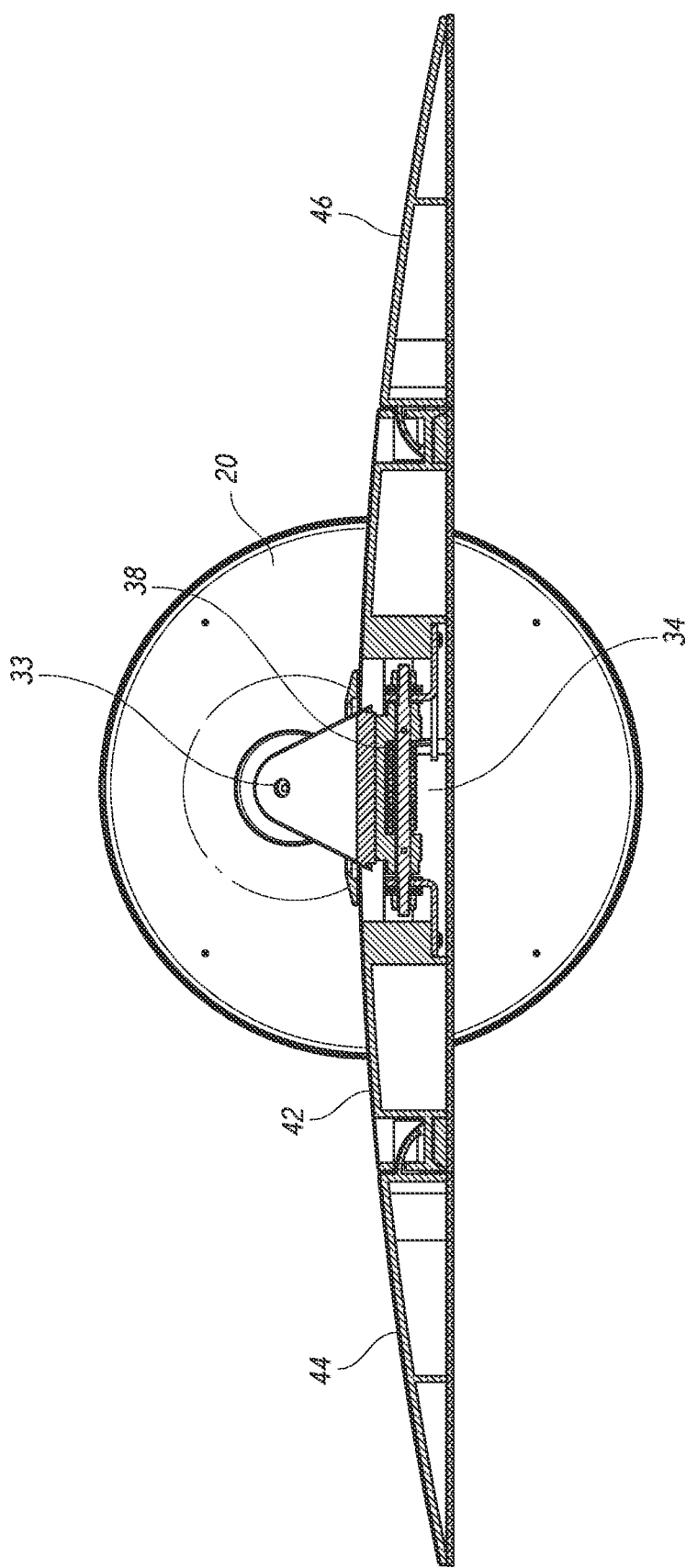

In certain embodiments, the pivot portion 32 allows the mirror 50 to be pivoted in one or more directions (e.g., up, down, right, left, clockwise, counterclockwise, etc.). The pivot portion 32 can include one or more of a ball joint, one or more hinges, or otherwise. As shown in FIG. 21-23, the pivot portion 32 may comprise a vertical swivel joint 34 (allowing up and down movement) and a lateral swivel joint 33 (allowing right to left movement). In some embodiments, the vertical swivel joint 34 is spring-loaded with spring 38. The spring 38 (or another similar feature that causes directional resistance) can imbue head portion with a weighted feel so that user can tilt the mirror back easily with little resistance (from the vertical position to a position y away from vertical, shown in FIG. 22) and with more resistance when returning the head 40 to the vertical position.

As stated above, the various features of the pivot portion 32 give the head portion 40 multi-directional movement capabilities. For instance, the head portion 40 can be adjustable (e.g., slidably movable and/or rotatable) along an axis generally parallel to the surface of the mirror 50 and to the ground and/or along an axis generally parallel to the surface of the mirror 50 and perpendicular to the ground. Additionally, the shaft portion 30 can be adjustable (e.g., slidably movable and/or rotatable) along an axis generally parallel to the surface of the mirror 50 and perpendicular to the ground. The housing portion 10 can also include additional pivot portions, such as along the shaft portion 20.

To adjust the height of the mirror assembly 2, the shaft portion 30 can be configured to telescope and/or translate generally perpendicular to the ground when the mirror assembly 2 is positioned on the base 20. In some embodiments, the height of the shaft portion 30 can be adjusted to a length in inches (measured from the base 20 to the head portion 40) of less than or equal to about 4, about 6, about 8, about 10, about 15, about 20, about 25, about 50, ranges falling between the aforementioned values, values in between the aforementioned values, or otherwise. In some embodiments, the height of the shaft portion 30 can be adjusted within about a four inch range. In some embodiments, the height of the shaft portion 30 can be adjusted within about a three inch range.

The shaft portion 30 can comprise plastic, stainless steel, aluminum, or other suitable materials. In some embodiments, the shaft portion 30 can comprise compressible materials, such as rubber, nylon, and plastics, on at least a portion of its outer surface.

A portion of the head portion 40 can be cantilevered outward from the longitudinal axis of the shaft portion 30. Such a configuration can impart a moment of force on the mirror assembly 2, which, if uncompensated for, could lead to tipping. The base portion 20 can also be configured to counteract such a moment. For example, the base portion 20 can include a weight that is sufficient to reduce substantially the likelihood of tipping of the mirror assembly 2.

The base 20 and/or other portions of the mirror assembly 2 can be generally balanced in mass distribution such that the center of mass of the mirror assembly 2 is generally positioned near the shaft 30 and/or near the base 20. The base portion 20 can weigh at least about 2 lbs., 4 lbs., 6 lbs., 8 lbs., 10 lbs., values in between, or otherwise. The base portion 20 can also include one or more supporting feet or be configured to be semi-permanently mountable (e.g., to be mounted to a countertop with one or more fasteners).

In some embodiments, as illustrated, the base portion 20 can have a generally curved outer surface. For example, a horizontal cross-section of the base at a plurality of points along its height can be generally circular or generally elliptical. In the illustrated embodiment, the base portion 20 is generally conical, such as generally frusto-conical. The outer surface of the base can be generally smooth, generally tapered and/or generally sloping, as illustrated, and/or present a virtually entirely continuous surface generally circumscribing the periphery of the base 20. The horizontal cross-sectional area or diameter of the top of the base 20 generally can be about the same as the horizontal cross-sectional are or diameter of the bottom of the shaft portion 30. The horizontal cross-sectional area of the base 20 can generally continuously increase from the top region of the base 20 to the bottom region of the base 20. For example, a horizontal cross-sectional area or diameter at the bottom region of the base 20 can be substantially larger than a horizontal cross-sectional area or diameter at the top region of the base 20

(e.g., at least about two or at least about three times larger), which is an example of a base 20 that can help resist tipping of the mirror. In some embodiments, as illustrated, the distance along the shaft portion 30 from the bottom of the mirror portion to the top of the base portion can be generally about the same as the height of the base portion 20. In some embodiments, the base has a footpad 22 that helps prevent tipping of the mirror assembly 2. In some embodiments, the footpad 22 gives the base 20 additional traction. In some embodiments, the footpad is rubber, silicone, or any other slightly tacky material.

The mirror assembly can be powered using an electrical conduit (e.g., a cord) and/or it can be powered using an internal power source (e.g., in embodiments where the mirror assembly is cordless or wireless). As discussed in further detail below, the head portion 40 (or some other portion of the mirror assembly) can include a power source 74 (e.g., a battery, a rechargeable battery, or a cord to be plugged into an electrical outlet). In some embodiments, a cord is plugged directly into an external energy source and into the mirror assembly to charge an internal power source of the mirror assembly (e.g., rechargeable batteries). In certain implementations, the external energy source is a standard wall outlet, a computer, or a portable battery. In certain variants, the electrical conduit engages with the external energy source or the mirror assembly via a multi-prong electrical plug, a USB port, a cell phone adaptor, or some other port configured to receive charge and to deliver it to a device. In some embodiments, the cord and/or the external energy source have guiding features (e.g., magnets) that guide the cord and external energy source into engagement. In some embodiments, the electrical conduit is removable or retractable (e.g., it retracts into the mirror assembly, out of sight). In some embodiments, the cord and/or the mirror assembly source have guiding features (e.g., magnets) that guide the cord and mirror assembly into engagement. In some embodiments, the mirror assembly can be recharged by placing the mirror assembly onto or in contact with a charging pad or mat. In some embodiments, the pad or mat may itself be wireless/cordless.

In some variants, the cordless mirror assembly is powered by rechargeable batteries (e.g., lithium ion, nickel cadmium, nickel, metal hydride, or lithium ion polymer). In some implementations, the batteries of the mirror assembly can be removed from the mirror assembly and replaced (or recharged at a charging station).

In some embodiments, the weight and positioning of the battery 74 can increase the stability of the mirror assembly 2 by acting as a counter weight to the mirror 50. In some embodiments, the battery can deliver power to the light sources for at least about ten minutes per day for about thirty days. The battery 74 can be recharged via a port 78 (e.g., a universal serial bus (USB) port or otherwise), as shown in FIG. 8. The port 78 can be configured to receive permanently or removably a connector coupled with a wire or cable (not shown). The port 78 can also be configured to allow electrical potential to pass between the batteries 74 with a power source via the connector. The port 78 may be used to program or calibrate different operations of the mirror illumination or object sensing when connect to a computer. Other charging methods can be used, such as via conventional electric adapter to be plugged in to an electric outlet.

The mirror assembly 2 can include an indicator device configured to issue a visual, audible, or other type of indication to a user of the mirror assembly 2 regarding a characteristic of the mirror assembly 2, the user, and/or the relationship between the mirror assembly 2 and the user. For example, the indicator can indicate on/off status, battery levels, imminent deactivation, and/or certain mode of operation. The indicator can be used for other purposes as well.

In certain embodiments, the color of the indicator light can vary depending on the indication. For example, the indicator can emit a green light when the mirror assembly is turned on and/or a red light when the battery is running low. The indicator can comprise a light bar that indicates the total battery life (decreasing length with decreasing battery life). In some embodiments, the indicator can ring-shaped and positioned around a portion of the shaft portion 30. The indicator can take on any other shape and be positioned around the head portion 40 (e.g., behind a portion of a 2-way mirrored area), along the base portion 20, or on any other location on the mirror assembly 2.

Figure 24A:
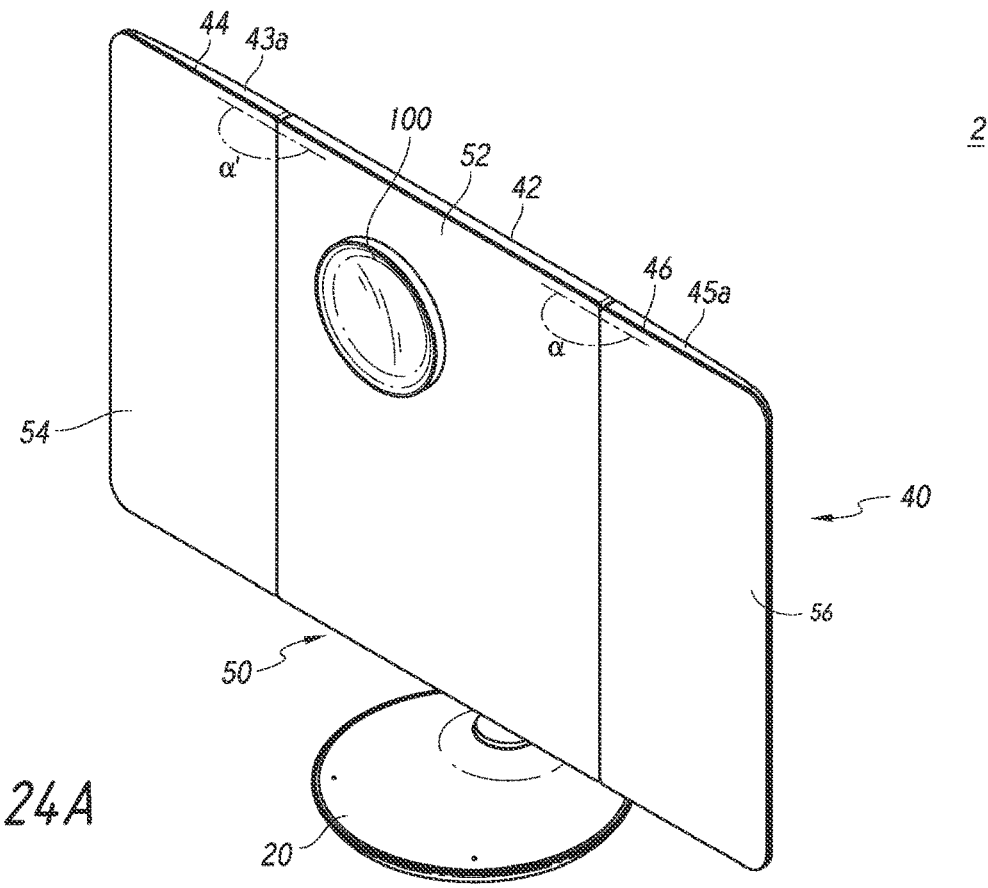
FIGS. 24A-D illustrate views of an embodiment of a mirror assembly with an additional mirror attached thereto.
Figure 24B:
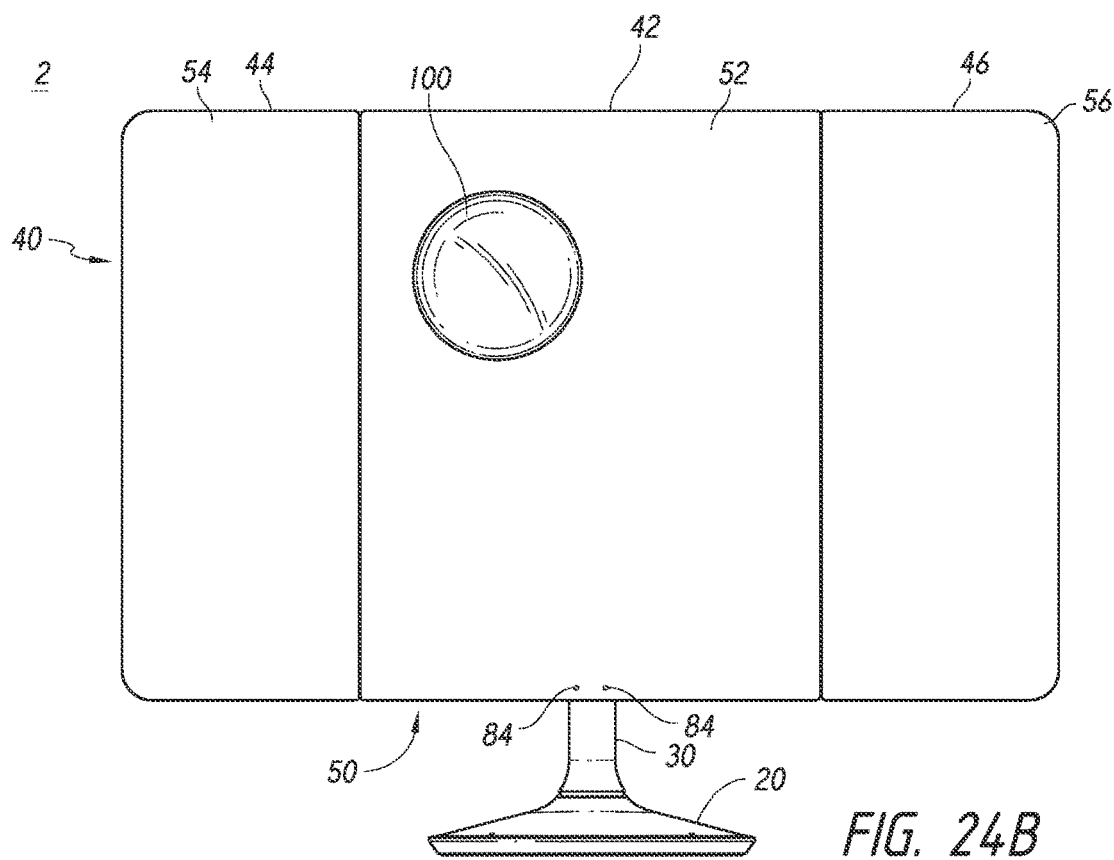

In some embodiments, as shown in FIGS. 24A-B, a supplemental (e.g., additional) mirror can be provided. This additional mirror 100 can be used to supplement the image provided on the mirrors 52, 54, 56 by providing additional views of the user. For instance, in some embodiments, where the mirrored surfaces 52, 54, 56 of the mirror assembly 2 are flat, the additional mirror 100 can be parabolic (e.g., concave) and/or can provide magnified views of the user. In certain implementations, the parabolic shape of the additional mirror can allow the user to increase or decrease magnification by moving closer or farther from the additional mirror 100. The radius of curvature and focal length of the additional mirror can vary as described elsewhere herein. In some embodiments, the additional mirror is convex and provides a smaller image of the user. This smaller image can be used to more easily allow the user look at the back of his or her head or to provide additional viewing angles of the user.

In some embodiments, a plurality of additional mirrors are provided (1, 2, 3, 4, or more) where each additional mirror provides a different type of image to the user (higher or lower magnification, tinted mirrors, colored mirrors, for example). In some embodiments, a single additional mirror itself can provide multiple different images. For instance, an additional mirror can have one face on a side and another different face on the opposite side. One face of the additional mirror could be concave providing a first magnification (e.g., 10×) and the other side of the mirror (the back surface) could be concave providing a second magnification (e.g., 2×) that is different or less than or greater than the first magnification. Any other first and second different optical features can be provided by the supplemental mirror, on its respective opposing sides, or as compared to one or more of the mirrored surfaces of the mirror system. For example, either or both of the surfaces of the supplemental mirror, as compared to each other or as compared to one or more mirrored surfaces of the mirror system, can provide different reflectivity levels or different light filtering or different magnification levels. In this configuration, by simply flipping the additional mirror from one side to the other, magnification or another feature of the mirror can be changed.

As shown in FIGS. 24A-B, in certain implementations, the additional mirror 100 can be affixed (stuck, adhered, attached, etc.) to a mirrored surface of the mirror assembly 2. In some implementations, the mirror is affixed using a coupling implement, such as one selected from one or more of a magnet, suction cup, glue or silicon adhesive, a sticky pad(s), or the like (not pictured). In some embodiments, the additional mirror 100 can be removed and reaffixed to the mirror assembly 2 as many times as desired by the user and in any position on the mirror assembly (e.g., on any portion of a mirrored surface 52, 54, 56).

Figure 24C:
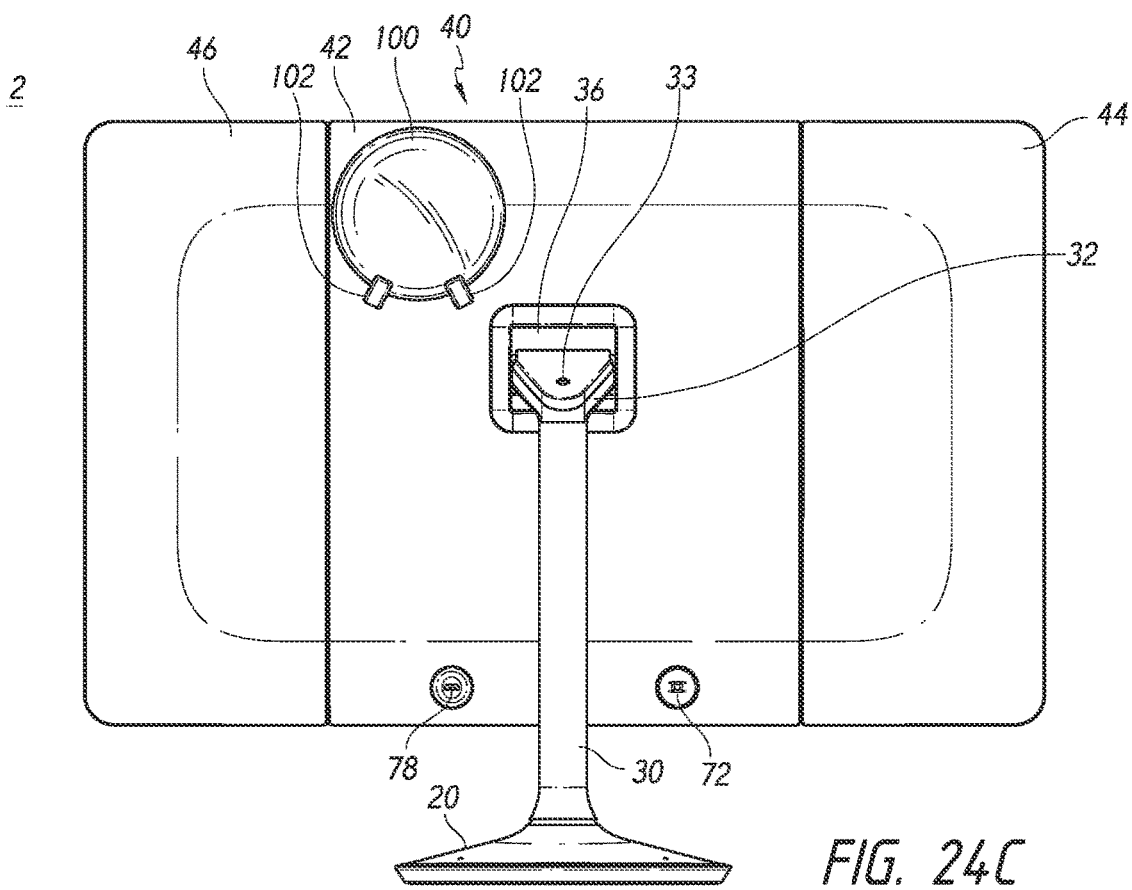
Figure 24D:
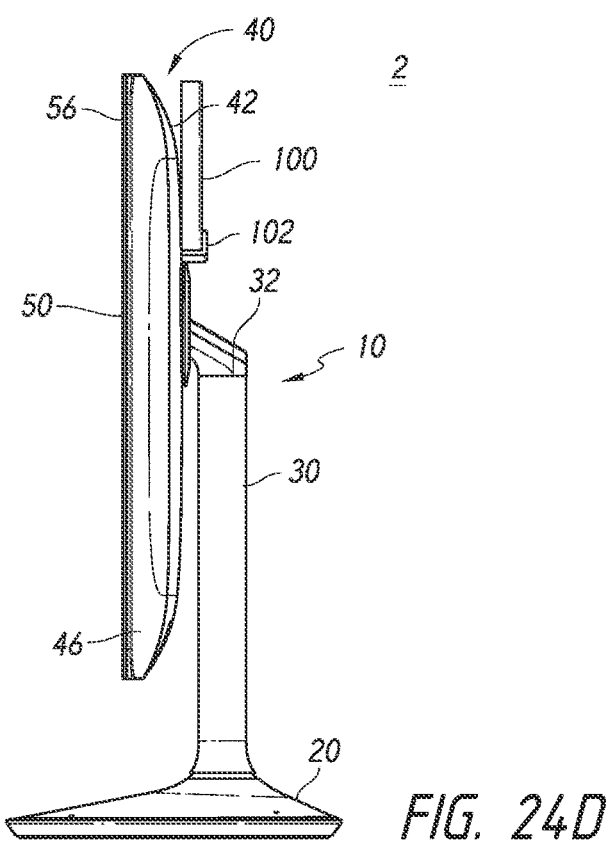

In some variants, the additional mirror 100 can be removed from the mirror assembly 2 to provide an unobstructed view of the image provided by the mirror assembly. In certain implementations, as shown in FIGS. 24C-D, when the additional mirror is not in use, it can be stored out of view (e.g., on the back of the mirror assembly 2). As shown in FIGS. 24 C-D, the additional mirror can be stored on the back of the mirror assembly 2 using clamps 102. In other variants, the additional mirror can be stored by, for example, magnetically attaching it to a portion of the mirror assembly (e.g., the back/non-mirrored surface of the mirror assembly), by sliding it into a slot provided on the back or side of the mirror assembly (e.g., a pocket, port, or drawer provided on the mirror assembly), by hanging it from the mirror assembly (e.g., using retractable or static hooks or clips that project from a portion of the additional mirror or from the mirror assembly), or by otherwise attaching the additional mirror to the mirror assembly (e.g., with adhesives, etc.). Just as the additional mirror can be affixed anywhere to the front of the mirror (e.g., an upper, lower, or central portion near the top, side, middle of the mirror), in some embodiments, the addition mirror can be stored anywhere on the back of the mirror (e.g., an upper, lower, or central portion near the top, side, middle of the back of the mirror).

In some variants, as shown in FIGS. 24A-D, the additional mirror 100 is circular. In other embodiments, the additional mirror is another shape (square, rectangular, oval, etc.). In certain implementations, the additional mirror 100 is at least about 2, 3, 4, or 5 inches in diameter (or width or height). In some embodiments, the additional mirror is sized to fit easily in a user's palm so that it can be handheld and manipulated easily when not attached to the mirror assembly.

Although the vanity mirror has been disclosed in the context of certain embodiments and examples, it will be understood by those skilled in the art that the present disclosure extends beyond the specifically disclosed embodiments to other alternative embodiments and/or uses of the subject matter and obvious modifications and equivalents thereof. In addition, while several variations of the vanity mirror have been described in detail, other modifications, which are within the scope of the present disclosure, will be readily apparent to those of skill in the art based upon this disclosure. It is also contemplated that various combinations or sub-combinations of the specific features and aspects of the embodiments can be made and still fall within the scope of the present disclosure. It should be understood that various features and aspects of the disclosed embodiments can be combined with or substituted for one another in order to form varying modes of the vanity mirror. Thus, it is intended that the scope of the subject matter herein disclosed should not be limited by the particular disclosed embodiments described above.

Any of the vanity mirror features, structures, steps, or processes disclosed in this specification can be included in any embodiment. The light scattering elements in the region generally adjacent the light source can be smaller compared to the light scattering elements in the region spaced from, or generally opposite from, or generally furthest from, the light source. The light source can be positioned near an upper portion of the mirror. The light pipe can be disposed along substantially all of the periphery of the mirror. The light source can emit light in a direction generally orthogonal to a standard viewing direction of the mirror. The light source can emit light into the first end, and another light source can emit light into the second end. In some embodiments, the light scattering elements can be generally uniformly distributed along at least a portion of the light pipe.

Certain aspects of this disclosure are directed toward a mirror assembly including a mirror coupled with a housing portion and one or more light sources disposed at a periphery of the mirror. The one or more light sources can be configured to emit light in a direction generally orthogonal to a primary viewing direction of the mirror. The light pipe can have a length and can be disposed along substantially all of the periphery of the mirror. The light pipe can be configured to receive light from the one or more light sources and distribute the light generally consistently along the length, thereby providing a generally constant level of illumination to the periphery of the mirror.

Any of the vanity mirror features, structures, steps, or processes disclosed in this specification can be included in any embodiment. The one or more light sources can include a first light source configured to project light in a first direction around the periphery of the mirror and a second light source configured to project light in a second direction around the periphery of the mirror. The one or more light sources can be two light sources. Each of the light sources can use less than or equal to about three watts of power. The one or more light sources can have a color rendering index of at least about 90. The one or more light sources can include light emitting diodes. The light pipe can be configured to transmit at least about 95% of the light emitted from the one or more light sources.

Certain aspects of this disclosure are directed toward methods of manufacturing a mirror assembly, such as any of the mirror assemblies disclosed in this specification. The methods can include coupling a mirror and a housing portion. The method can include disposing a light source at a periphery of the mirror. The method can include positioning a light pipe around at least a portion of the periphery of the mirror. The method can include disposing a plurality of light scattering elements along the length of a light pipe. In certain embodiments, the plurality of light scattering elements can have a pattern density. The light scattering elements can be configured to encourage a portion of the light impacting the light scattering elements to be emitted out of the light pipe. The pattern density can be less dense in a region generally adjacent the light source, and the pattern density can be more dense in a region generally opposite from, spaced from, or furthest from, the light source along the periphery of the mirror, thereby facilitating a substantially constant amount of light emitted along the length of the light pipe. In certain embodiments, the method can include positioning the light source near an upper portion of the mirror. In certain embodiments, the method can include positioning the light source to emit light in a direction generally orthogonal to a main viewing direction of the mirror. In certain embodiments, the method can include positioning the light source to emit light into a first end of the light pipe and positioning another light source to emit light into a second end of the light pipe. In certain embodiments, the method can include disposing the light scattering elements in a generally uniform pattern along at least a portion of the light pipe.

Certain aspects of this disclosure are directed toward a mirror assembly having a housing portion, a mirror, one or more light sources, a proximity sensor, and an electronic processor. The mirror can be coupled with the housing portion. The one or more light sources can be disposed at a periphery of the mirror. The proximity sensor can be configured to detect an object within a sensing region. The proximity sensor can be configured to generate a signal indicative of a distance between the object and the proximity sensor. The electronic processor can be configured to generate an electronic signal to the one or more light sources for emitting a level of light that varies depending on the distance between the object and the sensor.

Any of the vanity mirror features, structures, steps, or processes disclosed in this specification can be included in any embodiment. For example, the proximity sensor can be positioned generally near a top region of the mirror. The electronic processor can be configured to generate an electronic signal to the one or more light sources to deactivate if the proximity sensor does not detect the presence and/or movement of the object for a predetermined period of time. The proximity sensor can be configured to have increased sensitivity after the proximity sensor detects the object (e.g., by increasing the trigger zone distance, by increasing the sensitivity to movement within a trigger zone, and/or by increasing the time period until deactivation). The mirror assembly can include an ambient light sensor configured to detect a level of ambient light. In some embodiments, the sensing region can extend from about 0 degrees to about 45 degrees downward relative to an axis extending from the proximity sensor. The proximity sensor can be mounted at an angle relative to a viewing surface of the mirror. The mirror assembly can include a lens cover positioned near the proximity sensor. In certain embodiments, a front surface of the lens cover can be positioned at an angle relative to the proximity sensor. The mirror assembly can include a light pipe having a length and being disposed along substantially all of the periphery of the mirror. The light pipe can be configured to receive light from the one or more light sources and distribute the light generally consistently along the length, thereby providing a substantially constant level of illumination to the periphery of the mirror.

Certain aspects of this disclosure are directed toward a variety of different methods of manufacturing a mirror assembly. The methods can include coupling a mirror with a housing portion. The methods can include disposing one or more light sources at a periphery of the mirror. The methods can include configuring a proximity sensor to generate a signal indicative of a distance between an object and the proximity sensor. The methods can include configuring an electronic processor to generate an electronic signal to the one or more light sources for emitting a level of light that varies depending on the distance between the object and the sensor.

Any methods of manufacturing the mirror assembly can include a variety of different steps. For example, some methods can include positioning the proximity sensor generally near a top region of the mirror. The methods can include configuring the electronic processor to generate an electronic signal to the one or more light sources to deactivate if the proximity sensor does not detect the object for a period of time. The methods can include configuring the proximity sensor to have increased sensitivity after the proximity sensor detects the object. The methods can include configuring an ambient light sensor to detect a level of ambient light. The methods can include configuring the proximity sensor to detect an object within a sensing region extending from about 0 degrees to about 45 degrees downward relative to an axis extending from the proximity sensor. The methods can include mounting the proximity sensor at an angle relative to a viewing surface of the mirror. The methods can include positioning a lens cover near the proximity sensor. In certain embodiments, the method can include positioning a front surface of the lens cover at an angle relative to the proximity sensor. The methods can include disposing a light pipe along substantially all of the periphery of the mirror. The light pipe can be configured to receive light from the one or more light sources and distribute the light generally consistently along the length, thereby providing a substantially constant level of illumination to the periphery of the mirror.

For purposes of summarizing the disclosure, certain aspects, advantages and features of the inventions have been described herein. It is to be understood that not necessarily any or all such advantages are achieved in accordance with any particular embodiment of the inventions disclosed herein. No aspects of this disclosure are essential or indispensable. In many embodiments, the mirror system may be configured differently than illustrated in the figures or description herein. For example, various functionalities provided by the illustrated modules can be combined, rearranged, added, or deleted. In some embodiments, additional or different processors or modules may perform some or all of the functionalities described with reference to the example embodiment described and illustrated in the figures. Many implementation variations are possible.

The following is claimed:

1. A mirror assembly comprising:
   a head portion comprising a mirror surface;
   a base portion supporting the head portion, the base portion comprising a speaker;
   a touch sensor configured to receive a user input;
   a controller configured to receive a signal from the touch sensor and control a function of the mirror assembly in response to the received signal; and
   a display visible through the mirror surface, the display configured to show product recommendations based on a complexion, a skin tone, or a hair color of a user.

2. The mirror assembly of claim 1, wherein the user input is a directional finger movement.

3. The mirror assembly of claim 1, wherein the user input is a touch at a specific area of the touch sensor.

4. The mirror assembly of claim 1, wherein the base portion comprises a shaft and a base.

5. The mirror assembly of claim 1, wherein the controller is configured to provide an auditory alarm using the speaker.

6. The mirror assembly of claim 1, wherein the mirror assembly is configured to play music or a radio broadcast.

7. The mirror assembly of claim 1, further comprising an integrated learning device.

8. The mirror assembly of claim 1, further comprising a user interface element configured to provide interactive voice response.

9. The mirror assembly of claim 1, wherein the mirror assembly is configured to receive weather information.

10. The mirror assembly of claim 1, further comprising:
    a light source disposed at a periphery of the mirror surface; and
    a sensor assembly configured to detect movement of a user;
    wherein the controller is configured to activate the light source in response to the detected movement.

11. The mirror assembly of claim 10, wherein the sensor assembly is configured to detect a waving hand of the user.

12. A mirror assembly comprising:
    a head portion comprising a mirror surface;
    a base portion supporting the head portion, the base portion comprising a speaker;
    a light source disposed at a periphery of the mirror surface, the light source comprising at least one light emitting diode;

a touch sensor configured to receive a first user input and a second user input, the first user input being a directional finger movement in which a user swipes a finger in one direction over the touch sensor, the second user input is a tap on the touch sensor;

a controller configured to receive a signal from the touch sensor based on the first user input or the second user input, the controller configured to:

control a first light setting in response to the received signal based on the first user input; and control a second light setting in response to the received signal based on the second user input.

13. The mirror assembly of claim 12, wherein the first light setting comprises brightness.

14. The mirror assembly of claim 13, wherein the controller is configured to increase brightness in response to the first user input, and wherein the controller is configured to decrease brightness in response to the user swiping the finger in an opposite direction.

15. The mirror assembly of claim 14, wherein the second light setting is color temperature, and wherein the controller is configured to apply a color temperature setting in response to the tap on the touch sensor.

16. The mirror assembly of claim 12, wherein the first light setting comprises color temperature.

17. The mirror assembly of claim 12, wherein the second user input is the tap at a specific area of the touch sensor.

18. The mirror assembly of claim 12, wherein the first light setting is brightness and the second light setting is color temperature.

19. The mirror assembly of claim 12, wherein the base portion comprises a shaft and a base.

20. The mirror assembly of claim 12, wherein the mirror assembly is configured to wirelessly communicate with a mobile device.

21. The mirror assembly of claim 20, wherein the controller is configured to adjust one or more settings of the mirror assembly based on an input received from a software module or app on the mobile device.

22. The mirror assembly of claim 12, wherein the light source emits light based on preset light settings created by a user.

* * * * *